(12) United States Patent
Huang

(10) Patent No.: US 11,399,385 B2
(45) Date of Patent: Jul. 26, 2022

(54) METHOD AND APPARATUS FOR RECEIVING DOWNLINK DATA IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/407,497

(22) Filed: Aug. 20, 2021

(65) Prior Publication Data

US 2022/0070899 A1 Mar. 3, 2022

Related U.S. Application Data

(60) Provisional application No. 63/071,562, filed on Aug. 28, 2020.

(51) Int. Cl.
*H04W 72/12* (2009.01)
*H04L 5/00* (2006.01)

(52) U.S. Cl.
CPC ....... *H04W 72/1273* (2013.01); *H04L 5/0007* (2013.01); *H04L 5/0091* (2013.01); *H04W 72/1289* (2013.01)

(58) Field of Classification Search
CPC .......... H04W 72/1273; H04W 72/1289; H04L 5/0091; H04L 5/0097

(Continued)

(56) References Cited

U.S. PATENT DOCUMENTS 10,973,044 B1 * 4/2021 Venugopal .......... H04L 25/0226
2020/0077369 A1 3/2020 Zhang et al.

(Continued)

FOREIGN PATENT DOCUMENTS

| EP | 3547781 A1 | 10/2019 |
| WO | 2021062973 A1 | 4/2021 |
| WO | 2021148056 A2 | 7/2021 |

OTHER PUBLICATIONS

ASUSTek, "Discussion on enhancements for Multi-TRP PDCCH",, 3GPP TSG RAN WG1 #104b-e R1-2103674, pp. 1-5, Apr. 12-20, 2021, Agenda Item 8.1.2.1.

(Continued)

*Primary Examiner* — Peter G Solinsky
(74) *Attorney, Agent, or Firm* — Cooper Legal Group, LLC

(57) ABSTRACT

In an example, a User Equipment (UE) monitors a first Physical Downlink Control Channel (PDCCH), via a first spatial Quasi-Colocation (QCL) assumption associated with a first Transmission Configuration Indicator (TCI) state, on a first monitoring occasion of a first Control Resource Set (CORESET). The UE monitors a second PDCCH, via a second spatial QCL assumption associated with a second TCI state, on a second monitoring occasion of a second CORESET. The UE determines an interval between a reference monitoring occasion and a scheduled Physical Downlink Shared Channel (PDSCH), wherein the reference monitoring occasion is a last monitoring occasion of the first monitoring occasion and the second monitoring occasion. Based on the interval being larger than or equal to a threshold, the UE receives the scheduled PDSCH via a third spatial QCL assumption associated with a third TCI state, wherein the third TCI state is determined based on a lowest CORESET identity of a first CORESET identity of the first CORESET and a second CORESET identity of the second CORESET.

20 Claims, 21 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2021/0136807 A1 | 5/2021 | Yang et al. | |
| 2021/0195600 A1* | 6/2021 | Khoshnevisan | H04L 5/0051 |
| 2021/0258936 A1* | 8/2021 | Takeda | H04B 7/08 |
| 2021/0266769 A1* | 8/2021 | Chung | H04W 72/085 |
| 2021/0297959 A1* | 9/2021 | Zhou | H04W 24/10 |
| 2021/0306063 A1* | 9/2021 | Nam | H04L 27/2607 |
| 2021/0321442 A1* | 10/2021 | Jung | H04W 56/00 |
| 2021/0329608 A1* | 10/2021 | Bang | H04W 72/1268 |
| 2021/0337526 A1* | 10/2021 | Nam | H04B 7/088 |
| 2021/0360594 A1* | 11/2021 | Park | H04W 72/046 |

OTHER PUBLICATIONS

Corresponding European Patent Application No. 21192268.7, Extended European Search Report dated Feb. 4, 2022.

* cited by examiner

*Optionally present in UL, not present in DL*

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

2105 — TRANSMIT FIRST PDCCH, VIA FIRST SPATIAL QCL ASSUMPTION ASSOCIATED WITH FIRST TCI STATE, ON FIRST MONITORING OCCASION OF FIRST CORESET

2110 — TRANSMIT SECOND PDCCH, VIA SECOND SPATIAL QCL ASSUMPTION ASSOCIATED WITH SECOND TCI STATE, ON SECOND MONITORING OCCASION OF SECOND CORESET, WHEREIN BASE STATION IS NOT CONFIGURED TO SCHEDULE PDSCH, VIA FIRST PDCCH AND SECOND PDCCH, AT TIME AT WHICH INTERVAL WOULD BE SMALLER THAN THRESHOLD, AND WHEREIN INTERVAL CORRESPONDS TO INTERVAL BETWEEN LAST OFDM SYMBOL OF REFERENCE MONITORING OCCASION AND STARTING OFDM SYMBOL OF PDSCH, AND WHEREIN REFERENCE MONITORING OCCASION IS LAST MONITORING OCCASION OF FIRST MONITORING OCCASION AND SECOND MONITORING OCCASION

FIG. 21

METHOD AND APPARATUS FOR RECEIVING DOWNLINK DATA IN A WIRELESS COMMUNICATION SYSTEM

CROSS-REFERENCE TO RELATED APPLICATIONS

The present Application claims the benefit of U.S. Provisional Patent Application Ser. No. 63/071,562 filed on Aug. 28, 2020, the entire disclosure of which is incorporated herein in its entirety by reference.

FIELD

This disclosure generally relates to wireless communication networks, and more particularly, to a method and apparatus for receiving downlink data in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE monitors a first Physical Downlink Control Channel (PDCCH), via a first spatial Quasi-Colocation (QCL) assumption associated with a first Transmission Configuration Indicator (TCI) state, on a first monitoring occasion of a first Control Resource Set (CORESET). The UE monitors a second PDCCH, via a second spatial QCL assumption associated with a second TCI state, on a second monitoring occasion of a second CORESET. The UE determines an interval between a last orthogonal frequency-division multiplexing (OFDM) symbol of a reference monitoring occasion and a starting OFDM symbol of a scheduled Physical Downlink Shared Channel (PDSCH), wherein the reference monitoring occasion is a last monitoring occasion of the first monitoring occasion and the second monitoring occasion. Based on the interval being larger than or equal to a threshold, the UE receives the scheduled PDSCH via a third spatial QCL assumption associated with a third TCI state, wherein the third TCI state is determined based on a lowest CORESET identity of a first CORESET identity of the first CORESET and a second CORESET identity of the second CORESET.

In an example from the perspective of a UE, the UE monitors a first CORESET, via a first spatial QCL assumption associated with a first TCI state, on a first monitoring occasion, wherein a first PDCCH is associated with the first CORESET. The UE monitors a second CORESET, via a second spatial QCL assumption associated with a second TCI state, on a second monitoring occasion, wherein a second PDCCH is associated with the second CORESET, the first PDCCH schedules a PDSCH and the second PDCCH schedules the PDSCH. The UE determines an interval between a last OFDM symbol of a reference monitoring occasion and a starting OFDM symbol of the PDSCH, wherein the reference monitoring occasion is a last monitoring occasion of the first monitoring occasion and the second monitoring occasion. Based on the interval being larger than or equal to a threshold, the UE determines the PDSCH via a third spatial QCL assumption associated with a third TCI state, wherein the third TCI state is determined based on a lowest CORESET identity of a first CORESET identity of the first CORESET and a second CORESET identity of the second CORESET.

BRIEF DESCRIPTION OF THE DRAWINGS

FIG. 7 is a diagram associated with Transmission Configuration Indicator (TCI) state activation and/or deactivation according to one exemplary embodiment.

FIG. 21 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.300 V15.8.0 (2019-12) 3rd Generation Partnership Project; Technical Specification Group Radio Access Network; NR; NR and NG-RAN Overall Description; Stage 2 (Release 15); R1-1913604 RAN1 agreements for NR_eMIMO, Samsung; 3GPP TS 38.321 V15.8.0 (2019-12) 3rd Generation Partnership Project; Technical Specification Group Radio Access Network; NR; Medium Access Control (MAC) protocol specification (Release 15); 3GPP TS 38.331 V15.8.0 (2019-12) 3rd Generation Partnership Project; Technical Specification Group Radio Access Network; NR; Radio Resource Control (RRC) protocol specification (Release 15); 3GPP TS 38.211 V15.8.0 (2019-12) 3rd Generation Partnership Project; Technical Specification Group Radio Access Network; NR; Physical channels and modulation (Release 15); 3GPP TS 38.213 V15.8.0 (2019-12) 3rd Generation Partnership Project; Technical Specification Group Radio Access Network; NR; Physical layer procedures for control (Release 15); 3GPP TS 38.212 V16.2.0 (2020-06) 3rd Generation Partnership Project; Technical Specification Group Radio Access Network; NR; Multiplexing and channel coding (Release 16); 3GPP TS 38.213 V16.2.0 (2020-06) 3rd Generation Partnership Project; Technical Specification Group Radio Access Network; NR; Physical layer procedures for control (Release 16); 3GPP TS 38.214 V16.2.0 (2020-06) 3rd Generation Partnership Project; Technical Specification Group Radio Access Network; NR; Physical layer procedures for data (Release 16); RP-193133 New WID: Further enhancements on MIMO for NR, Samsung. The standards and documents listed above are hereby expressly incorporated by reference in their entirety.

Figure 1:
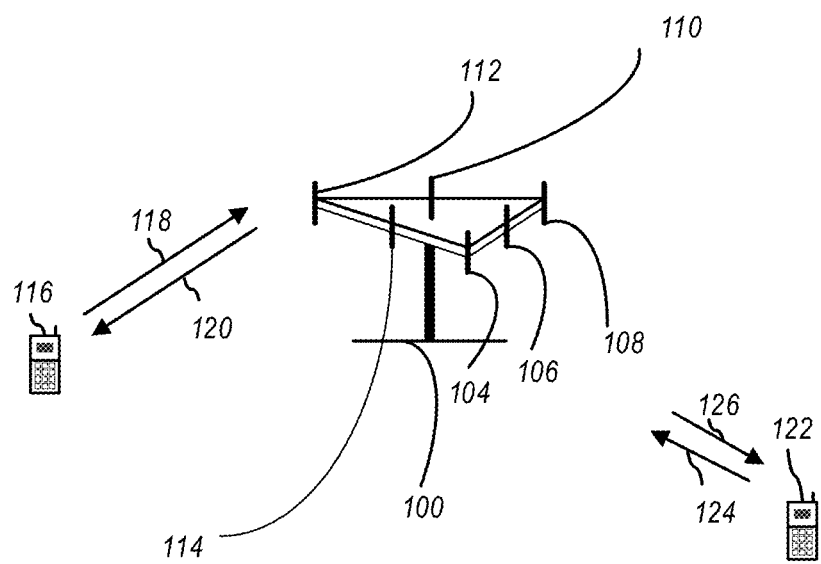
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
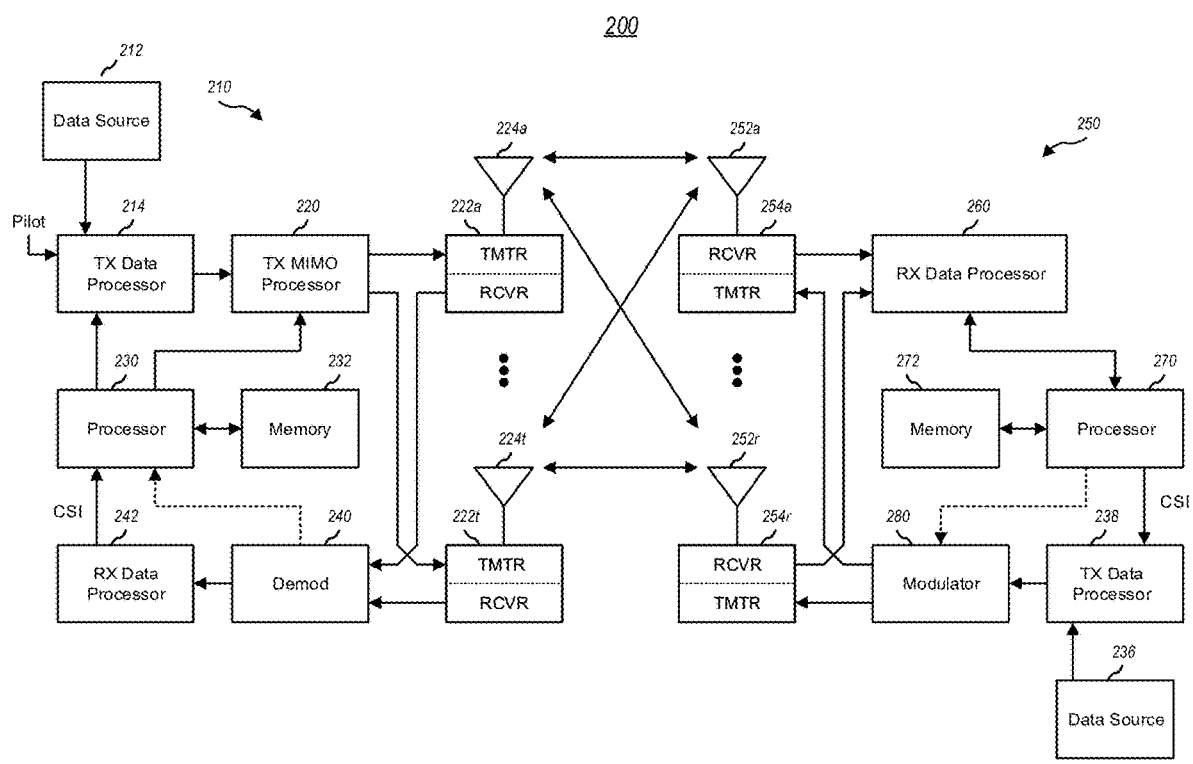
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
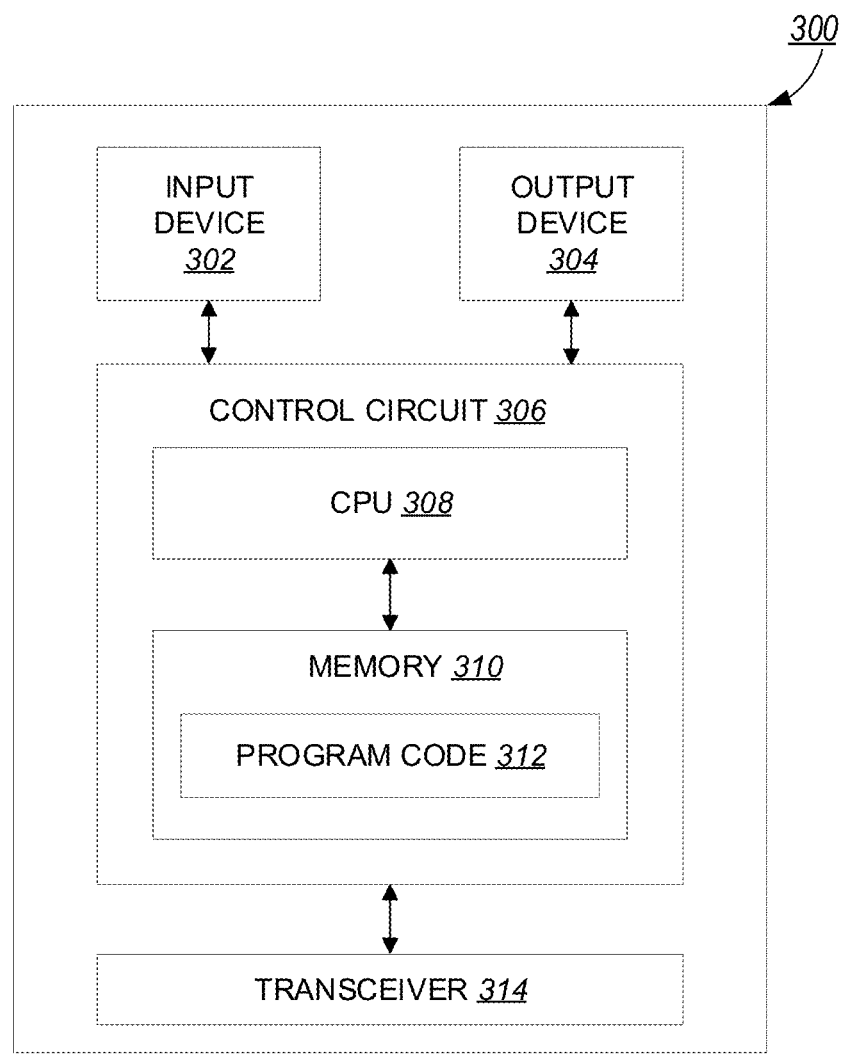
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
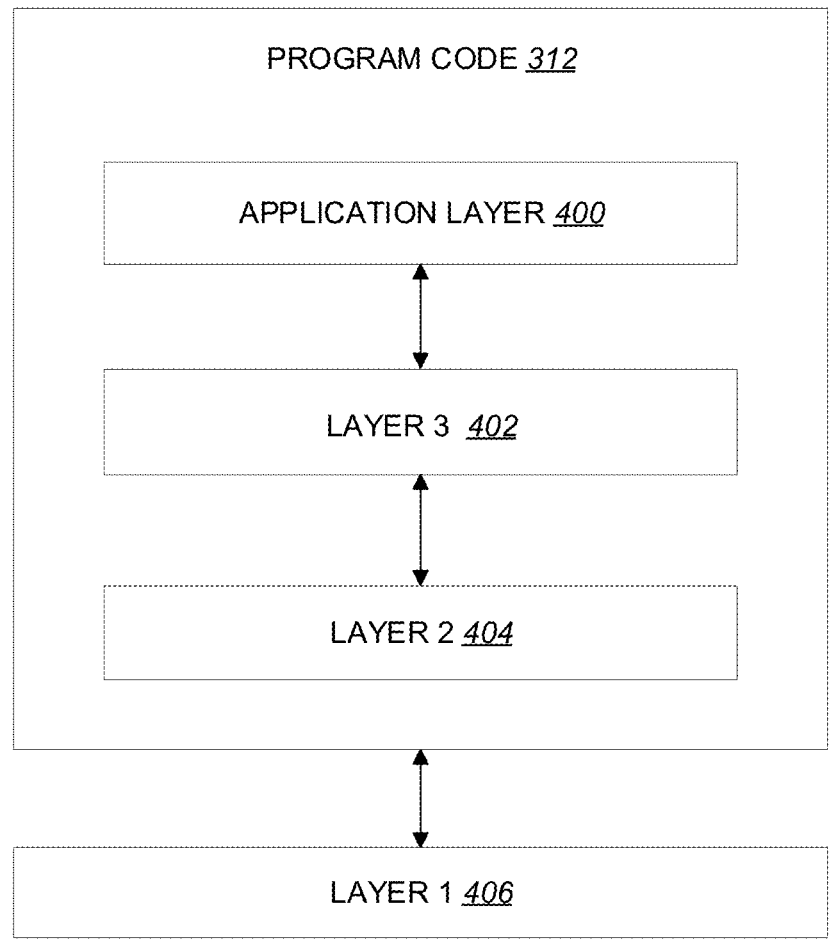
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
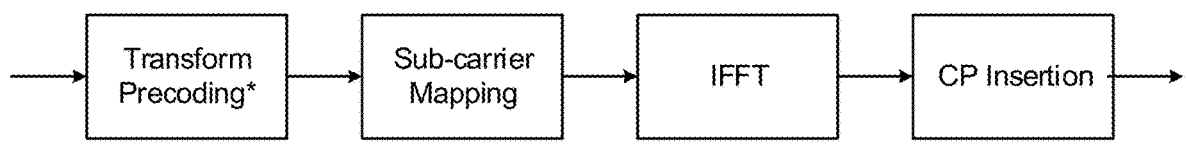
FIG. 5 is a transmitter block diagram for Cyclic Prefix Orthogonal Frequency Division Multiplexing (CP-OFDM) with optional discrete Fourier transform (DFT)-spreading according to one exemplary embodiment.

Some related texts associated with NR are quoted below from 3GPP TS 38.300 V15.8.0 (associated with Rel-15). Notably, FIG. 5.1-1 of Section 5.1 of 3GPP TS 38.300 V15.8.0, entitled "Transmitter block diagram for CP-OFDM with optional DFT-spreading", is reproduced herein as FIG. 5. FIG. 5.2.4-1 of Section 5.2.4 of 3GPP TS 38.300 V15.8.0, entitled "Time-frequency structure of SSB", is reproduced herein as FIG. 6.

Physical Layer 5.1 Waveform, Numerology and Frame Structure

The downlink transmission waveform is conventional OFDM using a cyclic prefix. The uplink transmission waveform is conventional OFDM using a cyclic prefix with a transform precoding function performing DFT spreading that can be disabled or enabled.

FIG. 5.1-1: Transmitter Block Diagram for CP-OFDM with Optional DFT-Spreading

The numerology is based on exponentially scalable sub-carrier spacing $\Delta f = 2^\mu \times 15$ kHz with $\mu = \{0,1,3,4\}$ for PSS, SSS and PBCH and $\mu = \{0,1,2,3\}$ for other channels. Normal CP is supported for all sub-carrier spacings, Extended CP is supported for $\mu = 2$. 12 consecutive sub-carriers form a Physical Resource Block (PRB). Up to 275 PRBs are supported on a carrier.

TABLE 5.1-1

Supported transmission numerologies.

| $\mu$ | $\Delta f = 2^\mu \cdot 15$[kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

The UE may be configured with one or more bandwidth parts on a given component carrier, of which only one can be active at a time, as described in clauses 7.8 and 6.10 respectively. The active bandwidth part defines the UE's operating bandwidth within the cell's operating bandwidth. For initial access, and until the UE's configuration in a cell is received, initial bandwidth part detected from system information is used.

Downlink and uplink transmissions are organized into frames with 10 ms duration, consisting of ten 1 ms sub-frames. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe.

5.2 Downlink 5.2.1 Downlink Transmission Scheme

A closed loop Demodulation Reference Signal (DMRS) based spatial multiplexing is supported for Physical Downlink Shared Channel (PDSCH). Up to 8 and 12 orthogonal DL DMRS ports are supported for type 1 and type 2 DMRS respectively. Up to 8 orthogonal DL DMRS ports per UE are supported for SU-MIMO and up to 4 orthogonal DL DMRS ports per UE are supported for MU-MIMO. The number of SU-MIMO code words is one for 1-4 layer transmissions and two for 5-8 layer transmissions.

The DMRS and corresponding PDSCH are transmitted using the same precoding matrix and the UE does not need to know the precoding matrix to demodulate the transmission. The transmitter may use different precoder matrix for different parts of the transmission bandwidth, resulting in frequency selective precoding. The UE may also assume that the same precoding matrix is used across a set of Physical Resource Blocks (PRBs) denoted Precoding Resource Block Group (PRG).

Transmission durations from 2 to 14 symbols in a slot is supported.

Aggregation of multiple slots with Transport Block (TB) repetition is supported.

5.2.2 Physical-Layer Processing for Physical Downlink Shared Channel

The downlink physical-layer processing of transport channels consists of the following steps:

Transport block CRC attachment;
Code block segmentation and code block CRC attachment;
Channel coding: LDPC coding;
Physical-layer hybrid-ARQ processing;
Rate matching;
Scrambling;
Modulation: QPSK, 16QAM, 64QAM and 256QAM;
Layer mapping;
Mapping to assigned resources and antenna ports.

The UE may assume that at least one symbol with demodulation reference signal is present on each layer in which PDSCH is transmitted to a UE, and up to 3 additional DMRS can be configured by higher layers.

Phase Tracking RS may be transmitted on additional symbols to aid receiver phase tracking.

The DL-SCH physical layer model is described in TS 38.202 [20].

5.2.3 Physical Downlink Control Channels

The Physical Downlink Control Channel (PDCCH) can be used to schedule DL transmissions on PDSCH and UL transmissions on PUSCH, where the Downlink Control Information (DCI) on PDCCH includes:

Downlink assignments containing at least modulation and coding format, resource allocation, and hybrid-ARQ information related to DL-SCH;
Uplink scheduling grants containing at least modulation and coding format, resource allocation, and hybrid-ARQ information related to UL-SCH.

In addition to scheduling, PDCCH can be used to for
Activation and deactivation of configured PUSCH transmission with configured grant;
Activation and deactivation of PDSCH semi-persistent transmission;
Notifying one or more UEs of the slot format;
Notifying one or more UEs of the PRB(s) and OFDM symbol(s) where the UE may assume no transmission is intended for the UE;
Transmission of TPC commands for PUCCH and PUSCH;
Transmission of one or more TPC commands for SRS transmissions by one or more UEs;
Switching a UE's active bandwidth part;
Initiating a random access procedure.

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH.

Each resource element group carrying PDCCH carries its own DMRS.

QPSK modulation is used for PDCCH.

5.2.4 Synchronization Signal and PBCH Block

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS as show in FIG. 5.2.4-1. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB corresponds to an individual cell, which has a unique NCGI (see clause 8.2). Such an SSB is referred to as a Cell-Defining SSB (CD-SSB). A PCell is always associated to a CD-SSB located on the synchronization raster.

FIG. 5.2.4-1: Time-Frequency Structure of SSB

Polar coding is used for PBCH.

The UE may assume a band-specific sub-carrier spacing for the SSB unless a network has configured the UE to assume a different sub-carrier spacing.

PBCH symbols carry its own frequency-multiplexed DMRS.

QPSK modulation is used for PBCH.

The PBCH physical layer model is described in TS 38.202 [20].

5.2.5 Physical Layer Procedures 5.2.5.1 Link Adaptation

Link adaptation (AMC: adaptive modulation and coding) with various modulation schemes and channel coding rates is applied to the PDSCH. The same coding and modulation is applied to all groups of resource blocks belonging to the same L2 PDU scheduled to one user within one transmission duration and within a MIMO codeword.

For channel state estimation purposes, the UE may be configured to measure CSI-RS and estimate the downlink channel state based on the CSI-RS measurements. The UE feeds the estimated channel state back to the gNB to be used in link adaptation.

5.2.5.2 Power Control

Downlink power control can be used.

5.2.5.3 Cell Search

Cell search is the procedure by which a UE acquires time and frequency synchronization with a cell and detects the Cell ID of that cell. NR cell search is based on the primary and secondary synchronization signals, and PBCH DMRS, located on the synchronization raster.

5.2.5.4 HARQ

Asynchronous Incremental Redundancy Hybrid ARQ is supported. The gNB provides the UE with the HARQ-ACK feedback timing either dynamically in the DCI or semi-statically in an RRC configuration.

The UE may be configured to receive code block group based transmissions where retransmissions may be scheduled to carry a sub-set of all the code blocks of a TB.

5.4 Carrier Aggregation 5.4.1 Carrier Aggregation

In Carrier Aggregation (CA), two or more Component Carriers (CCs) are aggregated. A UE may simultaneously receive or transmit on one or multiple CCs depending on its capabilities:

- A UE with single timing advance capability for CA can simultaneously receive and/or transmit on multiple CCs corresponding to multiple serving cells sharing the same timing advance (multiple serving cells grouped in one TAG);
- A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell;
- A non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated. The maximum number of configured CCs for a UE is 16 for DL and 16 for UL.

Some agreements related to multiple transmission and reception points (TRPs) are quoted below from R1-1913604.

Agreement

TCI indication framework shall be enhanced in Rel-16 at least for eMBB:
  Each TCI code point in a DCI can correspond to 1 or 2 TCI states
    When 2 TCI states are activated within a TCI code point, each TCI state corresponds to one CDM group, at least for DMRS type 1
      FFS design for DMRS type 2

Agreement

For multi-TRP specification support for URLLC, support at least one of following schemes for transmitting the same transport block from multiple TRPs. Study following schemes for further down-selection for one or more schemes in next meetings
  Scheme 1 (SDM): n ($n<=N_s$) TCI states within the single slot, with overlapped time and frequency resource allocation
  Scheme 2 (FDM): n ($n<=N_f$) TCI states within the single slot, with non-overlapped frequency resource allocation
  Scheme 3 (TDM): n ($n<=N_{t1}$) TCI states within the single slot, with non-overlapped time resource allocation
  Scheme 4 (TDM): n ($n<=N_{t2}$) TCI states with K different slots.

Agreement

For multi-DCI based multi-TRP/panel transmission, the total number of CWs in scheduled PDSCHs, each of which is scheduled by one PDCCH, is up to 2.

Agreement

For a UE supporting multiple-PDCCH based multi-TRP/panel transmission and each PDCCH schedules one PDSCH, at least for eMBB with non-ideal backhaul, support following restrictions:
  The UE may be scheduled with fully/partially/non-overlapped PDSCHs at time and frequency domain by multiple PDCCHs with following restrictions:
    The UE is not expected to assume different DMRS configuration with respect to actual number of front loaded DMRS symbol(s), the actual number of additional DMRS, the actual DMRS symbol location and DMRS configuration type if the UE may be scheduled with full/partially overlapping PDSCHs by multiple PDCCHs.
    The UE is not expected to have more than one TCI index with DMRS ports within the same CDM group for fully/partially overlapped PDSCHs
    Full scheduling information for receiving a PDSCH is indicated and carried only by the corresponding PDCCH.
    The UE is expected to be scheduled with the same active BWP bandwidth and the same SCS if the UE is expected to receive multiple PDSCHs simultaneously at given symbols.
    The number of active BWPs for a UE is 1 per CC Agreement For TCI state configuration in order to enable one or two TCI states per a TCI code point,
  MAC-CE enhancement to map one or two TCI states for a TCI code point where further detailed design is determined in RAN2.

Agreement

To support multiple-PDCCH based multi-TRP/panel transmission with intra-cell (same cell ID) and inter-cell (different Cell IDs), following RRC configuration can be used to link multiple PDCCH/PDSCH pairs with multiple TRPs
  one CORESET in a "PDCCH-config" corresponds to one TRP
    FFS whether to increase the number of CORESETs per "PDCCH-config" more than 3

Agreement

For PDCCH monitoring and blind decoding for multi-DCI based multi-TRP/panel transmission,
  Increase the maximal number of CORESETs per "PDCCH-config" up to N=[4, 5, or 6] subject to UE capability
  Increase the maximal number of BD/CCE per slot per serving cell, subject to UE capability Agreement For multi-PDCCH based multi-TRP operation, increase the maximum number of CORESETs per "PDCCH-config" to 5, according to UE capability Agreement For single-DCI based M-TRP URLLC scheme 2a and 2b:
The number of TCI states is 2
Support up to 2 transmission layers for scheme 2a Agreement For single-DCI based M-TRP URLLC scheme 3 & 4
The maximum number of TCI states is 2
Resource allocation in time domain:
   Support same number of consecutive symbols scheduled for transmission occasion
   For scheme 3
      All transmission occasions are in a single slot by NW implementation without dropping.
      FFS for DL/UL switching within the slot Agreement For single-DCI based M-TRP URLLC scheme 2a and 2b support following design:
   Comb-like frequency resource allocation between/among TRPs. For wideband PRG, first
   [N_RB/2] RBs are assigned to TCI state 1 and the remaining [N_RB/2] RBs are assigned to TCI state 2. For PRG size=2 or 4, even PRGs within the allocated FDRA are assigned to TCI state 1 and odd PRGs within the allocated FDRA are assigned to TCI state 2.

Agreement

For schemes 3 and 4, the maximum number of transmission layers per TRP is up to 2
The supported maximum TBS size is dependent on UE capability Agreement PDSCH repetition indication mechanism:
For indication on the number of repetition occasions for scheme 3, select one of the following dynamic indication methods in RAN1 #98bis
   Option 1: It is dynamically indicated e.g. by reusing the proposed indication mechanism for PUSCH repetition in eURLLC
   Option 2: It is implicitly determined by the number of TCI states indicated by a code point whereas one TCI state means one repetition and two states means two repetitions
For indication on the number of repetition occasions for scheme 4, select one of the following in RAN1 #98bis
   Option 1: It is dynamically indicated
   Option 2: By high-layer signaling following Rel-15 mechanism Agreement With regarding to PUCCH resource group for M-DCI NCJT transmission, select one of following options in RAN1 #98bis
   Option 1: Support configuring explicit PUCCH resource grouping over resource or resource sets Option 2: Support implicit PUCCH resource grouping up to NW implementation whereas PUCCH may or may not be overlapped.

Agreement

For multi-PDCCH based multi-TRP operation, the maximum number of CORESETs that can be configured with the same TRP (i.e. same higher layer index configured per CORESET (if configured) per "PDCCH-Config") is up to UE capability, including at least a candidate value of 3.

Agreement

For multi-DCI based multi-TRP transmission with separate ACK/NACK feedback
   UE is allowed to transmit two TDMed long PUCCHs within a slot
   UE is allowed to transmit TDMed short PUCCH and long PUCCH within a slot
   UE is allowed to transmit TDMed short PUCCH and short PUCCH within a slot Agreement When 2 TCI states are indicated by a TCI code point, at least for DMRS type 1 and type 2 for eMBB, if indicated DMRS ports are from two CDM groups,
   the first TCI state is applied to the first indicated CDM group
   the second TCI state is applied to the second indicated CDM group Agreement For single-DCI based M-TRP URLLC schemes 2a/2b/3/4, indicated DMRS ports are from one CDM group.

Agreement on PDSCH repetition indication mechanism:
For indication on the number of transmission occasions for scheme 3, select one of the following dynamic indication methods in RAN1 #98bis
   Option 1: It is dynamically indicated
      Option 1-1: reusing the indication mechanism for PUSCH repetition in eURLLC
      Option 1-2: TDRA indication is enhanced to additionally indicate the number and symbol locations of PDSCH transmission occasions by using PDSCH-TimeDomainResourceAllocation field.
      Option 1-3: it is determined by the allocated PDSCH length L using pre-defined value (e.g. 2 for L=4 or 7, 2/4/6 for L=2. FFS: how to associate a pre-defined value of 2/4/6 with the starting symbol S)
   Option 2: It is implicitly determined by the number of TCI states indicated by a code point whereas one TCI state means one repetition and two states means two repetitions.
   Option 3: The total number of repetitions is determined by X times the number of TCI states Y indicated by a code point, i.e. X*Y
      If X=1, one TCI state implies one transmission occasion and two TCI states means two transmission occasions
      FFS: whether/how X>1 to be supported
   For above options, the symbol locations corresponding to different transmission occasions can be further discussed taking into account DL/UL switching.
For indication on the number of transmission occasions for scheme 4, select one of the following in RAN1 #98bis
   Option 1: TDRA indication is enhanced to additionally indicate the number and symbol locations of PDSCH transmission occasions by using PDSCH-TimeDomainResourceAllocation field.
   Option 2: By high-layer signaling following Rel-15 mechanism Agreement The candidate values of higher layer parameter HigherLayerindexPerCORESET are [0:1:M],
M=1

Agreement

For M-DCI NCJT transmission, each PUCCH resource may be associated with a value of higher layer index per CORESET Agreement When 2 TCI states are indicated by a TCI code point, for DMRS type 1 and type 2 for eMBB and URLLC scheme-1a, if indicated DMRS ports are from two CDM groups, the first TCI state corresponds to the CDM group of the first antenna port indicated by the antenna port indication table.

Agreement

For single-PDCCH based multi-TRP/Panel transmission, the number of bits of TCI field in DCI is 3 if higher layer parameter tci-PresentInDCI is enabled.

Agreement

For single-DCI based M-TRP URLLC scheme 2b

The RBs allocated to the PDSCH associated with the first TCI state in the TCI code point are used for TBS determination with single MCS indication, while same TBS and modulation order can be assumed for the RBs allocated to PDSCH associated with the second TCI state.

Agreement

Capture the following in the reply LS to RAN2 on single PDCCH based mTRP operation. LS is endorsed in R1-1911550.

For question 1 from RAN2

Answer: From RAN1 perspective, MAC CE based enhancement is preferred so that the pairing of the TCI states can be flexible. Each TCI state can be dynamically paired with another TCI state, assuming dynamic here means pairing via MAC-CE. From RAN1 perspective, some restrictions on pairing may be introduced but this will not impact RAN2 work.

For question 2 from RAN2, the following agreement has been made. To be used as answer of question 2

Agreement

The maximum number of activated TCI states in mTRP operation is 8. The number of bits of TCI field in DCI is 3 if higher layer parameter tci-PresentInDCI is enabled. The total number of simultaneously activated TCI states is up to 8.

Agreement

For single-DCI based M-TRP URLLC schemes, the number of transmission occasions is indicated by following:

For scheme 3, the number of transmission occasions is implicitly determined by the number of TCI states indicated by a code point whereas one TCI state means one transmission occasion and two states means two transmission occasions.

For scheme 4, TDRA indication is enhanced to additionally indicate the number of PDSCH transmission occasions by using PDSCH-TimeDomainResourceAllocation field.

The maximum number of repetition is FFS.

Agreement

For single-DCI based M-TRP URLLC scheme 3, the starting symbol of the second transmission occasion has K symbol offset relative to the last symbol of the first transmission occasion, whereas the value of K can be optionally configured by RRC. If not configured, K=0.

The starting symbol and length of the first transmission occasion is indicated by SLIV.

The length of the second transmission occasion is the same with the first transmission occasion.

Agreement

For single-DCI based M-TRP URLLC scheme 4, the same value of SLIV is applied to all transmission occasions.

Agreement

For single-DCI based M-TRP URLLC scheme 4, for TCI state mapping to PDSCH transmission occasions, Both options 1 and 2 are supported and switched by RRC signalling Option 1: support Cyclical mapping, e.g. TCI states #1#2#1#2 are mapped to 4 transmission occasions if 2 TCI stats are indicated Option 2: support Sequential mapping, e.g. TCI states #1#1#2#2 are mapped to 4 transmission occasions if 2 TCI stats are indicated For more than 4 transmission occasions, above is repeated (for example, 8 transmission occasion in case of option 2: #1#1#2#2#1#1#2#2)

Agreement

For single-DCI based M-TRP URLLC scheme differentiation among schemes 2a/2b/3, from the UE perspective:

A new RRC parameter is introduced to enable [one scheme/multiple schemes] among 2a/2b/3.

Agreement

If a UE is configured by higher layer parameter PDCCH-Config that contains two different values of CORESET-PoolIndex in ControlResourceSet for the active BWP of a serving cell, the UE may expect to receive multiple PDCCHs scheduling fully/partially/non-overlapped PDSCHs in time and frequency domain subject to UE capability Note: This allows a UE to be not configured with either joint HARQ ACK feedback or separate HARQ ACK feedback For the CORESET without CORESETPoolIndex, the UE may assume that the CORESET is assigned with CORESETPoolIndex as 0

Agreement

For single-DCI based M-TRP URLLC scheme 2b, support following RV sequence candidates:

(0, 2), (2, 3), (3, 1), (1, 0)

Agreement

Support the PT-RS resource element mapping which is independently determined by allocated PRB resources associated to each TCI state.

Applies for scheme 2a and 2b only

Agreement

The frequency density of the PTRS is determined by the number of PRBs associated to each TCI state Applies for scheme 2a and 2b only Agreement For scheme 3, candidate values of StartingSymbolOffsetK are 0~7

Agreement

For single-DCI based M-TRP URLLC scheme 4, the candidate values of URLLCRepNum is up to 16

Agreement

For single-DCI based M-TRP, URLLC schemes 2a/2b/3 can be differentiated by the following:

when higher layer parameter URLLSchemeEnabler is configured, it is set to enable one scheme semi-statically among schemes 2a, 2b and 3, if schemes are supported;

Agreement

The maximum total number of configured CORESETs per cell (across BWPs) is 16

Agreement

Send LS to RAN2 as a response to R1-1911803. The LS is endorsed in R1-1913446.

Question 1. Does the total number of CORESETs per cell need to be increased from current 12 corresponding to 3 CORESETs per BWP?

RAN1 Answer1: The maximum total number of configured CORESETs per cell (across BWPs) is 16

Question 2. Does RAN1 think the current operation is sufficient for mPDCCH mTRP operation?

RAN1 Answer 2: RAN1 would like to support 8 activated TCI states per TRP, i.e. per CORESETPoolIndex. The total number of activated TCI states that a UE supports is subject to UE capability. Further detailed design is up to RAN2.

Question 3. RAN2 would like to ask RAN1 for confirmation that the understanding in RAN2 agreements is correct.

RAN1 Answer 3: RAN1 would like to confirm that the understanding in RAN2 agreements is correct Agreement For single-DCI based M-TRP URLLC scheme 4, support candidate values of URLLCRepNum with:

{2,3,4,5,6,7,8,16}

Agreement

Following TCI state and joint schemes are supported

| | TCI states | CDM groups | URLLCRepNum | URLLCSchemeEnabler | UE Behavior |
|---|---|---|---|---|---|
| 0 (in spec draft) | 1 | >=1 | Not applicable | Not applicable | Rel 15 |
| A (one scheme) | 1 | 1 | Condition 1 | Configured or not configured | "Scheme 4" with repetition from the same TRP Limitations agreed for Scheme 4 apply |
| A' (one scheme) | 1 | >=1 | Condition 2 | Not configured | Rel 15 |
| B (in spec draft) | 2 | 1 | Condition 1 | Not configured | Scheme 4 |
| C (in spec draft) | 2 | 2 | Condition 2 | Not configured | 1a/NCJT |
| E (in spec draft) | 2 | 2 | Condition 4 | Not configured | 1a/NCJT |
| F (in spec draft) | 2 | 1 | Condition 4 | Configured | Scheme 2a/2b/3 |
| D'' (one scheme) | 2 | 2 | Condition 4 | Configured | 1a/NCJT |
| G' (one scheme) | 1 | >=1 | Condition 2 | Configured | Rel 15 |
| G (one scheme) | 1 | >=1 | Condition 4 | Configured | Rel 15 |

Note:
Condition 1: indicates one entry in pdsch-TimeDomainAllocationList containing URLLCRepNum (>1) in TDRA by DCI
Condition 2: indicates one entry in pdsch-TimeDomainAllocationList having no URLLCRepNum by DCI, but at least one entry having URLLCRepNum
Condition 4: None of entry in TDRA contains URLLCRepNum Agreement For a DL serving cell configured with multi-PDCCH based multi-TRP/panel transmission, in the case of PDCCH overbooking for PDCCH candidates monitoring for primary cell, if maximum number of BD/CCE per slot requiring a UE to monitor over CORESETs with same CORESETPoolIndex value is the same maximum number of BD/CCE over all configured CORESETs, Rel-15 overbooking is followed; otherwise Overbooking is only applicable to USS sets associated with the CORESET(s) that are configured with CORESETPoolIndex =0 if CORESETPoolIndex is configured.

Agreement

For multi-DCI based multi-TRP/panel transmission, if CORESETPoolIndex is configured, If the time offset between the reception of the PDCCH and the corresponding PDSCH is less than a threshold, UE could assume that the DM-RS ports of PDSCH are QCL-ed with the RS(s) with respect to the QCL parameter(s) used for PDCCH of the lowest CORESET index among CORESETs configured with the same value of CORESETPoolIndex, in the respective latest slot in which one or more CORESETs associated with each of CORESETPoolIndex within the active BWP of the serving cell are monitored by the UE The support of this feature is indicated by UE capability If the UE does not support the above feature, Rel-15 behavior is reused regardless of CORESETPoolIndex Agreement For single-DCI based Multi-TRP/panel transmission with at least one configured TCI states for the serving cell of scheduled PDSCH containing 'QCL-TypeD', If the offset between the reception of the PDCCH and the corresponding PDSCH is less than timeDurationForQCL and after the reception of activation command of TCI states for UE specific PDSCH, the UE may assume that DMRS ports of PDSCH follows QCL parameters indicated by default TCI state(s) as following:

Use the TCI-states corresponding to the lowest codepoint among the TCI codepoints containing two different TCI states which are activated for PDSCH.

If all the TCI codepoints are mapped to a single TCI state, then Rel-15 behavior is followed The support of this feature is part of UE capability.

Figure 6:
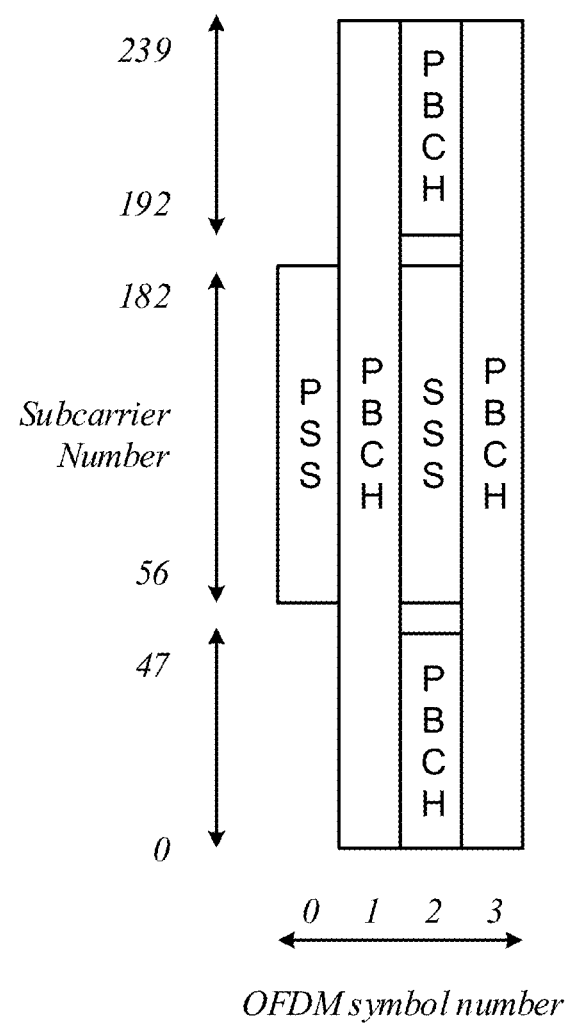
FIG. 6 is a diagram of a time-frequency structure of a Synchronization Signal block (SSB) according to one exemplary embodiment.
Figure 8:
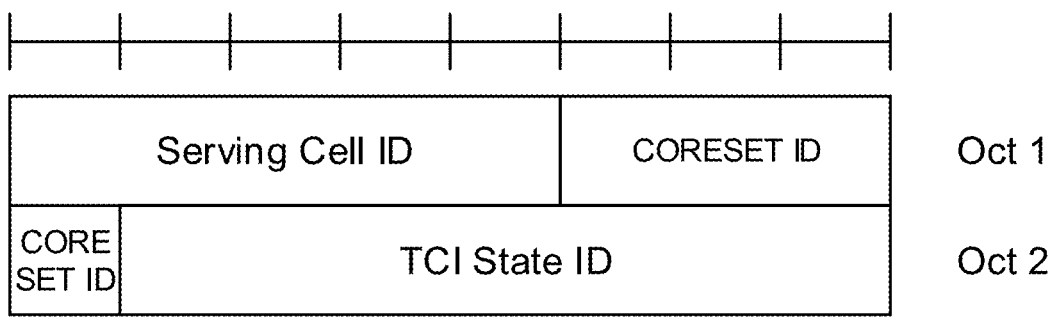
FIG. 8 is a diagram associated with TCI state indication according to one exemplary embodiment.

Some related texts associated with NR are quoted below from 3GPP TS 38.321 V15.8.0 (associated with Rel-15). Notably, FIG. 6.1.3.14-1 of Section 6.1.3.14 of 3GPP TS 38.321 V15.8.0, entitled "TCI States Activation/Deactivation for UE-specific PDSCH MAC CE", is reproduced herein as FIG. 7. FIG. 6.1.3.15-1 of Section 6.1.3.15 of 3GPP TS 38.321 V15.8.0, entitled "TCI State Indication for UE-specific PDCCH MAC CE", is reproduced herein as FIG. 8.

5.18.4 Activation/Deactivation of UE-Specific PDSCH TCI State

The network may activate and deactivate the configured TCI states for PDSCH of a Serving Cell by sending the TCI States Activation/Deactivation for UE-specific PDSCH MAC CE described in clause 6.1.3.14. The configured TCI states for PDSCH are initially deactivated upon configuration and after a handover.

The MAC entity shall:

1> if the MAC entity receives a TCI States Activation/Deactivation for UE-specific PDSCH MAC CE on a Serving Cell:

2> indicate to lower layers the information regarding the TCI States Activation/Deactivation for UE-specific PDSCH MAC CE.

5.18.5 Indication of TCI State for UE-Specific PDCCH

The network may indicate a TCI state for PDCCH reception for a CORESET of a Serving Cell by sending the TCI State Indication for UE-specific PDCCH MAC CE described in clause 6.1.3.15.

The MAC entity shall:
1>if the MAC entity receives a TCI State Indication for UE-specific PDCCH MAC CE on a Serving Cell:
2>indicate to lower layers the information regarding the TCI State Indication for UE-specific PDCCH MAC CE.

6.1.3.14 TCI States Activation/Deactivation for UE-Specific PDSCH MAC CE

The TCI States Activation/Deactivation for UE-specific PDSCH MAC CE is identified by a MAC subheader with LCID as specified in Table 6.2.1-1. It has a variable size consisting of following fields:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in TS 38.212 [9]. The length of the BWP ID field is 2 bits;

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;

R: Reserved bit, set to 0.

FIG. 6.1.3.14-1: TCI States Activation/Deactivation for UE-specific PDSCH MAC CE 6.1.3.15 TCI State Indication for UE-specific PDCCH MAC CE The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

FIG. 6.1.3.15-1: TCI State Indication for UE-specific PDCCH MAC CE

Figure 9:
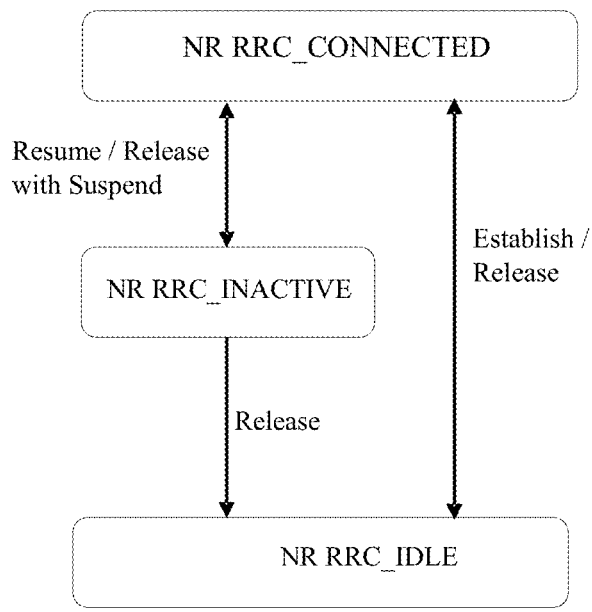
FIG. 9 is a diagram illustrating an exemplary scenario associated with UE state machine and/or state transitions according to one exemplary embodiment.
Figure 10:
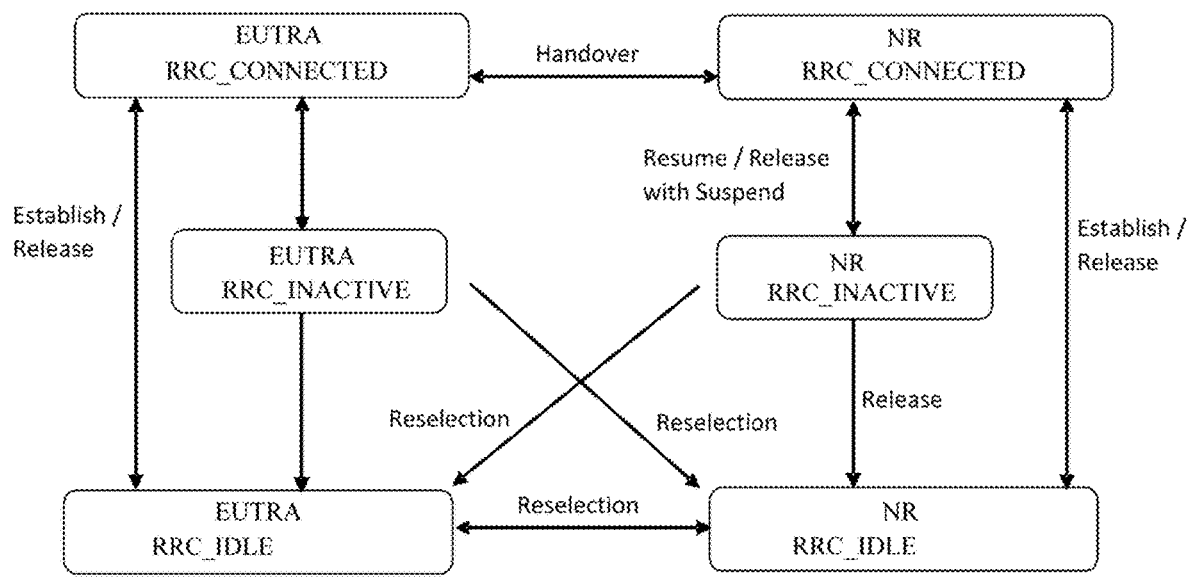
FIG. 10 is a diagram illustrating an exemplary scenario associated with UE state machine and/or state transitions according to one exemplary embodiment.

Some related texts associated with NR are quoted below from 3GPP TS 38.331 V15.8.0 (associate with Rel-15). Notably, FIG. 4.2.1-1 of Section 4.2.1 of 3GPP TS 38.331 V15.8.0, entitled "UE state machine and state transitions in NR", is reproduced herein as FIG. 9. FIG. 4.2.1-2 of Section 4.2.1 of 3GPP TS 38.331 V15.8.0, entitled "UE state machine and state transitions between NR/5GC, E-UTRA/EPC and E-UTRA/5GC", is reproduced herein as FIG. 10.

4.2.1 UE States and State Transitions Including Inter RAT

A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:

RRC_IDLE:
A UE specific DRX may be configured by upper layers;
UE controlled mobility based on network configuration;
The UE:
Monitors Short Messages transmitted with P-RNTI over DCI (see clause 6.5);
Monitors a Paging channel for CN paging using 5G-S-TMSI;
Performs neighbouring cell measurements and cell (re-)selection;
Acquires system information and can send SI request (if configured).

RRC_INACTIVE:
A UE specific DRX may be configured by upper layers or by RRC layer;
UE controlled mobility based on network configuration;
The UE stores the UE Inactive AS context;
A RAN-based notification area is configured by RRC layer;
The UE:
Monitors Short Messages transmitted with P-RNTI over DCI (see clause 6.5);
Monitors a Paging channel for CN paging using 5G-S-TMSI and RAN paging using fullI-RNTI;
Performs neighbouring cell measurements and cell (re-)selection;
Performs RAN-based notification area updates periodically and when moving outside the configured RAN-based notification area;
Acquires system information and can send SI request (if configured).

RRC_CONNECTED:
The UE stores the AS context;
Transfer of unicast data to/from UE;
At lower layers, the UE may be configured with a UE specific DRX;
For UEs supporting CA, use of one or more SCells, aggregated with the SpCell, for increased bandwidth;
For UEs supporting DC, use of one SCG, aggregated with the MCG, for increased bandwidth;
Network controlled mobility within NR and to/from E-UTRA;

The UE:
- Monitors Short Messages transmitted with P-RNTI over DCI (see clause 6.5), if configured;
- Monitors control channels associated with the shared data channel to determine if data is scheduled for it;
- Provides channel quality and feedback information;
- Performs neighbouring cell measurements and measurement reporting;
- Acquires system information.

FIG. 4.2.1-1 illustrates an overview of UE RRC state machine and state transitions in NR. A UE has only one RRC state in NR at one time.

FIG. 4.2.1-1: UE state machine and state transitions in NR

FIG. 4.2.1-2 illustrates an overview of UE state machine and state transitions in NR as well as the mobility procedures supported between NR/5GC E-UTRA/EPC and E-UTRA/5GC.

FIG. 4.2.1-2: UE state machine and state transitions between NR/5GC, E-UTRA/EPC and E-UTRA/5GC ControlResourceSet The IE ControlResourceSet is used to configure a time/frequency control resource set (CORESET) in which to search for downlink control information (see TS 38.213 [13], clause 10.1).

| ControlResourceSet information element |
|---|

```
-- ASN1START
-- TAG-CONTROLRESOURCESET-START
ControlResourceSet ::=              SEQUENCE {
    controlResourceSetId               ControlResourceSet Id,
    frequencyDomainResources           BIT STRING (SIZE (45)),
    duration                           INTEGER
(1..maxCoReSetDuration),
    cce-REG-MappingType                CHOICE {
        interleaved                        SEQUENCE {
            reg-BundleSize                     ENUMERATED {n2, n3, n6},
            interleaverSize                    ENUMERATED {n2, n3, n6},
            shiftIndex
INTEGER (0..maxNrofPhysicalResourceBlocks-1)   OPTIONAL -- Need S
        },
        nonInterleaved                     NULL
    },
    precoderGranularity                ENUMERATED {sameAsREG-bundle, allContiguousRBs},
    tci-StatesPDCCH-ToAddList          SEQUENCE(SIZE (1..maxNrofTCI-StatesPDCCH)) OF TCI-StateId OPTIONAL, -- Cond NotSIB1-initialBWP
    tci-StatesPDCCH-ToReleaseList      SEQUENCE(SIZE (1..maxNrofTCI-StatesPDCCH)) OF TCI-StateId OPTIONAL, -- Cond NotSIB1-initialBWP
    tci-PresentInDCI                   ENUMERATED {enabled}
OPTIONAL, -- Need S
    pdcch-DMRS-ScramblingID            INTEGER (0..65535)
OPTIONAL, -- Need S
    ...
}
-- TAG-CONTROLRESOURCESET-STOP
-- ASN1STOP
```

| ControlResourceSet field descriptions |
|---|
| controlResourceSetId |
| Value 0 identifies the common CORESET configured in MIB and in ServingCellConfigCommon (controlResourceSetZero) and is hence not used here in the ControlResourceSet IE. Values |

| ControlResourceSet field descriptions |
|---|
| 1 . . . maxNrofControlResourceSets-1 identify CORESETs configured by dedicated signalling or in SIB1. The controlResourceSetId is unique among the BWPs of a serving cell. tci-PresentInDCI |
| This field indicates if TCI field is present or absent in DL-related DCI. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5). tci-StatesPDCCH-ToAddList |
| A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. |

BWP-DownlinkDedicated

The IE BWP-DownlinkDedicated is used to configure the dedicated (UE specific) parameters of a downlink BWP.

| BWP-DownlinkDedicated information element |
|---|

```
-- ASN1START
-- TAG-BWP-DOWNLINKDEDICATED-START
BWP-DownlinkDedicated ::=    SEQUENCE {
    pdcch-Config                 SetupRelease { PDCCH-Config }
```

-continued

| BWP-DownlinkDedicated information element | |
|---|---|
| OPTIONAL, -- Need M | |
| pdsch-Config | SetupRelease { PDSCH-Config } |
| OPTIONAL, -- Need M | |
| sps-Config | SetupRelease { SPS-Config } |
| OPTIONAL, -- Need M | |
| radioLinkMonitoringConfig | SetupRelease { |
| RadioLinkMonitoringConfig } | OPTIONAL, - |
| - Need M | |
| ... | |
| } | |
| -- TAG-BWP-DOWNLINKDEDICATED-STOP | |
| -- ASN1STOP | |

ControlResourceSetId

The ControlResourceSetId IE concerns a short identity, used to identify a control resource set within a serving cell. The ControlResourceSetId =0 identifies the ControlResourceSet#0 configured via PBCH (MIB) and in controlResourceSetZero (ServingCellConfigCommon). The ID space is used across the BWPs of a Serving Cell. The number of CORESETs per BWP is limited to 3 (including common and UE-specific CORESETs).

| ControlResourceSetId information element |
|---|
| -- ASN1START |
| -- TAG-CONTROLRESOURCESETID-START |
| ControlResourceSetId ::=     INTEGER (0..maxNrofControlResourceSets-1) |
| -- TAG-CONTROLRESOURCESETID-STOP |
| -- ASN1STOP |

PDSCH-Config

The PDSCH-Config IE is used to configure the UE specific PDSCH parameters.

| PDSCH-Config information element | |
|---|---|
| -- ASN1START | |
| -- TAG-PDSCH-CONFIG-START | |
| PDSCH-Config ::= | SEQUENCE { |
| dataScramblingIdentityPDSCH | INTEGER (0..1023) |
| OPTIONAL, -- Need S | |
| tci-StatesToAddModList | SEQUENCE |
| (SIZE(1..maxNrofTCI-States)) OF TCI-State | OPTIONAL, |
| -- Need N | |
| tci-StatesToReleaseList | SEQUENCE |
| (SIZE(1..maxNrofTCI-States)) OF TCI-StateId | OPTIONAL, |
| -- Need N | |
| resourceAllocation | ENUMERATED { |
| resourceAllocationType0, resourceAllocationType1, dynamicSwitch}, | |
| pdsch-TimeDomainAllocationList | SetupRelease { PDSCH- |
| TimeDomainResourceAllocationList } | OPTIONAL, -- Need M |
| pdsch-AggregationFactor | ENUMERATED { n2, n4, n8 } |
| OPTIONAL, -- Need S | |
| } | |
| -- TAG-PDSCH-CONFIG-STOP | |
| -- ASN1STOP | |

| PDSCH-Config field descriptions |
|---|
| pdsch-AggregationFactor |
| Number of repetitions for data (see TS 38.214 [19], clause 5.1.2.1). When the field is absent the UE applies the value 1. |
| pdsch-TimeDomainAllocationList |
| List of time-domain configurations for timing of DL assignment to DL data (see table 5.1.2.1.1-1 in TS 38.214 [19]). |
| resourceAllocation |
| Configuration of resource allocation type 0 and resource allocation type 1 for non-fallback DCI (see TS 38.214 [19], clause 5.1.2.2). |
| tci-StatesToAddModList |
| A list of Transmission Configuration Indicator (TCI) states indicating a transmission configuration which includes QCL-relationships between the DL RSs in one RS set and the PDSCH DMRS ports (see TS 38.214 [19], clause 5.1.5). |

TCI-State

The IE TCI-State associates one or two DL reference signals with a corresponding quasi-colocation (QCL) type.

TCI-State information element

```
-- ASN1START
-- TAG-TCI-STATE-START
TCI-State ::=                    SEQUENCE {
    tci-StateId                  TCI-StateId,
    qcl-Type1                    QCL-Info,
    qcl-Type2                    QCL-Info
OPTIONAL, -- Need R
    ...
}
QCL-Info ::=                     SEQUENCE {
    cell                         ServCellIndex
OPTIONAL, -- Need R
    bwp-Id                       BWP-Id
OPTIONAL, -- Cond CSI-RS-Indicated
    referenceSignal              CHOICE {
        csi-rs                   NZP-CSI-RS-ResourceId,
        ssb                      SSB-Index
    },
    qcl-Type                     ENUMERATED {typeA, typeB,
typeC, typeD},
    ...
}
-- TAG-TCI-STATE-STOP
-- ASN1STOP
```

QCL-Info field descriptions bwp-Id

The DL BWP which the RS is located in.

cell

The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5.

referenceSignal

Reference signal with which quasi-collocation information is provided as specified in TS 38.214 [19] subclause 5.1.5.

qcl-Type

QCL type as specified in TS 38.214 [19] subclause 5.1.5.

TCI-StateId

The IE TCI-StateId is used to identify one TCI-State configuration.

TCI-StateId information element

```
-- ASN1START
-- TAG-TCI-STATEID-START
TCI-StateId ::=                  INTEGER (0..maxNrofTCI-States-1)
-- TAG-TCI-STATEID-STOP
-- ASN1STOP
```

PDCCH-Config

The IE PDCCH-Config is used to configure UE specific PDCCH parameters such as control resource sets (CORE-SET), search spaces and additional parameters for acquiring the PDCCH. If this IE is used for the scheduled cell in case of cross carrier scheduling, the fields other than searchSpacesToAddModList and searchSpacesToReleaseList are absent.

PDCCH-Config information element

```
-- ASN1START
-- TAG-PDCCH-CONFIG-START
PDCCH-Config ::=                         SEQUENCE {
    controlResourceSetToAddModList       SEQUENCE(SIZE (1..3)) OF
ControlResourceSet                       OPTIONAL, -- Need N
    controlResourceSetToReleaseList      SEQUENCE(SIZE (1..3)) OF
ControlResourceSetId                     OPTIONAL, -- Need N
    searchSpacesToAddModList             SEQUENCE(SIZE (1..10)) OF
SearchSpace                              OPTIONAL, -- Need N
    searchSpacesToReleaseList            SEQUENCE(SIZE (1..10)) OF
SearchSpaceId                            OPTIONAL, -- Need N
}
-- TAG-PDCCH-CONFIG-STOP
-- ASN1STOP
```

PDCCH-Config field descriptions controlResourceSetToAddModList

List of UE specifically configured Control Resource Sets (CORESETs) to be used by the UE. The network configures at most 3 CORESETs per BWP per cell (including UE-specific and common CORESETs). In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon.

searchSpacesToAddModList

List of UE specifically configured Search Spaces. The network configures at most 10 Search Spaces per BWP per cell (including UE-specific and common Search Spaces).

Some related texts associated with NR are quoted below from 3GPP TS 38.211 V15.8.0 (associated with Rel-15):

4.4.5 Bandwidth Part

A bandwidth part is a subset of contiguous common resource blocks defined in subclause 4.4.4.3 for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part shall fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index μ may be dropped from $N_{BWP,i}^{start,\mu}$, $N_{BWP,i}^{size,\mu}$, $N_{grid,x}^{start,\mu}$, and $N_{grid,x}^{size,\mu}$.

Some related texts associated with NR are quoted below from 3GPP TS 38.213 V15.8.0 (associated with Rel-15):

10.1 UE procedure for determining physical downlink control channel assignment

For each DL BWP configured to a UE in a serving cell, a UE can be provided by higher layer signalling with P≤3 CORESETs. For each CORESET, the UE is provided the following by ControlResourceSet:
- a CORESET index p, 0 <p <12, by controlResourceSetId;
- a DM-RS scrambling sequence initialization value by pdcch-DMRS-ScramblingID;
- a precoder granularity for a number of REGs in the frequency domain where the UE can assume use of a same DM-RS precoder by precoderGranularity;
- a number of consecutive symbols provided by duration;
- a set of resource blocks provided by frequencyDomainResources;
- CCE-to-REG mapping parameters provided by cce-REG-MappingType;
- an antenna port quasi co-location, from a set of antenna port quasi co-locations provided by TCI-State, indicating quasi co-location information of the DM-RS antenna port for PDCCH reception in a respective CORESET;
- an indication for a presence or absence of a transmission configuration indication (TCI) field for DCI format 1_1 transmitted by a PDCCH in CORESET p, by tci-PresentInDCI.

For a CORESET other than a CORESET with index 0,
if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [11, TS 38.321], the UE assumes that the DM-RS antenna port associated with PDCCH receptions is quasi co-located with the SS/PBCH block the UE identified during the initial access procedure;
if a UE has been provided a configuration of more than one TCI states by tci-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

For a CORESET with index 0, the UE assumes that a DM-RS antenna port for PDCCH receptions in the CORESET is quasi co-located with
- the one or more DL RS configured by a TCI state, where the TCI state is indicated by a MAC CE activation command for the CORESET, if any, or
- a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that QCL-TypeD of a CSI-RS in a TCI state indicated by a MAC CE activation command for the CORESET is provided by a SS/PBCH block if the UE receives a MAC CE activation command for one of the TCI states, the UE applies the activation command in the first slot that is after slot $k+3 \cdot N_{slot}^{subframe,\mu}$ where k is the slot where the UE would transmit a PUCCH with HARQ-ACK information for the PDSCH providing the activation command and μ is the SCS configuration for the PUCCH. The active BWP is defined as the active BWP in the slot when the activation command is applied.

For each DL BWP configured to a UE in a serving cell, the UE is provided by higher layers with S≤10 search space sets where, for each search space set from the S search space sets, the UE is provided the following by SearchSpace:
- a search space set index $s$, 0≤s<40, by searchSpaceId
- an association between the search space set $s$ and a CORESET p by controlResourceSetId
- a PDCCH monitoring periodicity of $k_s$ slots and a PDCCH monitoring offset of $o_s$ slots, by monitoringSlotPeriodicityAndOffset
- a PDCCH monitoring pattern within a slot, indicating first symbol(s) of the CORESET within a slot for PDCCH monitoring, by monitoringSymbolsWithinSlot
- a duration of $T_2<k_s$ slots indicating a number of slots that the search space set $s$ exists by duration
- a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively an indication that search space set s is either a CSS set or a USS set by searchSpaceType if search space set $_s$ is a CSS set
- an indication by dci-Format0-0-AndFormat1-0 to monitor PDCCH candidates for DCI format 0_0 and DCI format 1_0
- an indication by dci-Format2-0 to monitor one or two PDCCH candidates for DCI format 2_0 and a corresponding CCE aggregation level
- an indication by dci-Format2-1 to monitor PDCCH candidates for DCI format 2_1
- an indication by dci-Format2-2 to monitor PDCCH candidates for DCI format 2_2
- an indication by dci-Format2-3 to monitor PDCCH candidates for DCI format 2_3 if search space set $_s$ is a USS set, an indication by dci-Formats to monitor PDCCH candidates either for DCI format 0_0 and DCI format 1_0, or for DCI format 0_1 and DCI format 1_1

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in a USS, if the UE is not configured with a carrier indicator field, the UE monitors the PDCCH candidates without carrier indicator field. For an active DL BWP of a serving cell on which a UE monitors PDCCH candidates in a USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

Some related texts associated with NR are quoted below from 3GPP TS 38.212 V16.2.0 (associated with Rel-16):

TABLE 7.3.1-1

DCI formats

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |

7.3.1.2.1 Format 1_0

DCI format 1_0 is used for the scheduling of PDSCH in one DL cell.

The following information is transmitted by means of the DCI format 1_0 with CRC scrambled by C-RNTI or CS-RNTI or MCS-C-RNTI:

Identifier for DCI formats—1 bits
  The value of this bit field is always set to 1, indicating a DL DCI format
Frequency domain resource assignment—[$\log_2(N_{RB}^{DL,BWP}(N_{RB}^{DL,BWP}+1)/2)$]bits where $N_{RB}^{DL,BWP}$ is given by clause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex in Clause 5.1.2 of [8, TS38.321]
UL/SUL indicator—1 bit. If the value of the "Random Access Preamble index" is not all zeros and if the UE is configured with supplementary Uplink in ServingCellConfig in the cell, this field indicates which UL carrier in the cell to transmit the PRACH according to Table 7.3.1.1.1-1; otherwise, this field is reserved
SS/PBCH index—6 bits. If the value of the "Random Access Preamble index" is not all zeros, this field indicates the SS/PBCH that shall be used to determine the RACH occasion for the PRACH transmission; otherwise, this field is reserved.
PRACH Mask index—4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved
Reserved bits—12 bits for operation in a cell with shared spectrum channel access; otherwise 10 bits Otherwise, all remaining fields are set as follows:
Time domain resource assignment—4 bits as defined in Clause 5.1.2.1 of [6, TS 38.214]
VRB-to-PRB mapping—1 bit according to Table 7.3.1.2.2-5
Modulation and coding scheme—5 bits as defined in Clause 5.1.3 of [6, TS 38.214]
New data indicator—1 bit
Redundancy version—2 bits as defined in Table 7.3.1.1.1-2
HARQ process number—4 bits
Downlink assignment index—2 bits as defined in Clause 9.1.3 of [5, TS 38.213], as counter DAI
TPC command for scheduled PUCCH—2 bits as defined in Clause 7.2.1 of [5, TS 38.213]
PUCCH resource indicator—3 bits as defined in Clause 9.2.3 of [5, TS 38.213]
PDSCH-to-HARQ_feedback timing indicator—3 bits as defined in Clause 9.2.3 of [5, TS38.213]
ChannelAccess-CPext—2 bits indicating combinations of channel access type and CP extension as defined in Table 7.3.1.1.1-4 for operation in a cell with shared spectrum channel access; 0 bits otherwise 7.3.1.2.2 Format 1_1

DCI format 1_1 is used for the scheduling of PDSCH in one cell.

The following information is transmitted by means of the DCI format 1_1 with CRC scrambled by C-RNTI or CS-RNTI or MCS-C-RNTI:

Identifier for DCI formats—1 bits
  The value of this bit field is always set to 1, indicating a DL DCI format
Carrier indicator—0 or 3 bits as defined in Clause 10.1 of [5, TS 38.213].
Bandwidth part indicator—0, 1 or 2 bits as determined by the number of DL BWPs $n_{BWP,RRC}$ configured by higher layers, excluding the initial DL bandwidth part. The bitwidth for this field is determined as ⌈$\log_2(n_{BWP})$⌉ bits, where $n_{BWP}=n_{BWP,PRC}+1$ if $n_{BWP,RRC}\leq3$, in which case the bandwidth part indicator is equivalent to the ascending order of the higher layer parameter BWP-Id; otherwise $n_{BWP}=n_{BWP,RRC}$, in which case the bandwidth part indicator is defined in Table 7.3.1.1.2-1; If a UE does not support active BWP change via DCI, the UE ignores this bit field.

Frequency domain resource assignment—number of bits determined by the following, where $N_{RB}^{DL,BWP}$ is the size of the active DL bandwidth part:
  $N_{RBG}$ bits if only resource allocation type 0 is configured, where $N_{RBG}$ is defined in Clause 5.1.2.2.1 of [6, TS38.214],
  $\lceil \log_2(N_{RB}^{DL,BWP}(N_{RB}^{DL,BWP}+1)/2) \rceil$ bits if only resource allocation type 1 is configured, or
  $\max(\lceil \log_2(N_{RB}^{DL,BWP}(N_{RB}^{DL,BWP}1)/2) \rceil, N_{RBG})+1$ bits if both resource allocation type 0 and 1 are configured.
  If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  For resource allocation type 0, the $N_{RBG}$ LSBs provide the resource allocation as defined in Clause 5.1.2.2.1 of [6, TS 38.214].
  For resource allocation type 1, the $\lceil \log_2(N_{RB}^{DL,BWP}+1)/2 \rceil$ LSBs provide the resource allocation as defined in Clause 5.1.2.2.2 of [6, TS 38.214]

Time domain resource assignment—0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.

VRB-to-PRB mapping—0 or 1 bit:
  0 bit if only resource allocation type 0 is configured or if interleaved VRB-to-PRB mapping is not configured by high layers;
  1 bit according to Table 7.3.1.2.2-5 otherwise, only applicable to resource allocation type 1, as defined in Clause 7.3.1.6 of [4, TS 38.211].

PRB bundling size indicator—0 bit if the higher layer parameter prb-BundlingType is not configured or is set to 'staticBundling', or 1 bit if the higher layer parameter prb-BundlingType is set to 'dynamicBundling' according to Clause 5.1.2.3 of [6, TS 38.214].

Rate matching indicator—0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

ZP CSI-RS trigger—0, 1, or 2 bits as defined in Clause 5.1.4.2 of [6, TS 38.214]. The bitwidth for this field is determined as $\lceil \log_2(n_{ZP}+1) \rceil$ bits, where $n_{ZP}$ is the number of aperiodic ZP CSI-RS resource sets configured by higher layer.

For transport block 1:
  Modulation and coding scheme—5 bits as defined in Clause 5.1.3.1 of [6, TS 38.214]
  New data indicator—1 bit
  Redundancy version—2 bits as defined in Table 7.3.1.1.1-2

For transport block—2 (only present if maxNrofCodeWordsScheduledByDCI equals 2):
  Modulation and coding scheme—5 bits as defined in Clause 5.1.3.1 of [6, TS 38.214]
  New data indicator—1 bit
  Redundancy version—2 bits as defined in Table 7.3.1.1.1-2

HARQ process number—4 bits
TPC command for scheduled PUCCH—2 bits as defined in Clause 7.2.1 of [5, TS 38.213]
PUCCH resource indicator—3 bits as defined in Clause 9.2.3 of [5, TS 38.213]
PDSCH-to-HARQ_feedback timing indicator—0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataTo UL-ACK.
  Antenna port(s)—4, 5, or 6 bits as defined by Tables 7.3.1.2.2-1/2/3/4 and Tables 7.3.1.2.2-1A/2A/3A/4A, where the number of CDM groups without data of values 1, 2, and 3 refers to CDM groups {0}, {0,1}, and {0, 1,2} respectively. The antenna ports $\{P_0, \ldots, P_{v-1}\}$ shall be determined according to the ordering of DMRS port(s) given by Tables 7.3.1.2.2-1/2/3/4 or Tables 7.3.1.2.2-1A/2A/3A/4A. When a UE receives an activation command that maps at least one codepoint of DCI field 'Transmission Configuration Indication' to two TCI states, the UE shall use Table 7.3.1.2.2-1A/2A/3A/4A; otherwise, it shall use Tables 7.3.1.2.2-1/2/3/4. The UE can receive an entry with DMRS ports equals to 1000, 1002, 1003 when two TCI states are indicated in a codepoint of DCI field 'Transmission Configuration Indication' [and subject to UE capability].

Transmission configuration indication—0 bit if higher layer parameter tci-PresentInDCI is not enabled; otherwise 3 bits as defined in Clause 5.1.5 of [6, TS38.214].
If "Bandwidth part indicator" field indicates a bandwidth part other than the active bandwidth part,
  if the higher layer parameter tci-PresentInDCI is not enabled for the CORESET used for the PDCCH carrying the DCI format 1_1,
    the UE assumes tci-PresentInDCI is not enabled for all CORESETs in the indicated bandwidth part;
  otherwise,
    the UE assumes tci-PresentInDCI is enabled for all CORESETs in the indicated bandwidth part.

SRS request—2 bits as defined by Table 7.3.1.1.2-24 for UEs not configured with supplementary Uplink in ServingCellConfig in the cell; 3 bits for UEs configured with supplementary Uplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Clause 6.1.1.2 of [6, TS 38.214].

DMRS sequence initialization—1 bit.
If DCI formats 1_1 are monitored in multiple search spaces associated with multiple CORESETs in a BWP for scheduling the same serving cell, zeros shall be appended until the payload size of the DCI formats 1_1 monitored in the multiple search spaces equal to the maximum payload size of the DCI format 1_1 monitored in the multiple search spaces.

Some related texts associated with NR are quoted below from 3GPP TS 38.213 V16.2.0 (associated with Rel-16):

For each DL BWP configured to a UE in a serving cell, the UE can be provided by higher layer signalling with
- P≤3 CORESETs if CORESETPoolIndex is not provided, or if a value of CORESETPoolIndex is same for all CORESETs if CORESETPoolIndex is provided
- P≤5 CORESETs if CORESETPoolIndex is not provided for a first CORESET, or is provided and has a value 0 for a first CORESET, and is provided and has a value 1 for a second CORESET For each CORESET, the UE is provided the following by ControlResourceSet:
- a CORESET index p, by controlResourceSetId, where
  - 0≤p<12 if CORESETPoolIndex is not provided, or if a value of CORESETPoolIndex is same for all CORESETs if CORESETPoolIndex is provided;
  - 0<p<16 if CORESETPoolIndex is not provided for a first CORESET, or is provided and has a value 0 for a first CORESET, and is provided and has a value 1 for a second CORESET;
- a DM-RS scrambling sequence initialization value by pdcch-DMRS-ScramblingID;
- a precoder granularity for a number of REGs in the frequency domain where the UE can assume use of a same DM-RS precoder by precoderGranularity;
- a number of consecutive symbols provided by duration;
- a set of resource blocks provided by frequencyDomain-Resources;
- CCE-to-REG mapping parameters provided by cce-REG-MappingType;
- an antenna port quasi co-location, from a set of antenna port quasi co-locations provided by TCI-State, indicating quasi co-location information of the DM-RS antenna port for PDCCH reception in a respective CORESET;
  - if the UE is provided by simultaneousTCI-UpdateList-r16 or simultaneousTCI-UpdateListSecond-r16 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command
- an indication for a presence or absence of a transmission configuration indication (TCI) field for a DCI format, other than DCI format 1_0, that schedules PDSCH receptions or indicates SPS PDSCH release and is transmitted by a PDCCH in CORESET p, by tci-PresentInDCI or tci-PresentInDCI-ForDCIFormat1_2.

Some related texts associated with NR are quoted below from 3GPP TS 38.214 V16.2.0 (associated with Rel-16):

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

The UE receives an activation command, as described in clause 6.1.3.14 of [10, TS 38.321], used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $n+3N_{slot}^{subframe,\mu}$ where µ is the SCS configuration for the PUCCH. If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'. If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If a UE is configured with the higher layer parameter tci-PresentInDCI-ForFormat1_2 for the CORESET scheduling the PDSCH, the UE assumes that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. When the UE is configured with a single slot PDSCH, the indicated TCI state should be based on the activated TCI states in the slot with the scheduled PDSCH. When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling and the UE is not configured with [enableDefaultBeamForCSS], the UE expects tci-PresentIn-DCI is set as 'enabled' or tci-PresentInDCI-ForFormat1_2 is configured for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold timeDurationForQCL. Independent of the configuration of tci-PresentInDCI and tci-PresentIn-DCI-ForFormat1_2 in RRC connected mode, if the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If none of configured TCI states for the serving cell of scheduled PDSCH contains 'QCL-TypeD', the UE shall obtain the other QCL assumptions from the indicated TCI states for its scheduled PDSCH irrespective of the time offset between the reception of the DL DCI and the corresponding PDSCH. If a UE is configured with enableDefaultTCIStatePerCoresetPoolIndex and the UE is configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE. When a UE is configured with enable TwoDefaultTCIStates, if the offset between the reception of the DL DCI and the corresponding PDSCH or the first PDSCH transmission occasion is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme-r16 set to 'TDMSchemeA' or is configured with higher layer parameter repetitionNumber-r16, the mapping of the TCI states to PDSCH transmission occasions is determined according to clause 5.1.2.1 by replacing the indicated TCI states with the TCI states corresponding to the lowest codepoint among the TCI codepoints containing two different TCI states. If the PDCCH carrying the scheduling DCI is received on one component carrier, and the PDSCH scheduled by that DCI is on another component carrier and the UE is configured with [enableDefaultBeamForCCS]:

The timeDurationForQCL is determined based on the subcarrier spacing of the scheduled PDSCH. If $\mu_{PDCCH} < \mu_{PDSCH}$ an additional timing delay $$d \frac{2^{\mu}PDSCH}{2^{\mu}PDCCH}$$

is added to the timeDurationForQCL, where d is defined in 5.2.1.5.1a-1, otherwise d is zero;

For both the cases, when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For a periodic CSI-RS resource in a NZP-CSI-RS-ResourceSet configured with higher layer parameter trs-Info, the UE shall expect that a TCI-State indicates one of the following quasi co-location type(s):

'QCL-TypeC' with an SS/PBCH block and, when applicable, 'QCL-TypeD' with the same SS/PBCH block, or 'QCL-TypeC' with an SS/PBCH block and, when applicable,'QCL-TypeD' with a CSI-RS resource in an NZP-CSI-RS-ResourceSet configured with higher layer parameter repetition, or For an aperiodic CSI-RS resource in a NZP-CSI-RS-ResourceSet configured with higher layer parameter trs-Info, the UE shall expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with an SS/PBCH block , or
- 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or
- 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or
- 'QCL-TypeC' with an SS/PBCH block and, when applicable, 'QCL-TypeD' with the same SS/PBCH block.

For the DM-RS of PDCCH, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE shall expect that a TCI-State indicates one of the following quasi co-location type(s):
- 'QCL-TypeA' with a CSI-RS resource in a NZP-CSI-RS-ResourceSet configured with higher layer parameter trs-Info and, when applicable, 'QCL-TypeD' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

Some texts related to Rel-17 Further Enhanced MIMO (FeMIMO) work item are quoted below from RP-193133 New WID:

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective

The work item aims to specify the further enhancements identified for NR MIMO. The detailed objectives are as follows:

2. Enhancement on the support for multi-TRP deployment, targeting both FR1 and FR2:
    a. Identify and specify features to improve reliability and robustness for channels other than PDSCH (that is, PDCCH, PUSCH, and PUCCH) using multi-TRP and/or multi-panel, with Rel.16 reliability features as the baseline One, some and/or all of the following terminology and assumptions may be used hereafter.

Base station (BS): a network central unit and/or a network node in New Radio Access Technology (NR) which is used to control one or more transmission and reception points (TRPs) which are associated with one or more cells. Communication between a base station and one or more TRPs may be via fronthaul. Base station may be referred to as central unit (CU), eNB, gNB, and/or NodeB.

TRP: a TRP provides network coverage and directly communicates with UEs. TRP may be referred to as distributed unit (DU) and/or network node.

Cell: a cell comprises one or more associated TRPs (e.g., coverage of the cell may comprise coverage of some and/or all associated TRP(s)). One cell may be controlled by one base station. Cell may be referred to as TRP group (TRPG).

Serving beam: a serving beam for a UE is a beam generated by a network node (e.g., a TRP), wherein the beam is configured to be used to communicate with the UE (e.g., for transmission and/or reception).

Candidate beam: a candidate beam for a UE is a candidate of a serving beam. A serving beam may or may not be a candidate beam.

In NR Rel-15, beamforming technology may be adopted to achieve high power penetration in high frequency band (e.g., above 6 GHz). Accordingly, a gNB and a UE may both use transmission beams and/or receiving beams to ensure reliability of high throughput data in the high frequency band. Choosing a suitable transmission beam and/or receiving beam has played an important role in NR Rel-15. Beam indication for various channels and reference signals are discussed and captured in specifications along with the development of NR.

In NR Rel-15, a beam indication for receiving a downlink (DL) transmission may consider (e.g., may only consider) transmission from a single TRP and/or transmission using a panel within a time duration (e.g., a time duration of at least one of one or more slots such as one slot, one or more mini-slots such as one mini-slot, etc.), such as from the perspective of UE. In NR Rel-16, downlink transmission from multiple TRPs and/or multiple panels may be considered. For transmission from multiple TRPs and/or multiple panels, it may be implied that a single downlink transmission may be performed using different beams from multiple TRPs and/or multiple panels (e.g., for transmission from multiple TRPs and/or multiple panels, it may be implied that a single downlink transmission may be performed using different beams from multiple TRPs and/or multiple panels). Alternatively and/or additionally, (for transmission from multiple TRPs and/or multiple panels, for example) it may be implied that a UE may receive multiple downlink transmissions from multiple TRPs and/or multiple panels within a time duration (e.g., a time duration of at least one of one or more slots such as one slot, one or more mini-slots such as one mini-slot, etc.). In NR Rel-16, one or more enhancements to ultra-reliable and low latency communications (URLLC) with consideration of multiple TRP scenario have been made. Alternatively and/or additionally, one or more Physical Downlink Shared Channel (PDSCH) repetition schemes may be used to improve reliability of receiving PDSCH. For example, the one or more PDSCH repetition schemes may comprise at least one of a Spatial Division Multiplexing (SDM) repetition scheme, a Frequency Division Multiplexing (FDM) repetition scheme, a mini-slot-based repetition scheme (e.g., Time Division Multiplexing (TDM)), a slot based repetition scheme (e.g., TDM), etc.

In NR Rel-15 and/or Rel-16, there may be one-to-one association and/or one-to-more association between scheduling Physical Downlink Control Channel (PDCCH) (e.g., PDCCH that schedules uplink (UL) and/or downlink transmissions) and scheduled PDSCH (e.g., PDSCH transmission scheduled by PDCCH). Accordingly, it may be easier for a UE to determine (e.g., derive) a beam or reference signal as Quasi-Colocation (QCL) for receiving PDSCH (e.g., the UE may determine which beam or reference signal to use for receiving the PDSCH). For a Downlink Control Information (DCI) format with a Transmission Configuration Indicator (TCI) bit field present (e.g., a DCI and/or DCI format that comprises a TCI bit field for indicating TCI code-point for QCL type-D indication), a UE may determine (e.g., derive) which beam or reference signal to use based on a TCI state indicated by the TCI bit field. For a DCI format with a TCI field absent (e.g., a DCI and/or DCI format that does not comprise a TCI bit field for indicating TCI code-point, such as DCI format 1_0 and/or DCI format 1_1 associated with a Control Resource Set (CORESET) without configuring and/or enabling tci-PresentInDCI), a UE may determine (e.g., derive) which beam or reference signal to use based on a TCI state for receiving and/or monitoring a CORESET comprising the DCI format. According to 3GPP TS 38.213 V15.8.0, a threshold may be timeDurationForQCL. In 3GPP TS 38.213 V15.8.0, when an interval (e.g., a time domain interval, such as a distance and/or a duration) between a PDCCH and a PDSCH is smaller than the threshold, since there may not be enough time for preparing a beam or reference signal based on the PDCCH for receiving the PDSCH, a UE may determine the beam for receiving the PDSCH based on a CORESET beam from one or more CORESETs in a latest (e.g., most recent) slot (e.g., the latest slot may be before receiving the PDSCH and/or may be earlier than receiving the PDCCH) and a CORESET (associated with the CORESET beam, for example) is not a scheduling CORESET. In some examples, if an interval (e.g., a time domain interval, such as a distance and/or a duration) between a PDCCH and a PDSCH is larger than or equal to the threshold, a beam or reference signal for receiving the PDSCH may be based on an indication of a TCI state from a scheduling DCI, or beam or reference signal for receiving the CORESET comprising the scheduling DCI. Throughout the present disclosure, scheduling CORESET may refer to a CORESET comprising a scheduling DCI for a scheduled PDSCH, such as a scheduling DCI that schedules the scheduled PDSCH.

Regarding NR Rel-17, reliability enhancement of channels such as PDCCH, Physical Uplink Control Channel (PUCCH) and Physical Uplink Shared Channel (PUSCH) is considered. Since PDCCH controls scheduling information of PDSCH and PUSCH, enhancement of PDCCH may be emphasized first. For achieving reliability of PDCCH, one or more PDCCH repetitions (from different TRPs, for example) on time domain may be one approach. In this approach, once a linkage (e.g., one linkage) between TRP and a UE is (and/or has) blockage resulting in a failed PDCCH reception, there may be one or more other PDCCH repetitions from the same or a different TRP for scheduling (e.g., successfully scheduling) the same one or more PDSCHs or the same one or more PUSCHs. The one or more other PDCCH repetitions may provide the same scheduling information (e.g., the same scheduling result) for PDSCH or PUSCH as the failed PDCCH reception. However, transmitting multiple (e.g., two) scheduling PDCCHs may have an impact on determining a reference signal or beam for receiving a scheduled PDSCH (e.g., the multiple scheduling PDCCHs may have an impact for a DCI format without TCI present and/or without a TCI bit field present). A DCI format (without TCI and/or a TCI bit field present, for example)

may be used for delivering common control information and/or may be a fallback DCI (e.g., DCI format 1_0). Thus, it is necessary to support such DCIs (e.g., DCIs without TCI and/or a TCI bit field) with NR Rel-17 PDCCH repetition scheme. However, since there may be multiple (e.g., two) scheduling CORESETs with different beams, it may be difficult for a UE to determine which beam or reference signal to use for receiving scheduled PDSCH.

Figure 11:
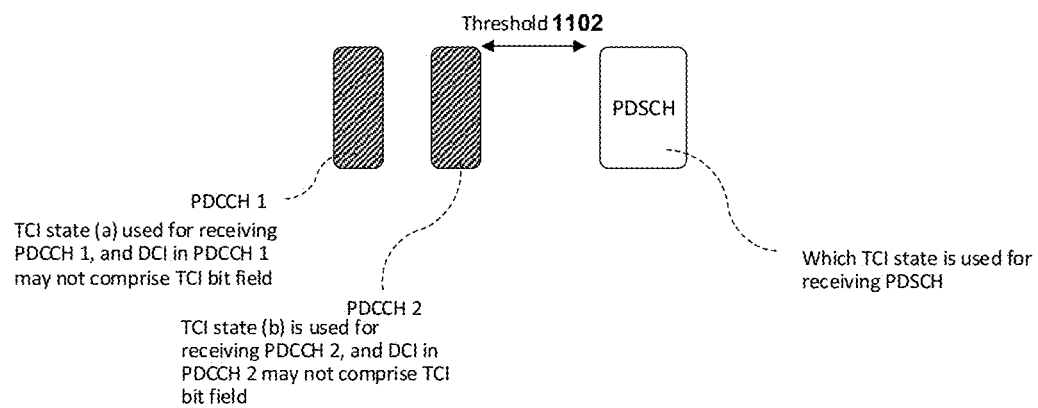
FIG. 11 is a diagram illustrating an exemplary scenario associated with a UE configured to receive Physical Downlink Control Channel (PDCCH) repetitions according to one exemplary embodiment.

FIG. 11 illustrates an exemplary scenario in which a UE is configured to receive PDCCH repetitions from a single TRP or a plurality of TRPs. Each PDCCH of PDCCH 1 and PDCCH 2 comprises a DCI format with or without a TCI bit field. In some examples, PDCCH 1 (associated with CORESET i, for example) and PDCCH 2 (associated with CORESET j, for example, where j may be different than i) are separated by time domain. PDCCH 1 and PDCCH 2 may be in different symbols, where the different symbols may be in the same slot or in different slots. Alternatively and/or additionally, PDCCH 1 and PDCCH 2 may be in different slots (e.g., PDCCH 1 is in a first slot and PDCCH 2 is in a second slot different than the first slot). If an interval (e.g., a time domain interval, such as a distance and/or a duration) between a PDCCH (e.g., PDCCH 1 and/or PDCCH 2) and a scheduled PDSCH is larger than or equal to a threshold 1102, the UE may determine two candidate beams, based on PDCCH 1 and PDCCH 2 or based on a corresponding CORESET (e.g., CORESET i and/or CORESET j), for receiving the scheduled PDSCH (e.g., the UE may derive the two candidate beams from PDCCH 1 and PDCCH 2 or from the corresponding CORESET). In some examples, a first TCI state (e.g., TCI state (a)) may be used for receiving PDCCH 1 and/or a second TCI state (e.g., TCI state (b)) may be used for receiving PDCCH 2. The UE may be confused (and/or may not be able to determine) which beam or reference signal is to be used for receiving the scheduled PDSCH. Accordingly, the UE may consume more power by attempting to decode the scheduled PDSCH based on the two candidate beams (e.g., the two candidate beams derived from PDCCH 1 and PDCCH 2 and/or from the corresponding CORESET). Alternatively and/or additionally, an issue may occur if an interval between a PDCCH (e.g., PDCCH 1 and/or PDCCH 2) and the scheduled PDSCH is smaller than the threshold 1102. In some examples, the threshold 1102 may be used for preparing a default beam for receiving the scheduled PDSCH (and/or the threshold 1102 may correspond to a duration of time in which the default beam for receiving the scheduled PDSCH may be prepared, for example). In some examples, in a scenario in which an interval between a latter PDCCH (e.g., PDCCH 2) and the scheduled PDSCH is smaller than the threshold 1102, it is unclear which beam or reference signal is to be used for receiving the scheduled PDSCH. It may be necessary and/or beneficial that these issues (e.g., more power consumption by the UE due to attempting to decode the scheduled PDSCH based on the two candidate beams and/or the UE not being able to determine which beam or reference signal is to be used for receiving the scheduled PDSCH) be considered and solved. Alternatively and/or additionally, signal design for at least one of a bundle, a pair and/or an association for a plurality of scheduling PDCCHs for scheduling a PDSCH (e.g., one PDSCH) and/or additional PDSCHs may be considered.

In the present disclosure, the following concepts and/or embodiments are provided which may be used for (but are not limited to being used for) determining a reference signal and/or beam for receiving a PDSCH (with consideration to improving the reliability of transmitting and/or receiving PDCCH, for example).

Any combination of above and/or below concepts can be jointly combined or formed to a new embodiment. The following embodiments can be used to solve (but are not limited to solving) one or more issues mentioned above (e.g., more power consumption by the UE due to attempting to decode the scheduled PDSCH based on the two candidate beams and/or the UE not being able to determine which beam and/or reference signal is to be used for receiving the scheduled PDSCH).

Descriptions provided below may be applied for embodiments of the present disclosure.

A UE is configured and/or served in a serving cell. The UE may be configured with the serving cell and/or served in the serving cell by a network.

The UE is configured with one or more Bandwidth Parts (BWPs). Alternatively and/or additionally, the one or more BWPs may be indicated to the UE (e.g., the UE may receive an indication of the one or more BWPs).

A BWP (e.g., an active BWP) may be activated (by the UE, for example). Alternatively and/or additionally, the BWP (e.g., the active BWP) may be indicated to the UE (e.g., the UE may receive an indication of the BWP). Alternatively and/or additionally, the UE may receive an indication (e.g., an instruction) to activate the BWP (e.g., the active BWP). Alternatively and/or additionally, the BWP (e.g., the active BWP) may be activated for the UE.

In some examples, an active downlink BWP may be activated (by the UE, for example). Alternatively and/or additionally, the active downlink BWP may be indicated to the UE (e.g., the UE may receive an indication of the active downlink BWP). Alternatively and/or additionally, the UE may receive an indication (e.g., an instruction) to activate the active downlink BWP. Alternatively and/or additionally, the active downlink BWP may be activated for the UE.

In some examples, an active uplink BWP may be activated (by the UE, for example). Alternatively and/or additionally, the active uplink BWP may be indicated to the UE (e.g., the UE may receive an indication of the active uplink BWP). Alternatively and/or additionally, the UE may receive an indication (e.g., an instruction) to activate the active uplink BWP. Alternatively and/or additionally, the active uplink BWP may be activated for the UE.

In some examples, the UE is configured with one or more BWPs. Alternatively and/or additionally, the one or more BWPs may be indicated to the UE (e.g., the UE may receive an indication of the one or more BWPs).

In some examples, the UE may be in RRC_CONNECTED state.

In some examples, the UE may be in RRC_INACTIVE state.

In some examples, the UE may be in RRC_IDLE state.

In some examples, the UE is served by a first TRP.

In some examples, the UE is served by a second TRP.

In some examples, the first TRP may belong to the serving cell and/or may be associated with the serving cell.

In some examples, the second TRP may belong to the serving cell and/or may be associated with the serving cell.

In some examples, the first TRP and the second TRP may belong to the same serving cell and/or may be associated with the same serving cell.

In some examples, the first TRP and the second TRP may belong to different serving cells and/or may be associated with different serving cells. For example, the first TRP may belong to (and/or may be associated with) a first serving cell and the second TRP may belong to (and/or may be associated with) a second serving cell, wherein the first serving cell may be different than the second serving cell.

In some examples, the first TRP may schedule and/or transmit a downlink transmission or an uplink transmission for the UE. For example, the first TRP may schedule a downlink transmission for the UE and/or transmit the downlink transmission to the UE. Alternatively and/or additionally the first TRP may schedule an uplink transmission for the UE and/or receive the uplink transmission from the UE.

In some examples, the second TRP may schedule and/or transmit a downlink transmission or an uplink transmission for the UE. For example, the second TRP may schedule a downlink transmission for the UE and/or transmit the downlink transmission to the UE. Alternatively and/or additionally the second TRP may schedule an uplink transmission for the UE and/or receive the uplink transmission from the UE.

In some examples, the first TRP may receive an uplink transmission from the UE.

In some examples, the second TRP may receive an uplink transmission from the UE.

[0084] In some examples, the network may comprise a first network panel.

[0085] In some examples, the network may comprise a second network panel.

In some examples, the first network panel may be used to receive an uplink transmission from the UE.

In some examples, the second network panel may be used to receive an uplink transmission from the UE.

In some examples, to enable a PDCCH transmission with a plurality of TCI states (e.g., two TCI states), there may be: (i) a first CORESET (e.g., one CORESET) with a plurality of active TCI states (e.g., two active TCI states), (ii) a first search space (e.g., one search space), such as a first search space set (e.g., one search space set), associated with a plurality of different CORESETs (e.g., two different CORESETs), and/or (iii) a plurality of search spaces (e.g., two search spaces), such as a plurality of search space sets (e.g., two search space sets) associated with CORESETs (e.g., corresponding CORESETs).

In some examples, the first CORESET (e.g., the one CORESET) may belong to the first TRP or the second TRP.

In some examples, the plurality of different CORESETs (e.g., the two different CORESETs) may belong to the first TRP and the second TRP, such as where a CORESET of the plurality of different CORESETs belongs to the first TRP and another CORESET of the plurality of different CORESETs belongs to the second TRP. In some examples, the first search space (e.g., the one search space) is associated with a CORESET (e.g., one CORESET) belonging to the first TRP and a CORESET (e.g., one CORESET) belonging to the second TRP.

In some examples, the plurality of different CORESETs may belong to the same TRP (e.g., the first TRP or the second TRP).

In some examples, a search space (e.g., one search space) of the plurality of search spaces (e.g., the two search spaces) may be associated with a CORESET belonging to the first TRP and another search space of the plurality of search spaces (e.g., the two search spaces) may be associated with a CORESET belonging to the second TRP.

In some examples, a TCI code-point (e.g., one TCI code-point), for indicating one or more reference signals for receiving and/or monitoring a CORESET, comprises one or more TCI states (e.g., one TCI state or two TCI states). In some examples, each TCI state of the one or more TCI states is indicative of one or more reference signals (e.g., a QCL reference signal). In some examples, the one or more TCI states are active (and/or activated) upon (and/or in response to and/or after) the UE receiving a Medium Access Control (MAC) Control Element (CE) for activating the one or more TCI states and/or the TCI code-point (e.g., the one TCI code-point).

In some examples, a TCI code-point (e.g., one TCI code-point), for indicating one or more reference signals for receiving and/or monitoring a scheduled PDSCH, comprises one or more TCI states (e.g., one TCI state or two TCI states). In some examples, each TCI state of the one or more TCI states is indicative of one or more reference signals (e.g., a QCL reference signal). In some examples, the one or more TCI states are active (and/or activated) upon (and/or in response to and/or after) the UE receiving a MAC CE for activating the one or more TCI states and/or the TCI code-point (e.g., the one TCI code-point).

In some examples, the UE may receive, from the network, one or more configurations and/or one or more parameters associated with URLLC (e.g., the one or more configurations and/or the one or more parameters may be for URLLC).

In some examples, the UE may receive, from the network, a DCI and/or a MAC CE associated with URLLC (e.g., the DCI and/or the MAC CE may be for URLLC).

In some examples, one or more identifiers may be known to the UE and/or the network.

In some examples, the UE may be configured with the one or more identifiers by the network (e.g., the UE may receive an identifier configuration associated with configuring the one or more identifiers). Alternatively and/or additionally, the network may indicate the one or more identifiers to the UE (e.g., the network may transmit an indication of the one or more identifiers to the UE).

In some examples, the UE may determine (e.g., derive) an identifier of the one or more identifiers (e.g., the UE may explicitly derive or implicitly derive the identifier).

In some examples, the UE may determine (e.g., derive) an identifier of the one or more identifiers based on a configuration other than the identifier configuration (e.g., the UE may explicitly derive or implicitly derive the identifier from the configuration).

In some examples, an identifier of the one or more identifiers may be an index and/or identity (ID) of a configuration and/or parameter (e.g., a higher layer configuration and/or parameter).

In some examples, an identifier of the one or more identifiers may be an index and/or identity of a configuration and/or parameter (e.g., the identifier may be at least one of a CORESET identity, a TCI state identity, an index and/or identity of a group of TCI states, an index and/or identity of a group of CORESETs, an index and/or identity of a PDCCH configuration, an index and/or identity of a PUCCH configuration, an index and/or identity of a PDSCH configuration, an index and/or identity of a PUSCH configuration, etc.).

In some examples, an identifier of the one or more identifiers may be associated with (e.g., related to) one or more parameters within a configuration (e.g., the identifier may be associated with (e.g., related to) at least one of a CORESET within a PDCCH configuration, a parameter within a CORESET, etc.).

In some examples, an identifier of the one or more identifiers may be indicated by a MAC CE and/or may be associated with (e.g., related to) a MAC CE signaling.

In some examples, an identifier of the one or more identifiers may be associated with (e.g., related to) one or more fields in a DCI. Alternatively and/or additionally, the identifier may be carried in (e.g., indicated by) the one or more fields in the DCI.

In some examples, the UE may receive (and/or may expect to receive) a plurality of PDCCHs and/or DCIs scheduling fully overlapped, partially overlapped or non-overlapping PDSCHs in time and frequency domain, wherein the UE is configured with two different values of a TRP identifier in the active BWP of the serving cell. For example, the UE may receive (and/or may expect to receive) a plurality of PDCCHs and/or DCIs scheduling fully overlapped, partially overlapped or non-overlapping PDSCHs in time and frequency domain if (and/or when) the UE is configured with two different values of a TRP identifier in the active BWP of the serving cell.

In some examples, an identifier of the one or more identifiers may be a TRP-related index and/or identity (and/or the identifier may be a value of a TRP-related index and/or identity).

In some examples, an identifier of the one or more identifiers may be CORESETPoolIndex.

In some examples, the UE may determine (e.g., derive) one or more values of the identifier.

In some examples, a value of the identifier may be used to identify (e.g., differentiate and/or recognize) a TRP.

In some examples, when a UE is scheduled with a downlink or uplink transmission (e.g., when the downlink or uplink transmission is scheduled for the UE), the UE may (and/or may be able to) identify (e.g., differentiate and/or recognize) the TRP scheduling the downlink or uplink transmission (e.g., the UE may identify the TRP scheduling the downlink or uplink transmission using an explicit or implicit method).

In some examples, when a UE is scheduled with a downlink or uplink transmission (e.g., when the downlink or uplink transmission is scheduled for the UE), the UE may (and/or may be able to) identify (e.g., differentiate and/or recognize) the TRP scheduling the downlink or uplink transmission based on a value of the identifier (e.g., the UE may identify the TRP scheduling the downlink or uplink transmission based on the value of the identifier).

In some examples, the UE may (and/or may be able to) identify (e.g., differentiate and/or recognize) a TRP scheduling a downlink or uplink transmission based on a value of the identifier (e.g., the UE may identify the TRP scheduling the downlink or uplink transmission based on the value of the identifier).

In some examples, the UE may (and/or may be able to) identify (e.g., differentiate and/or recognize) a TRP scheduling a downlink or uplink transmission based on a value of the identifier (e.g., the UE may identify the TRP scheduling the downlink or uplink transmission based on the value of the identifier), wherein the identifier is associated with (and/or configured with) a scheduling CORESET for the downlink or uplink transmission (e.g., the scheduling CORESET may correspond to a CORESET comprising a scheduling DCI for a scheduled PDSCH, such as a scheduling DCI that schedules the scheduled PDSCH).

In some examples, when the UE is scheduled with a downlink or uplink transmission (e.g., when the downlink or uplink transmission is scheduled for the UE), the UE may (and/or may be able to) identify (e.g., differentiate and/or recognize) the TRP scheduling the downlink or uplink transmission based on a value of the identifier (e.g., the UE may identify the TRP scheduling the downlink or uplink transmission based on the value of the identifier), wherein the value of the identifier is associated with (and/or configured with) the scheduling CORESET for the downlink or uplink transmission.

In some examples, the UE may determine (e.g., derive) a first value of the identifier. Alternatively and/or additionally, the first value of the identifier may be indicated to the UE (e.g., the UE may receive an indication of the first value of the identifier).

In some examples, the UE may determine (e.g., derive) a second value of the identifier. Alternatively and/or additionally, the second value of the identifier may be indicated to the UE (e.g., the UE may receive an indication of the second value of the identifier).

In some examples, the first value of the identifier may be associated with (e.g., related to) the first TRP.

In some examples, the second value of the identifier may be associated with (e.g., related to) the second TRP.

In some examples, a first set of CORESETs (in the serving cell, for example) may be associated with the first TRP.

In some examples, a second set of CORESETs (in the serving cell, for example) may be associated with the second TRP.

In some examples, the first set of CORESETs (in the serving cell, for example) may be associated with (and/or configured with) the first value of the identifier.

In some examples, the second set of CORESETs (in the serving cell, for example) may be associated with (and/or configured with) the second value of the identifier.

In some examples, the UE may be configured and/or indicated (and/or instructed) to receive a downlink transmission via a plurality of spatial QCL assumptions.

In some examples, the UE may be configured and/or indicated (and/or instructed) via a high layer signaling indicating to the UE (e.g., instructing the UE) to operate in a transmission mode (e.g., the UE may be indicated and/or instructed to operate in the transmission mode via the high layer signaling).

In some examples, the UE may be configured and/or indicated (and/or instructed) to receive one or more downlink transmissions via a plurality of panels.

In some examples, the UE may be configured and/or indicated (and/or instructed) via one or more high layer signalings indicating to the UE (e.g., instructing the UE) to operate in a transmission mode (e.g., the UE may be indicated and/or instructed to operate in the transmission mode via the one or more high layer signalings).

In some examples, the UE may be configured and/or indicated (and/or instructed) via one or more high layer signalings indicating to the UE (e.g., instructing the UE) to operate in a transmission mode (e.g., the UE may be indicated and/or instructed to operate in the transmission mode via the one or more high layer signalings), wherein when the UE operates in the transmission mode, the UE may receive one or more downlink transmissions via one or more beams.

In some examples, the UE may be configured and/or indicated (and/or instructed) via one or more high layer signalings indicating to the UE (e.g., instructing the UE) to operate in a transmission mode (e.g., the UE may be indicated and/or instructed to operate in the transmission mode via the one or more high layer signalings), wherein when the UE operates in the transmission mode, the UE may receive one or more downlink transmissions via one or more panels.

In some examples, the UE may be configured and/or indicated (and/or instructed) to receive one or more first downlink transmissions via a plurality of spatial QCL assumptions, and the UE may be configured and/or indicated (and/or instructed) to receive one or more second downlink transmissions via one spatial QCL assumption.

In some examples, upon (and/or in response to and/or after) being indicated (and/or instructed) to operate in the transmission mode, the UE may receive (and/or may expect to receive) a downlink transmission via a plurality of spatial QCL assumptions.

In some examples, upon (and/or in response to and/or after) being indicated (and/or instructed) to operate in the transmission mode, the UE may receive (and/or may expect to receive) one or more first downlink transmission via a plurality of spatial QCL assumptions, and may receive (and/or may expect to receive) one or more second downlink transmissions via one spatial QCL assumption.

In some examples, the UE may receive and/or be configured with a PDCCH configuration.

In some examples, the UE may receive and/or be configured with a PDCCH configuration, in the active downlink BWP, to receive and/or monitor PDCCH, search space and/or CORESET (e.g., the PDCCH configuration may be used by the UE to receive and/or monitor PDCCH, search space and/or CORESET).

In some examples, the UE may receive and/or be configured with a first search space (e.g., a first search space configuration) in the active downlink BWP.

In some examples, the UE may receive and/or be configured with a second search space (e.g., a second search space configuration) in the active downlink BWP.

In some examples, the UE may monitor the first search space and/or the second search space in the active downlink BWP.

In some examples, the UE may be configured and/or indicated (and/or instructed) to monitor the first search space and/or the second search space in the active downlink BWP.

In some examples, the first search space may be associated with one CORESET, such as only one CORESET (e.g., the first CORESET).

Alternatively and/or additionally, the first search space may be associated with a plurality of CORESETs (e.g., the first CORESET and the second CORESET).

In some examples, the second search space may be associated with one CORESET, such as only one CORESET (e.g., the second CORESET).

Alternatively and/or additionally, the second search space may be associated with a plurality of CORESETs (e.g., the first CORESET and the second CORESET).

In some examples, a first CORESET is included in the first set of CORESETs.

In some examples, the first CORESET is included in the second set of CORESETs.

In some examples, a second CORESET is included in the second set of CORESETs.

In some examples, the first search space may be associated and/or configured with a first CORESET.

In some examples, the first search space may be associated and/or configured with a second CORESET and a first CORESET.

In some examples, the second search space may be associated and/or configured with a second CORESET.

In some examples, the first CORESET may be associated with the first TRP.

In some examples, the second CORESET may be associated with the second TRP.

In some examples, the first CORESET may be associated and/or configured with the first value of the identifier.

In some examples, the second CORESET may be associated and/or configured with the second value of the identifier.

In some examples, the first CORESET may be transmitted by the first TRP.

In some examples, the second CORESET may be transmitted by the second TRP.

In some examples, the UE may be configured with a first TCI state. Alternatively and/or additionally, the first TCI state may be indicated to the UE (e.g., the UE may receive an indication of the first TCI state).

In some examples, the UE may be configured with a second TCI state. Alternatively and/or additionally, the second TCI state may be indicated to the UE (e.g., the UE may receive an indication of the second TCI state).

In some examples, the UE may be configured with a first TCI state via a Radio Resource Control (RRC) signaling, a MAC CE and/or a DCI. Alternatively and/or additionally, the first TCI state may be indicated to the UE via the RRC signaling, the MAC CE and/or the DCI (e.g., the RRC signaling, the MAC CE and/or the DCI may be indicative of the first TCI state).

In some examples, the UE may be configured with a second TCI state via a RRC signaling, a MAC CE and/or a DCI. Alternatively and/or additionally, the second TCI state may be indicated to the UE via the RRC signaling, the MAC CE and/or the DCI (e.g., the RRC signaling, the MAC CE and/or the DCI may be indicative of the second TCI state).

In some examples, the UE may be configured with a first TCI state to receive the first CORESET (e.g., the first TCI state may be used to receive the first CORESET). Alternatively and/or additionally, the first TCI state (for receiving the first CORESET, for example) may be indicated to the UE (e.g., the UE may receive an indication of the first TCI state).

In some examples, the UE may be configured with a second TCI state to receive the second CORESET (e.g., the second TCI state may be used to receive the second CORESET). Alternatively and/or additionally, the second TCI state (for receiving the second CORESET, for example) may be indicated to the UE (e.g., the UE may receive an indication of the second TCI state).

In some examples, the UE is configured with the first CORESET, wherein the first CORESET is configured with the first TCI state and the second TCI state.

In some examples, the first TCI state is active.

In some examples, the second TCI state is active.

In some examples, the first TCI state and the second TCI state are active (and/or activated) upon (and/or in response to and/or after) the UE receiving a MAC CE and/or RRC signaling for activation (of the first TCI state and the second TCI state).

In some examples, the first TCI state is active (and/or activated) upon (and/or in response to and/or after) the UE receiving a MAC CE and/or RRC signaling for activation (of the first TCI state).

In some examples, the second TCI state is active (and/or activated) upon (and/or in response to and/or after) the UE receiving a MAC CE and/or RRC signaling for activation (of the second TCI state).

In some examples, a plurality of CORESETs associated with (and/or configured in) the first search space are configured and/or associated with (e.g., must be configured and/or associated with) different values of the identifier, wherein the first search space is associated with (and/or configured) with the plurality of CORESETs. For example, a first CORESET of the plurality of CORESETs may be associated with a first value of the identifier and a second CORESET of the plurality of CORESETs may be associated with a second value of the identifier different than the first value of the identifier.

In some examples, if (and/or when) the first search space is associated with (and/or configured) with a plurality of CORESETs, the plurality of CORESETs are configured and/or associated with (e.g., must be configured and/or associated with) different values of the identifier.

In some examples, the UE may monitor and/or receive a first DCI.

In some examples, the UE may monitor and/or receive a second DCI.

In some examples, the UE may monitor and/or receive a third DCI.

In some examples, the UE may monitor and/or receive a fourth DCI.

In some examples, the UE may monitor the second DCI after monitoring the first DCI.

In some examples, the UE may monitor the third DCI after monitoring the first DCI and/or monitoring the second DCI.

In some examples, the UE may monitor the fourth DCI after monitoring the first DCI, monitoring the second DCI and/or monitoring the third DCI.

In an example of the monitoring order for monitoring the first DCI, the second DCI, the third DCI and the fourth DCI may be initially monitoring the first DCI, followed by monitoring the second DCI, followed by monitoring the third DCI, followed by monitoring the fourth DCI. This example is an example of the monitoring order and does not mean and/or imply that the UE needs to and/or must monitor and/or detect all four DCIs.

In some examples, the UE may monitor one, some and/or all DCIs of the first DCI, the second DCI, the third DCI and the fourth DCI within a slot.

In some examples, the UE may monitor one, some and/or all DCIs of the first DCI, the second DCI, the third DCI and the fourth DCI across a plurality of slots.

In some examples, one, some and/or all DCIs of the first DCI, the second DCI, the third DCI and the fourth DCI may carry and/or indicate the same information (e.g., the same content).

In some examples, one, some and/or all DCIs of the first DCI, the second DCI, the third DCI and the fourth DCI may correspond to and/or be associated with the same PDCCH monitoring occasion of a search space (e.g., the first search space).

In some examples, one, some and/or all DCIs of the first DCI, the second DCI, the third DCI and the fourth DCI may be monitored and/or received in the same PDCCH monitoring occasion of a search space (e.g., the first search space).

In some examples, one, some and/or all DCIs of the first DCI, the second DCI, the third DCI and the fourth DCI may carry and/or indicate the same information (e.g., the same content), wherein the one, some and/or all DCIs of the first DCI, the second DCI, the third DCI and the fourth DCI are monitored and/or received by the UE in the same PDCCH monitoring occasion.

In some examples, if (and/or when) one, some and/or all DCIs of the first DCI, the second DCI, the third DCI and the fourth DCI are monitored and/or received by the UE in the same PDCCH monitoring occasion, the one, some and/or all DCIs of the first DCI, the second DCI, the third DCI and the fourth DCI may carry and/or indicate the same information (e.g., the same content).

In some examples, the UE may be configured with a third parameter. Alternatively and/or additionally, the third parameter may be indicated to the UE (e.g., the UE may receive an indication of the third parameter). Alternatively and/or additionally, the UE may determine (e.g., derive) the third parameter.

In some examples, the third parameter may be configured with and/or associated with a search space.

In some examples, the third parameter may be configured in a search space configuration for the search space.

In some examples, the UE may determine the third parameter based on the search space configuration for the search space (e.g., the UE may derive the third parameter from the search space configuration for the search space).

In some examples, the UE may determine a CORESET, that is associated and/or configured with the search space, to monitor and/or receive the first DCI, the second DCI, the third DCI and/or the fourth DCI (e.g., the UE may determine which CORESET, that is associated and/or configured with the search space, to monitor and/or receive the first DCI, the second DCI, the third DCI and/or the fourth DCI). For example, in response to determining the CORESET to monitor and/or receive the first DCI, the second DCI, the third DCI and/or the fourth DCI, the UE may monitor and/or receive, using the CORESET, the first DCI, the second DCI, the third DCI and/or the fourth DCI.

In some examples, the UE may, based on indicated content of the third parameter and/or based on existence and/or presence of the third parameter (in a field, for example), determine a CORESET, that is associated and/or configured with the search space, to monitor and/or receive the first DCI, the second DCI, the third DCI and/or the fourth DCI (e.g., the UE may determine which CORESET, that is associated and/or configured with the search space, to monitor and/or receive the first DCI, the second DCI, the third DCI and/or the fourth DCI). For example, in response to determining the CORESET to monitor and/or receive the first DCI, the second DCI, the third DCI and/or the fourth DCI, the UE may monitor and/or receive, using the CORESET, the first DCI, the second DCI, the third DCI and/or the fourth DCI.

One example of determining and/or mapping one or more CORESETs to monitor and/or receive one or more DCIs (e.g., the first DCI, the second DCI, the third DCI and/or the fourth DCI) may be determining and/or mapping the first CORESET for monitoring and/or receiving the first DCI and the second DCI, and determining and/or mapping the second CORESET for monitoring and/or receiving the third DCI and the fourth DCI. For example, the example of determining and/or mapping one or more CORESETs to monitor and/or receive "the first DCI, the second DCI, the third DCI, the fourth DCI" may be "the first CORESET, the first CORESET, the second CORESET, the second CORESET".

Another example of determining and/or mapping one or more CORESETs to monitor and/or receive one or more DCIs (e.g., the first DCI, the second DCI, the third DCI and/or the fourth DCI) may be determining and/or mapping the first CORESET for monitoring and/or receiving the first DCI and the third DCI, and determining and/or mapping the second CORESET for monitoring and/or receiving the second DCI and the fourth DCI. For example, the example of determining and/or mapping one or more CORESETs to monitor and/or receive "the first DCI, the second DCI, the third DCI, the fourth DCI" may be "the first CORESET, the second CORESET, the first CORESET, the second CORESET".

In some examples, the UE may determine a TCI state to monitor and/or receive the first DCI, the second DCI, the third DCI and/or the fourth DCI (e.g., the UE may determine which TCI state to monitor and/or receive the first DCI, the second DCI, the third DCI and/or the fourth DCI). For example, in response to determining the TCI state to monitor and/or receive the first DCI, the second DCI, the third DCI and/or the fourth DCI, the UE may monitor and/or receive, using the TCI state, the first DCI, the second DCI, the third DCI and/or the fourth DCI.

In some examples, the UE may, based on indicated content of the third parameter and/or based on existence and/or presence of the third parameter (in a field, for example), determine a TCI state to monitor and/or receive the first DCI, the second DCI, the third DCI and/or the fourth DCI (e.g., the UE may determine which TCI state to monitor and/or receive the first DCI, the second DCI, the third DCI and/or the fourth DCI). For example, in response to determining the TCI state to monitor and/or receive the first DCI, the second DCI, the third DCI and/or the fourth DCI, the UE may monitor and/or receive, using the TCI state, the first DCI, the second DCI, the third DCI and/or the fourth DCI.

One example of determining and/or mapping one or more TCI states to monitor and/or receive one or more DCIs (e.g., the first DCI, the second DCI, the third DCI and/or the fourth DCI) may be determining and/or mapping the first TCI state for monitoring and/or receiving the first DCI and the second DCI, and determining and/or mapping the second TCI state for monitoring and/or receiving the third DCI and the fourth DCI. For example, the example of determining and/or mapping one or more TCI states to monitor and/or receive "the first DCI, the second DCI, the third DCI, the fourth DCI" may be "the first TCI state, the first TCI state, the second TCI state, the second TCI state".

Another example of determining and/or mapping one or more TCI states to monitor and/or receive one or more DCIs (e.g., the first DCI, the second DCI, the third DCI and/or the fourth DCI) may be determining and/or mapping the first TCI state for monitoring and/or receiving the first DCI and the third DCI, and determining and/or mapping the second TCI state for monitoring and/or receiving the second DCI and the fourth DCI. For example, the example of determining and/or mapping one or more TCI states to monitor and/or receive "the first DCI, the second DCI, the third DCI, the fourth DCI" may be "the first TCI state, the second TCI state, the first TCI state, the second TCI state".

In some examples, a UE receives a first PDSCH (e.g., a first scheduled PDSCH) via a third TCI state (e.g., a third specific TCI state), wherein the first PDSCH (e.g., the first scheduled PDSCH) is scheduled by a plurality of PDCCHs. The UE receives the plurality of PDCCHs via a plurality of TCI states. In some examples, the plurality of PDCCHs is used for indicating scheduled information (e.g., same scheduled information) to the UE. In some examples, each PDCCH of one, some and/or all of the plurality of PDCCHs may indicate the same scheduled information. In some examples, the plurality of PDCCHs is used to provide spatial and/or beam diversity to enhance receiving reliability of PDCCH. In some examples, the plurality of PDCCHs may indicate a second PDSCH (e.g., a second scheduled PDSCH). The second PDSCH (e.g., the second scheduled PDSCH) may be after the first PDSCH (e.g., the first scheduled PDSCH). For example, the first PDSCH may be in a first symbol and/or a first slot, and the second PDSCH may be in a second symbol and/or a second slot, wherein the second symbol and/or the second slot are after (and/or follow) the first symbol and/or the first slot. The UE may receive the second PDSCH (e.g., the second scheduled PDSCH) via a fourth TCI state (e.g., a fourth specific TCI state). The fourth TCI state may be the same as the third TCI state.

The UE may receive a signal (e.g., a message) indicating bundling, pairing and/or association for the plurality of PDCCHs.

In some examples, the UE may monitor and/or receive one or more PDCCHs and/or one or more DCIs within a slot, wherein the one or more PDCCHs and/or the one or more DCIs carry and/or indicate the same information (e.g., the same contents).

In some examples, the UE may be configured and/or indicated (and/or instructed) to monitor and/or receive one or more PDCCHs and/or one or more DCIs within a slot, wherein the one or more PDCCHs and/or the one or more DCIs carry and/or indicate the same information (e.g., the same contents).

In some examples, the plurality of PDCCHs comprises a first PDCCH carrying a first DCI.

In some examples, the plurality of PDCCHs comprises a second PDCCH carrying a second DCI.

In some examples, the plurality of TCI states comprises a first TCI state and a second TCI state.

In some examples, the first TCI state and the second TCI state are active.

In some examples, the plurality of PDCCHs occupy non-overlapped orthogonal frequency-division multiplexing (OFDM) symbols in time domain (e.g., OFDM symbols occupied by the plurality of PDCCHs do not overlap in time domain).

In some examples, some and/or all PDCCHs of the plurality of PDCCHs belong to the same search space or to different search spaces.

In some examples, some and/or all PDCCHs of the plurality of PDCCHs belong to the same CORESET or to different CORESETs.

In some examples, the UE monitors PDCCHs of the plurality of PDCCHs on different monitoring occasions (e.g., the UE monitors one PDCCH of the plurality of PDCCHs on a first monitoring occasion and another PDCCH of the plurality of PDCCHs on a second monitoring occasion different than the first monitoring occasion).

In some examples, the UE monitors the first PDCCH (e.g., the first PDCCH candidate) on a first monitoring occasion.

In some examples, the UE monitors the second PDCCH (e.g., the second PDCCH candidate) on a second monitoring occasion (different than the first monitoring occasion, for example).

In some examples, the first monitoring occasion and the second monitoring occasion start in different OFDM symbols (e.g., the first monitoring occasion may start in a first OFDM symbol and the second monitoring occasion may start in a second OFDM symbol different than the first OFDM symbol).

In some examples, the UE is configured with a first CORESET.

In some examples, the first CORESET is associated with a plurality of active TCI states (e.g., two active TCI states, such as the first TCI state and the second TCI state).

In some examples, the first CORESET is not configured and/or enabled with tci-PresentInDCI (e.g., tci-PresentIn-DCI is not enabled for the first CORESET).

In some examples, the first CORESET is configured and/or enabled with tci-PresentInDCI (e.g., tci-PresentIn-DCI is enabled for the first CORESET).

In some examples, the first CORESET is associated with a first search space.

In some examples, the first CORESET is associated with a second search space.

In some examples, the UE is configured with a first search space for monitoring the first PDCCH.

In some examples, the UE is configured with the first search space for monitoring the second PDCCH.

In some examples, the UE is configured with a second search space for monitoring the second PDCCH.

In some examples, the first search space is associated with a first CORESET.

In some examples, the second search space is associated with a first CORESET.

In some examples, the first search space provides one or more first monitoring occasions (in a periodic manner, for example). For example, the one or more first monitoring occasions may be periodic monitoring occasions and/or the one or more first monitoring occasions associated with the first search space may occur periodically (according to a periodicity, for example).

In some examples, the second search space provides one or more second monitoring occasions (in a periodic manner, for example). For example, the one or more second monitoring occasions may be periodic monitoring occasions and/or the one or more second monitoring occasions associated with the second search space may occur periodically (according to a periodicity, for example).

In some examples, the first monitoring occasion is associated with the first TCI state.

In some examples, the UE monitors the one or more first monitoring occasions via the first TCI state.

In some examples, the second monitoring occasion is associated with the second TCI state.

In some examples, the UE monitors the one or more second monitoring occasions via the second TCI state.

In some examples, the UE receives the first PDCCH via the first TCI state.

In some examples, the UE receives the second PDCCH via the second TCI state.

In some examples, the first search space and the second search space are the same search space.

In some examples, the first search space and the second search space are different search spaces (e.g., the first search space is different than the second search space).

In an example in which the first search space and the second search space are the same search space, a bit-map may indicative of starting OFDM symbols of monitoring occasions (e.g., the bit-map may be indicative of a first starting OFDM symbol of a first monitoring occasion, a second starting OFDM symbol of a second monitoring occasion, etc.). For example, the first CORESET may have a CORESET duration of 2 OFDM symbols, and the bit-map (for the first search space, for example) may be (1,0,1,0,0, 0,0,0,0,0,0,0,0,0), wherein the most left bit (e.g., a starting bit of the bit-map) corresponds to a first OFDM symbol of a slot (e.g., sequentially the first OFDM symbol of the slot, such as a starting OFDM symbol of the slot) and the most right bit (e.g., a last bit of the bit-map) corresponds to a last OFDM symbol of the slot. Based on the bit-map (e.g., based on l's indicated by the bit-map), the first monitoring occasion starts from the first OFDM symbol of the slot, and the second monitoring occasion starts from the third OFDM symbol of the slot. In another example, if the bit-map is (1,0,1,0,0,0,1,0,1,0,0,0,0,0), there are four monitoring occasions in a slot. The UE may be configured with one or more pairs (e.g., one or more pairs of monitoring occasions), wherein the one or more pairs may comprise one pair or two pairs. For single pair (where the UE is configured with one pair, for example), one first monitoring occasion may start from the first OFDM symbol of the slot, and another first monitoring occasion may start from the seventh OFDM symbol of the slot (e.g., sequentially the seventh OFDM symbol of the slot), and one second monitoring occasion may start from the third OFDM symbol of the slot (e.g., sequentially the third OFDM symbol of the slot), and another second monitoring occasion may start from the ninth OFDM symbol of the slot (e.g., sequentially the ninth OFDM symbol of the slot), wherein the one first monitoring occasion and the another first monitoring occasion may be monitoring occasions of the one or more first monitoring occasions and the one second monitoring occasion and the another second monitoring occasion may be monitoring occasions of the one or more second monitoring occasions. The UE may monitor the four monitoring occasions for the plurality of PDCCHs. The four monitoring occasions (and/or PDCCHs monitored and/or received via the four monitoring occasions) may provide the same scheduling result for PDSCH (e.g., a scheduled PDSCH may be scheduled with same frequency and/or time allocation in the four monitoring occasions and/or the PDCCHs monitored and/or received via the four monitoring occasions). For two pairs (where the UE is configured with two pairs, for example), the first pair of the two pairs may comprise one first monitoring occasion (starting from the first OFDM symbol of the slot, for example) and one second monitoring occasion (starting from the third OFDM symbol of the slot, for example), wherein the one first monitoring occasion and the one second monitoring occasion may be used to schedule a PDSCH (e.g., one PDSCH, such as the first scheduled PDSCH). The second pair of the two pairs may comprise another first monitoring occasion (starting from the seventh OFDM symbol of the slot, for example) and another second monitoring occasion (starting from the ninth OFDM symbol of the slot, for example), wherein the another first monitoring occasion and the another second monitoring occasion may be used to schedule another PDSCH (e.g., the second scheduled PDSCH or a PDSCH with a different Transport Block (TB) and/or MAC Protocol Data Unit (MAC PDU) than the first scheduled PDSCH), wherein the one first monitoring occasion and the another first monitoring occasion may be monitoring occasions of the one or more first monitoring occasions and the one second monitoring occasion and the another second monitoring occasion may be monitoring occasions of the one or more second monitoring occasions. Alternatively and/or additionally, the one first monitoring occasion may start from the first OFDM symbol, the another first monitoring occasion may start from the third OFDM symbol, the one second monitoring occasion may start from the seventh OFDM symbol and the another second monitoring occasion may start from the ninth OFDM symbol. In some examples, the first search space provides monitoring occasions in one or more slots (e.g., two or more consecutive slots) in a periodic manner. For example, the first search space may be configured with 4 slots for every 10 slots (e.g., a periodicity of 10 slots). Among the 4 slots, the first slot (e.g., sequentially the first slot of the 4 slots) and the third slot (e.g., sequentially the third slot of the 4 slots) may be (and/or may comprise) two monitoring occasions of the one or more first monitoring occasions, and the second slot (e.g., sequentially the second slot of the 4 slots) and the fourth slot (e.g., sequentially the fourth slot of the 4 slots) may be (and/or may comprise) two monitoring occasions of the one or more second monitoring occasions. Alternatively and/or additionally, among the 4 slots, the first slot and the second slot may be (and/or may comprise) two monitoring occasions of the one or more first monitoring occasions, and the third slot and the fourth slot may be (and/or may comprise) two monitoring occasions of the one or more second monitoring occasions. In some examples, the UE may be configured with one or more pairs (e.g., one or more pairs of monitoring occasions) comprising one pair or two pairs.

In an example in which the first search space and the second search space are different search spaces, a periodicity, a slot offset, a duration and/or a bit-map for indicating a starting OFDM symbol of a monitoring occasion is the same (e.g., restricted to be the same) for both the first search space and the second search space. For example, within a periodicity of the first search space and/or the second search space, a number of monitoring occasions for the first search space may be the same as a number of monitoring occasions for the second search space. Alternatively and/or additionally, a number of monitoring occasions for the first search space within a periodicity of the first search space may be the same as a number of monitoring occasions for the second search space within a periodicity of the second search space.

In some examples, the third TCI state (e.g., the third specific TCI state) and/or the fourth TCI state (e.g., the fourth specific TCI state) are for (e.g., dedicated for) a bundle, a pair and/or an association of the plurality of PDCCHs.

In some examples, the third TCI state (e.g., the third specific TCI state) and/or the fourth TCI state (e.g., the fourth specific TCI state) are for (e.g., dedicated for) a bundle, a pair and/or an association of the first search space, the first PDCCH, the first monitoring occasion (e.g., the one or more first monitoring occasions) and/or the first DCI and are for (e.g., dedicated for) a bundle, a pair and/or an association of the second search space, the second PDCCH, the second monitoring occasion (e.g., the one or more second monitoring occasions) and/or the second DCI.

In some examples, the third TCI state (e.g., the third specific TCI state) may be the same as or different than the first TCI state.

In some examples, the third TCI state (e.g., the third specific TCI state) may be the same as or different than the second TCI state.

In some examples, the fourth TCI state (e.g., the fourth specific TCI state) may be the same as or different than the first TCI state.

In some examples, the fourth TCI state (e.g., the fourth specific TCI state) may be the same as or different than as the second TCI state.

In some examples, the third TCI state (e.g., the third specific TCI state) may be determined based on (e.g., derived from) an earlier monitoring occasion (e.g., an earliest monitoring occasion) of a pair of monitoring occasions (e.g., a pair of monitoring occasions within a periodicity of the first search space and/or the second search space).

In some examples, the third TCI state (e.g., the third specific TCI state) may be determined based on (e.g., derived from) an earlier PDCCH (e.g., an earliest PDCCH) of the plurality of PDCCHs.

In some examples, the third TCI state (e.g., the third specific TCI state) may be determined based on (e.g., derived from) a latter monitoring occasion (e.g., a last monitoring occasion) of a pair of monitoring occasions (e.g., a pair of monitoring occasions within a periodicity of the first search space and/or the second search space).

In some examples, the third TCI state (e.g., the third specific TCI state) may be determined based on (e.g., derived from) a latter PDCCH (e.g., a last PDCCH) of the plurality of PDCCHs.

In some examples, the third TCI state (e.g., the third specific TCI state) may be the first TCI state (e.g., a primary active TCI state of the first CORESET), the second TCI state (e.g., a secondary active TCI state of the first CORESET) or a different TCI state (e.g., an active and/or configured TCI state other than the first TCI state and the second TCI state).

In some examples, the primary active TCI state (e.g., the first TCI state) is used with and/or without a pair, a bundle and/or an association of the first search space, the first PDCCH, the first monitoring occasion and/or the first DCI and the second search space, the second PDCCH, the second monitoring occasion and/or the second DCI. In an example, the pair, the bundle and/or the association may correspond to (i) a pair, a bundle and/or an association of the first search space and the second search space, (ii) a pair, a bundle and/or an association of the first PDCCH and the second PDCCH, (iii) a pair, a bundle and/or an association of the first monitoring occasion and the second monitoring occasion and/or (iv) a pair, a bundle and/or an association of the first DCI and the second DCI.

In some examples, the secondary active TCI state (e.g., the second TCI state) is used for (e.g., used only for) a pair, a bundle and/or an association of the first search space, the first PDCCH, the first monitoring occasion and/or the first DCI and the second search space, the second PDCCH, the second monitoring occasion and/or the second DCI. In an example, the pair, the bundle and/or the association may correspond to (i) a pair, a bundle and/or an association of the first search space and the second search space, (ii) a pair, a bundle and/or an association of the first PDCCH and the second PDCCH, (iii) a pair, a bundle and/or an association of the first monitoring occasion and the second monitoring occasion and/or (iv) a pair, a bundle and/or an association of the first DCI and the second DCI.

In some examples, if a UE is configured with a third search space associated with the first CORESET, and the third search space is without pairing, associating and/or bundling with another search space (e.g., a search space other than the third search space), the UE may monitor the third search space based on the primary active TCI state of the first CORESET (e.g., the first TCI state).

In some examples, a first interval (e.g., a first time domain interval, such as a first distance and/or a first duration) is between a last OFDM symbol (e.g., an ending OFDM symbol) of the first monitoring occasion and a starting OFDM symbol of a scheduled PDSCH (e.g., the first scheduled PDSCH).

In some examples, a second interval (e.g., a second time domain interval, such as a second distance and/or a second duration) is between a last OFDM symbol (e.g., an ending OFDM symbol) of the second monitoring occasion and a starting OFDM symbol of a scheduled PDSCH (e.g., the first scheduled PDSCH).

In some examples, if the first interval and the second interval are larger than or equal to a threshold (e.g., the threshold 1102), the UE receives a scheduled PDSCH (e.g., the first scheduled PDSCH) via the third TCI state (e.g., the third specific TCI state) or the UE receives the a scheduled PDSCH (e.g., the second scheduled PDSCH) via the fourth TCI state (e.g., the fourth specific TCI state). In some examples, a reference monitoring occasion is a latter monitoring occasion (e.g., a last monitoring occasion) among the first monitoring occasion (e.g., the one or more first monitoring occasions) and the second monitoring occasion (e.g., the one or more second monitoring occasions).

In some examples, if the first interval is larger than or equal to the threshold and the second interval is smaller than the threshold, the UE receives a scheduled PDSCH (e.g., the first scheduled PDSCH) via the third TCI state (e.g., the third specific TCI state) and/or the UE receives a scheduled PDSCH (e.g., the second scheduled PDSCH) via the fourth TCI state (e.g., the fourth specific TCI state).

In some examples, if the first interval and the second interval are smaller than the threshold, the UE receives a scheduled PDSCH (e.g., the first scheduled PDSCH) via the third TCI state (e.g., the third specific TCI state) and/or the UE receives a scheduled PDSCH (e.g., the second scheduled PDSCH) via the fourth TCI state (e.g., the fourth specific TCI state).

In some examples, without (and/or before) pairing, bundling and/or association (and/or before the UE is indicated and/or configured with pairing, bundling and/or association) and/or without (and/or before) the UE receiving the signal (e.g., the message) indicating pairing, bundling and/or association, the UE receives the scheduled PDSCH, scheduled by the first DCI, via the first TCI state (if the first interval is larger than or equal to the threshold).

In some examples, the UE receives the scheduled PDSCH, scheduled by the first DCI, via the first TCI state if the UE does not have pairing, bundling and/or association, if the UE does receive the signal (e.g., the message) indicating pairing, bundling and/or association before the scheduled PDSCH and/or if the first interval is larger than or equal to the threshold.

In some examples, without (and/or before) pairing, bundling and/or association (and/or before the UE is indicated and/or configured with pairing, bundling and/or association) and/or without (and/or before) the UE receiving the signal (e.g., the message) indicating pairing, bundling and/or association, the UE receives the scheduled PDSCH, scheduled by the first DCI, via a TCI state associated with a CORESET with a lowest CORESET identity (CORESET ID) among CORESETs in a latest (e.g., most recent) slot, wherein the CORESETs may be used for scheduling PDSCH in an active downlink BWP on the serving cell (if the first interval is smaller than the threshold).

In some examples, the UE receives the scheduled PDSCH, scheduled by the first DCI, via a TCI state associated with a CORESET with a lowest CORESET identity among CORESETs in a latest (e.g., most recent) slot if the UE does not have pairing, bundling and/or association, if the UE does receive the signal (e.g., the message) indicating pairing, bundling and/or association before the scheduled PDSCH and/or if the first interval is larger than or equal to the threshold (wherein the CORESETs may be used for scheduling PDSCH in an active downlink BWP on the serving cell).

In some examples, the UE is not expected (and/or does not expect) to be scheduled with a PDSCH such that an interval (e.g., a time domain interval, such as a distance and/or a duration) between PDCCH 1 and the PDSCH is larger than or equal to the threshold and another interval (e.g., a time domain interval, such as a distance and/or a duration) between PDCCH 2 and the PDSCH is smaller than the threshold.

In some examples, regardless of whether or not the first interval and/or the second interval are larger than or equal to the threshold, the UE may receive a scheduled PDSCH (e.g., the first scheduled PDSCH) based on the third TCI state (e.g., the third specific TCI state) and/or may receive a scheduled PDSCH (e.g., the second scheduled PDSCH) based on the fourth TCI state (e.g., the fourth specific TCI state).

In some examples, the network ensures and/or guarantees that the UE has enough time for switching via using the third TCI state (e.g., the third specific TCI state) for receiving the first PDSCH (e.g., the first scheduled PDSCH) and using the fourth TCI state (e.g., the fourth specific TCI state) for receiving the second PDSCH (e.g., the second scheduled PDSCH). For example, the network ensures and/or guarantees that the UE has enough time to switch from using the third TCI state for receiving the first PDSCH (e.g., the first scheduled PDSCH) to using the fourth TCI state for receiving the second PDSCH (e.g., the second scheduled PDSCH).

In some examples, the network schedules the UE such that the UE has enough time for switching via using the third TCI state (e.g., the third specific TCI state) for receiving the first PDSCH (e.g., the first scheduled PDSCH) and using the fourth TCI state (e.g., the fourth specific TCI state) for receiving the second PDSCH (e.g., the second scheduled PDSCH). For example, the network schedules the UE such that the UE has enough time to switch from using the third TCI state for receiving the first PDSCH (e.g., the first scheduled PDSCH) to using the fourth TCI state for receiving the second PDSCH (e.g., the second scheduled PDSCH).

In some examples, regardless of whether or not the UE receives the first DCI and the second DCI, and/or regardless of whether or not the UE receives one of the first DCI or the second DCI, the UE may receive the first PDSCH (e.g., the first scheduled PDSCH) based on the third TCI state (e.g., the third specific TCI state).

In some examples, a TCI state (e.g., the first TCI state) is a default TCI state used when an interval (e.g., a time domain interval, such as a distance and/or a duration) between a PDCCH (e.g., a scheduling PDCCH) and a PDSCH (e.g., a PDSCH scheduled by the PDCCH) is smaller than the threshold.

In some examples, a last PDCCH (in time domain) of a bundle, a pair and/or an association of the plurality of PDCCHs may be used to determine (e.g., derive and/or calculate an interval (e.g., a time domain interval, such as a distance and/or a duration) between the plurality of PDCCHs and a scheduled PDSCH (scheduled by the plurality of PDCCHs, for example).

In some examples, an earlier (e.g., earliest) PDCCH (in time domain) of a bundle, a pair and/or an association of the plurality of PDCCHs may be used to determine (e.g., derive and/or calculate an interval (e.g., a time domain interval, such as a distance and/or a duration) between the plurality of PDCCHs and a scheduled PDSCH (scheduled by the plurality of PDCCHs, for example).

In some examples, a third interval (e.g., a third time domain interval, such as a third distance and/or a third duration) is between a last PDCCH (in time domain) or an earlier (e.g., earliest) PDCCH (in time domain) of a bundle, a pair and/or an association of the plurality of PDCCHs and a scheduled PDSCH (e.g., the first scheduled PDSCH).

In some examples, the threshold may be timeDurationForQCL.

In some examples, the signal (e.g., the message) may indicate bundling, pairing and/or association for one or more CORESETs, one or more PDCCH candidates, PDCCH candidates with one or more aggregation levels, one or more search spaces, one or more monitoring occasions (e.g., the one or more monitoring occasions may be configured from a same search space or may be configured from different search spaces), one or more Control Channel Element (CCE) positions and/or one or more slots (and/or one or more OFDM symbols).

In some examples, the signal may be transmitted via a DCI, a MAC CE and/or a RRC signaling.

In some examples, upon and/or after (and/or in response to) receiving the signal, the UE may perform soft-combining for a bundle, pair and/or association (e.g., one bundle, pair and/or association), such as a bundle, pair and/or association indicated by the signal.

In some examples, upon and/or after (and/or in response to) receiving the signal, the UE may consider bundling, pairing and/or association (e.g., bundling, pairing and/or association indicated by the signal).

In some examples, the UE receives the signal in slot n.

In some examples, the UE transmits a Hybrid Automatic Repeat Request (HARQ) feedback corresponding to the signal (e.g., the HARQ feedback may be indicative of reception, such as successful reception, of the signal).

In some examples, the UE transmits the HARQ feedback in slot n+k1.

In some examples, k1 is indicated by a scheduling DCI for scheduling the signal.

In some examples, the UE considers and/or applies one or more configurations and/or information of the signal (and/or one or more configurations and/or information based on the signal) at (and/or after) a first slot (e.g., an initial slot) after slot n+k1+x. For example, the UE may consider and/or apply one or more configurations and/or information of the signal (and/or one or more configurations and/or information based on the signal) starting from the first slot (e.g., the initial slot) after slot n+k1+x (and/or starting from a slot after the first slot after slot n+k1+x).

In some examples, x corresponds to a delay for confirming and/or activating one or more indications of the signal. In an example, x may be 3 slots or 3 ms.

An example of the signal may be { SS1, SS3} (e.g., search space 1 and search space 3) from a same serving cell or {SS1} (e.g., search space 1) from a first serving cell and { SS1} (e.g., search space 1) from a second serving cell. In some examples, { SS1, SS3} (e.g., search space 1 and search space 3) are associated with a same CORESET.

In some examples, the first DCI may be DCI format 1_0, DCI format 1_1, or DCI format 1_2.

Figure 12:
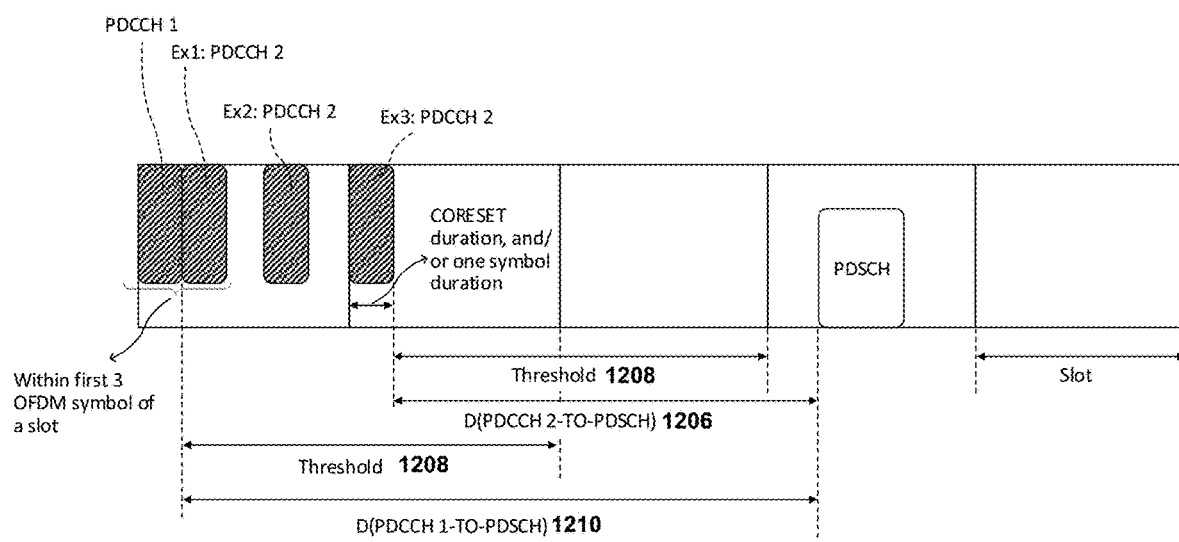
FIG. 12 is a diagram illustrating an exemplary scenario associated with a Physical Downlink Shared Channel (PDSCH) being scheduled by PDCCHs according to one exemplary embodiment.

FIG. 12 illustrates an example scenario associated with a PDSCH being scheduled by PDCCHs. In the example scenario of FIG. 12, an interval 1210 between PDCCH 1 and PDSCH (e.g., a scheduled PDSCH) is larger than a threshold 1208 and an interval 1206 between PDCCH 2 and the PDSCH is larger than the threshold 1208. In example 1 (e.g., shown as Ex1 in FIG. 12), PDCCH 2 and PDCCH 1 are both in the first three OFDM symbols of a slot (e.g., sequentially the first three OFDM symbols of the slot). In example 2 (e.g., shown as Ex2 in FIG. 12), PDCCH 2 is in one or more OFDM symbols other than the first three OFDM symbols of the slot. In example 3 (e.g., shown as Ex3 in FIG. 12), PDCCH 2 is in a slot different than a slot that PDCCH 1 is in. The UE receives the PDSCH via a third TCI state (e.g., a specific TCI state). PDCCH 1 and PDCCH 2 are in a CORESET. The CORESET is configured without TCI state in DCI. PDCCH 1 and PDCCH 2 may belong to a same search space. Alternatively and/or additionally, PDCCH 1 and PDCCH 2 may belong to different search spaces. PDCCH 1 and PDCCH 2 may be received in a same monitoring occasion or different monitoring occasions in time domain. In some examples, if PDCCH 1 and PDCCH 2 are received in the same monitoring occasion, a first part (e.g., a first half) of the CORESET is received via one TCI state (e.g., a primary active TCI state of the CORESET) and a second part of the CORESET other than the first part of the CORESET (e.g., a second half of the CORESET other than the first half of the CORESET) is received via another TCI state (e.g., secondary active TCI state of the CORESET). In some examples, the UE may receive PDCCH 1 via a first TCI state and may receive PDCCH 2 via a second TCI state. PDCCH 1 and PDCCH 2 schedule the PDSCH (e.g., PDCCH 1 schedules the PDSCH and PDCCH 2 schedules the PDSCH). In an example, the UE receives the PDSCH via a third TCI state (e.g., a specific TCI state). The third TCI state may be a TCI state for receiving PDCCH 1 or for receiving PDCCH 2 (e.g., the third TCI state may be the first TCI state or the second TCI state). The third TCI state may be determined (e.g., derived) based on a TCI state for a bundle, a pair and/or an association of two PDCCHs (e.g., PDCCH 1 and PDCCH 2). The third TCI state may be determined (e.g., derived) based on a last PDCCH of the bundle, the pair and/or the association of two PDCCHs (e.g., the third TCI state may be determined based on PDCCH 2) or the third TCI state may be determined (e.g., derived) based on an earliest PDCCH of the bundle, the pair and/or the association of two PDCCHs (e.g., the third TCI state may be determined based on PDCCH 1). The third TCI state may be determined based on a TCI state for receiving a last PDCCH of the bundle, the pair and/or the association of two PDCCHs (e.g., the third TCI state may be determined based on the second TCI state for receiving PDCCH 2) or the third TCI state may be determined based on a TCI state for receiving an earliest PDCCH of the bundle, the pair and/or the association of two PDCCHs (e.g., the third TCI state may be determined based on the first TCI state for receiving PDCCH 1). The third TCI state may be the primary active TCI state of the CORESET or the secondary active TCI state of the CORESET.

Figure 13:
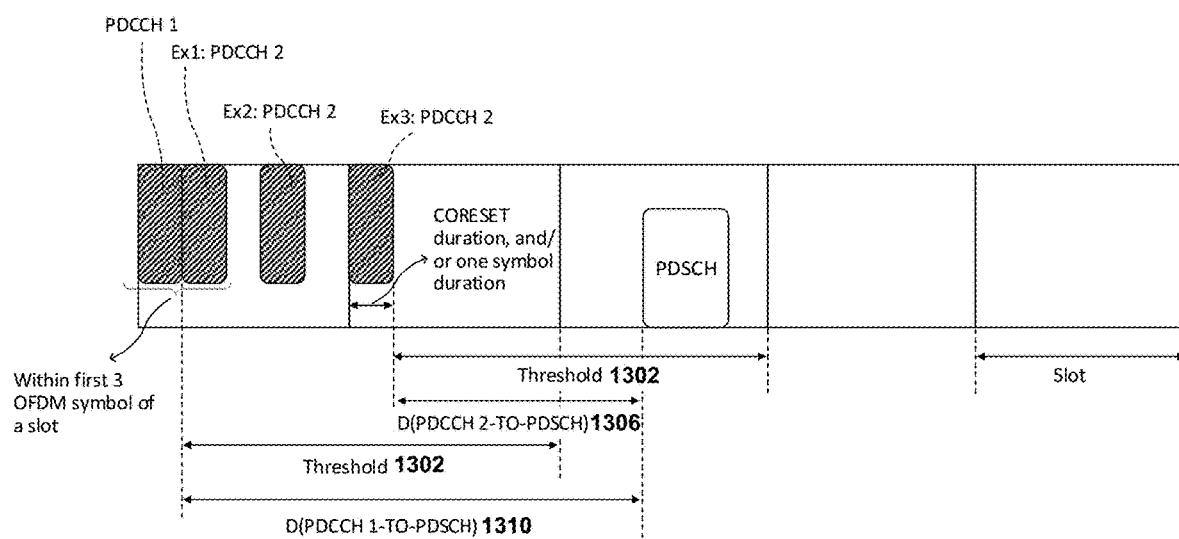
FIG. 13 is a diagram illustrating an exemplary scenario associated with a PDSCH being scheduled by PDCCHs according to one exemplary embodiment.

FIG. 13 illustrates an example scenario associated with a PDSCH being scheduled by PDCCHs. In the example scenario of FIG. 13, an interval 1310 between PDCCH 1 and PDSCH (e.g., a scheduled PDSCH) is larger than a threshold 1302 and an interval 1306 between PDCCH 2 and the PDSCH is smaller than the threshold 1302. In some examples, the UE may receive PDCCH 1 via a first TCI state and may receive PDCCH 2 via a second TCI state. The UE receives the PDSCH based on a third TCI state (e.g., a specific TCI state). The third TCI state may be determined (e.g., derived) based on a TCI state for receiving a last PDCCH of a bundle, a pair and/or an association of two PDCCHs comprising the PDCCH 1 and PDCCH 2 (e.g., the third TCI state may be determined based on the second TCI state for receiving PDCCH 2) or the third TCI state may be determined based on a TCI state for receiving an earliest PDCCH of the bundle, the pair and/or the association of two PDCCHs (e.g., the third TCI state may be determined based on the first TCI state for receiving PDCCH 1). The third TCI state may be a primary active TCI state of the CORESET or a secondary active TCI state of the CORESET. The third TCI state is used for receiving the PDSCH scheduled by the bundle, the pair and/or the association of two PDCCHs comprising PDCCH 1 and PDCCH 2. The third TCI state may be a TCI state other than a TCI state (e.g., the first TCI state) for receiving PDCCH 1 and/or a TCI state (e.g., the second TCI state) for receiving PDCCH 2. In some examples, if an interval (e.g., one interval) of the interval 1306 and the interval 1310 is larger than or equal to the threshold 1302, the UE does not receive the PDSCH based on a TCI state (e.g., the first TCI state) for receiving PDCCH 1. For example, if an interval (e.g., one interval) of the interval 1306 and the interval 1310 is larger than or equal to the threshold 1302, the UE may receive the PDSCH based on a TCI state and/or other information, wherein the TCI state and/or the other information are different than a TCI state (e.g., the first TCI state) for receiving PDCCH 1. In some examples, the UE may consider and/or deem an interval (e.g., a time domain interval, such as a distance and/or a duration) for the bundle, the pair and/or the association of two PDCCHs and the PDSCH as an interval (e.g., a time domain interval, such as a distance and/or a duration) between a last PDCCH (or CORESET) of the bundle, the pair and/or the association of two PDCCHs (comprising PDCCH 1 and PDCCH 2) in time domain and the PDSCH. Determination of the third TCI state may be based on an example scenario of FIG. 14 (e.g., since an interval between a bundle, a pair and/or an association and a scheduled PDSCH is smaller than a threshold).

Figure 14:
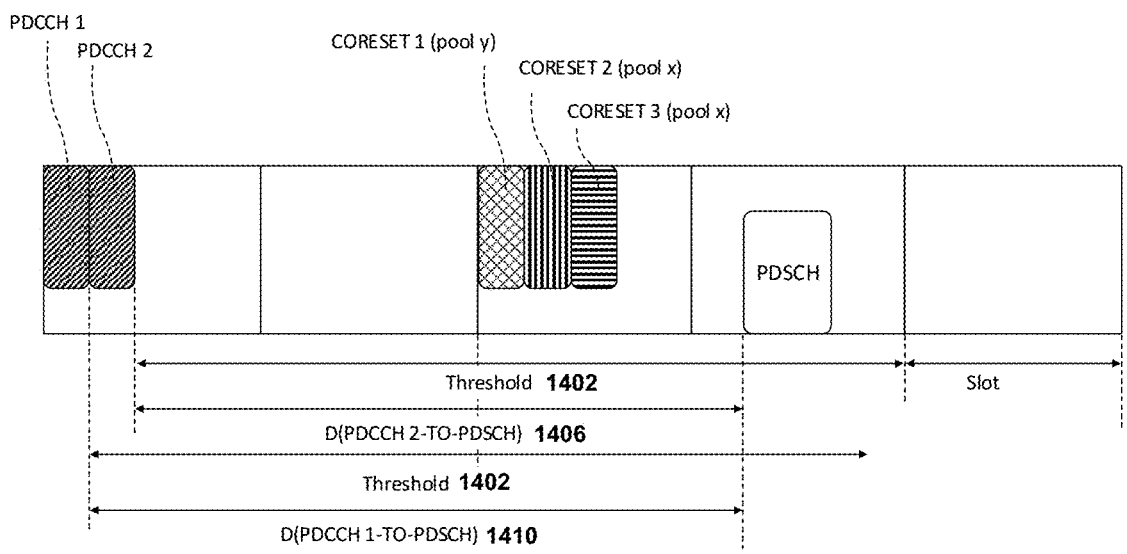
FIG. 14 is a diagram illustrating an exemplary scenario associated with a PDSCH being scheduled by PDCCHs according to one exemplary embodiment.

FIG. 14 illustrates an example scenario associated with a PDSCH being scheduled by PDCCHs. In the example scenario of FIG. 14, an interval 1410 between PDCCH 1 and a first PDSCH (e.g., a scheduled PDSCH, shown as "PDSCH" in FIG. 14) and an interval 1406 between PDCCH 2 and the first PDSCH are smaller than a threshold 1402. The UE is configured with three CORESETs in a latest (e.g., last) slot (e.g., a latest slot before the first PDSCH). The three CORESETs may comprise CORESETs 2~3 belonging to CORESET pool x, and CORESET 1 belonging to CORESET pool y. Different CORESET pools may belong to different TRPs. The UE may receive PDCCHs on CORESET 2 and/or CORESET 3 for scheduling a second PDSCH on a first active downlink BWP on a first serving cell. The first active downlink BWP may be the same as an active downlink BWP on which the first PDSCH is scheduled and/or the first serving cell may be the same as a serving cell on which the first PDSCH is scheduled.

In a first example, PDCCH 1 and PDCCH 2 may be delivered on a CORESET belonging to CORESET pool x. The UE may receive the first PDSCH, scheduled by PDCCH 1 and/or PDCCH 2, via a third TCI state (e.g., a specific TCI state). The third TCI state may be determined (e.g., derived) based on a CORESET with a lowest CORESET identity of a CORESET pool for scheduling the first active downlink BWP on the first serving cell in a latest slot. In the first example, the UE may consider and/or determine (e.g., derive) the third TCI state to be a TCI state for receiving CORESET 2 (belonging to CORESET pool x), since, for example, CORESET 2 is with the lowest CORESET identity in CORESET pool x in the latest slot for scheduling PDSCH on the first active downlink BWP on the first serving cell.

In a second example, PDCCH 1 may be delivered on a CORESET that is different than CORESETs 1~3. PDCCH 2 may be delivered on a CORESET that is different than CORESETs 1~3. The UE may receive the first PDSCH, scheduled by PDCCH 1 and/or PDCCH 2, via a third TCI state (e.g., a specific TCI state). The third TCI state may be determined (e.g., derived) based on a CORESET with a lowest CORESET identity among the CORESET delivering PDCCH 1 and the CORESET delivering PDCCH 2. In the second example, if a CORESET identity of the CORESET for delivering PDCCH 1 is lower than a CORESET identity of the CORESET for delivering PDCCH 2, the UE may consider and/or determine (e.g., derive) the third TCI state to be a TCI state for receiving CORESET 2 for scheduling PDSCH on the first active downlink BWP on the first serving cell.

In some examples, the UE is configured with a first CORESET.

In some examples, the UE is configured with a second CORESET.

In some examples, the first CORESET is associated with an active state (e.g., one active state), such as the first TCI state.

In some examples, the second CORESET is associated with an active state (e.g., one active state), such as the first TCI state.

In some examples, the first CORESET is not configured and/or enabled with tci-PresentInDCI (e.g., tci-PresentInDCI is not enabled for the first CORESET).

In some examples, the first CORESET is configured and/or enabled with tci-PresentInDCI (e.g., tci-PresentInDCI is enabled for the first CORESET).

In some examples, the second CORESET is not configured and/or enabled with tci-PresentInDCI (e.g., tci-PresentInDCI is not enabled for the first CORESET).

In some examples, the second CORESET is configured and/or enabled with tci-PresentInDCI (e.g., tci-PresentInDCI is enabled for the first CORESET).

In some examples, the first CORESET is associated with a first search space.

In some examples, the first CORESET is associated with a second search space.

In some examples, the second CORESET is associated with a second search space.

In some examples, the UE is configured with a first search space for monitoring the first PDCCH.

In some examples, the UE is configured with a second search space for monitoring the second PDCCH.

In some examples, the first search space is associated with a first CORESET.

In some examples, the first search space is associated with a second CORESET.

In some examples, the second search space is associated with a second CORESET.

In some examples, the first search space provides one or more first monitoring occasions and one or more second monitoring occasions (in a periodic manner, for example). For example, the one or more first monitoring occasions may be periodic monitoring occasions and/or the one or more first monitoring occasions may occur periodically (according to a periodicity, for example). Alternatively and/or additionally, the one or more second monitoring occasions may be periodic monitoring occasions and/or the one or more second monitoring occasions may occur periodically (according to a periodicity, for example).

In some examples, the one or more first monitoring occasions are associated with the first search space and the first CORESET.

In some examples, the one or more second monitoring occasions are associated with the first search space and the second CORESET.

In some examples, even slots and/or even monitoring occasions (with respect to slot number/index 0 (e.g., physical slot number/index 0) or subframe index 0 (e.g., physical subframe index 0)) of the first search space are associated with the first CORESET.

In some examples, odd slots and/or odd monitoring occasions (with respect to slot number/index 0 (e.g., physical slot number/index 0) or subframe index 0 (e.g., physical subframe index 0)) of the first search space are associated with the second CORESET.

Figure 15:
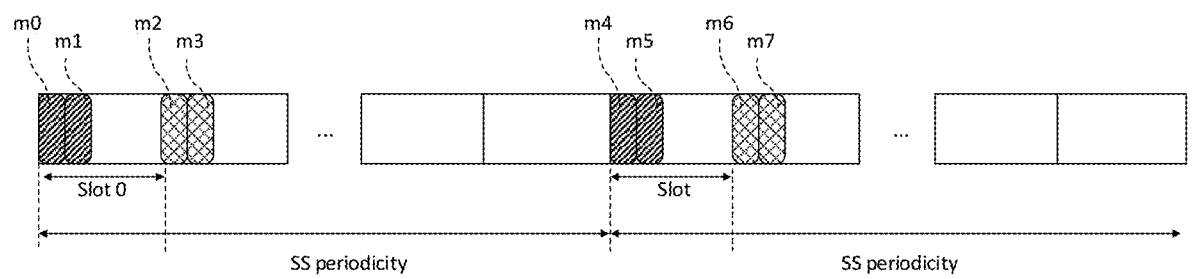
FIG. 15 is a diagram illustrating monitoring occasions associated with a first search space and/or a second search space according to one exemplary embodiment.

An example of monitoring occasions associated with a first search space and/or a second search space is illustrated in FIG. 15. Monitoring occasions m0~m7 are monitoring occasions associated with (e.g., configured to and/or belonging to) a first search space (SS) and/or a second search space (SS). Monitoring occasions m0~m7 are monitoring occasions associated with (e.g., configured to and/or belonging to) a first CORESET and/or a second CORESET. UE monitors monitoring occasions m0~m7 based on TCI states for the first CORESET or the second CORESET. In an example, TCI state 0 (denoted as {0}) may be used for monitoring and/or receiving monitoring occasions belonging to and/or configured to the one or more first monitoring occasions and TCI state 1 (denoted as {1}) may be used for monitoring and/or receiving monitoring occasions belonging to and/or configured to the one or more second monitoring occasions. In the example, a first TCI state pattern {0,1,0,1,0,1,0,1} and a second TCI state pattern {0,0,1,1,0, 0,1,1} illustrate monitoring occasions m0~m7 being associated with TCI state 0 or TCI state 1. In some examples, a monitoring occasion corresponding to a most left {0} of a TCI state pattern is paired to a monitoring occasion corresponding to a most left {1} of the TCI state pattern, a monitoring occasion corresponding to a second-most left {0} of the TCI state pattern is paired to a monitoring occasion corresponding to a second-most left {1} of the TCI state pattern, and so on. The most left {0} may refer to sequentially the first {0} in the TCI state pattern, the most left {1} may refer to sequentially the first {1} in the TCI state pattern, the second-most left {0} may refer to sequentially the second {0} in the TCI state pattern, the second-most left {1} may refer to sequentially the second {0} in the TCI state pattern, etc. For example, with respect to the first TCI state pattern, a pair, an association and/or a bundle of each two pairs of monitoring occasions may be {m0, m1} {m2, m3} {m4, m5} {m6, m7}. Alternatively and/or additionally, with respect to the second TCI state pattern, a pair, an association and/or a bundle of each two pairs of monitoring occasions may be {m0, m2} {m1, m3} {m4, m6} {m5, m7}.

In some examples, the first search space provides one or more first monitoring occasions (in a periodic manner, for example). For example, the one or more first monitoring occasions may be periodic monitoring occasions and/or the one or more first monitoring occasions associated with the first search space may occur periodically (according to a periodicity, for example).

In some examples, the second search space provides one or more second monitoring occasions (in a periodic manner, for example). For example, the one or more second monitoring occasions may be periodic monitoring occasions and/or the one or more second monitoring occasions associated with the second search space may occur periodically (according to a periodicity, for example).

In some examples, the one or more first monitoring occasions are associated with the first search space and the first CORESET.

In some examples, the one or more second monitoring occasions are associated with the first search space and the second CORESET.

Figure 16:
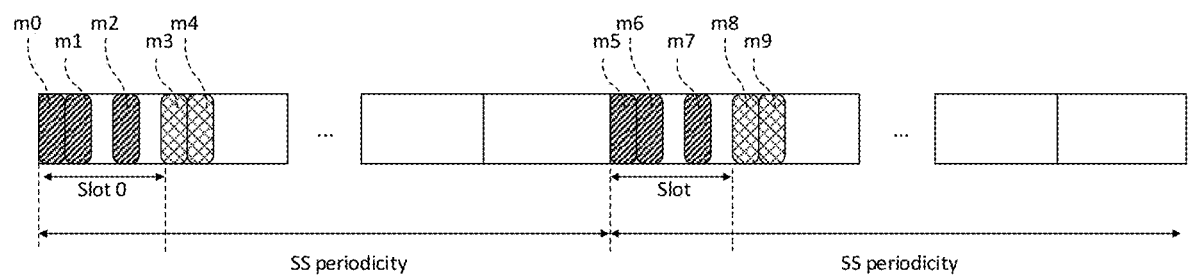
FIG. 16 is a diagram illustrating monitoring occasions associated with a first search space and/or a second search space according to one exemplary embodiment.

In some examples, a pair, an association and/or a bundle of each two pairs may be unequal. For example, in FIG. 16, monitoring occasions {m0, m1, m2} are associated with (e.g., configured to and/or belonging to) the first search space (SS) and monitoring occasions {m3, m4} are associated with (e.g., configured to and/or belonging to) the second search space (SS). A number of monitoring occasions in one pair, association and/or bundle may be 5 (e.g., monitoring occasions {m0~m4}). The UE may monitor monitoring occasions m0~m2 via a TCI state associated with the first CORESET, and the UE may monitor monitoring occasions m3~m4 via a TCI state associated with the second CORESET.

In some examples, the first monitoring occasion is associated with the first TCI state.

In some examples, the UE monitors the one or more first monitoring occasions via the first TCI state.

In some examples, the second monitoring occasion is associated with the second TCI state.

In some examples, the UE monitors the one or more second monitoring occasions via the second TCI state.

In some examples, the UE receives the first PDCCH via the first TCI state.

In some examples, the UE receives the second PDCCH via the second TCI state.

In some examples, the first search space and the second search space are different.

It is noted that throughout the present disclosure, TCI state and/or the concept of TCI state may refer to and/or may be replaced with beam, receiving beam, spatial QCL assumption, spatial parameter and/or spatial filter.

One, some and/or all of the foregoing techniques and/or embodiments can be formed to a new embodiment.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 17:
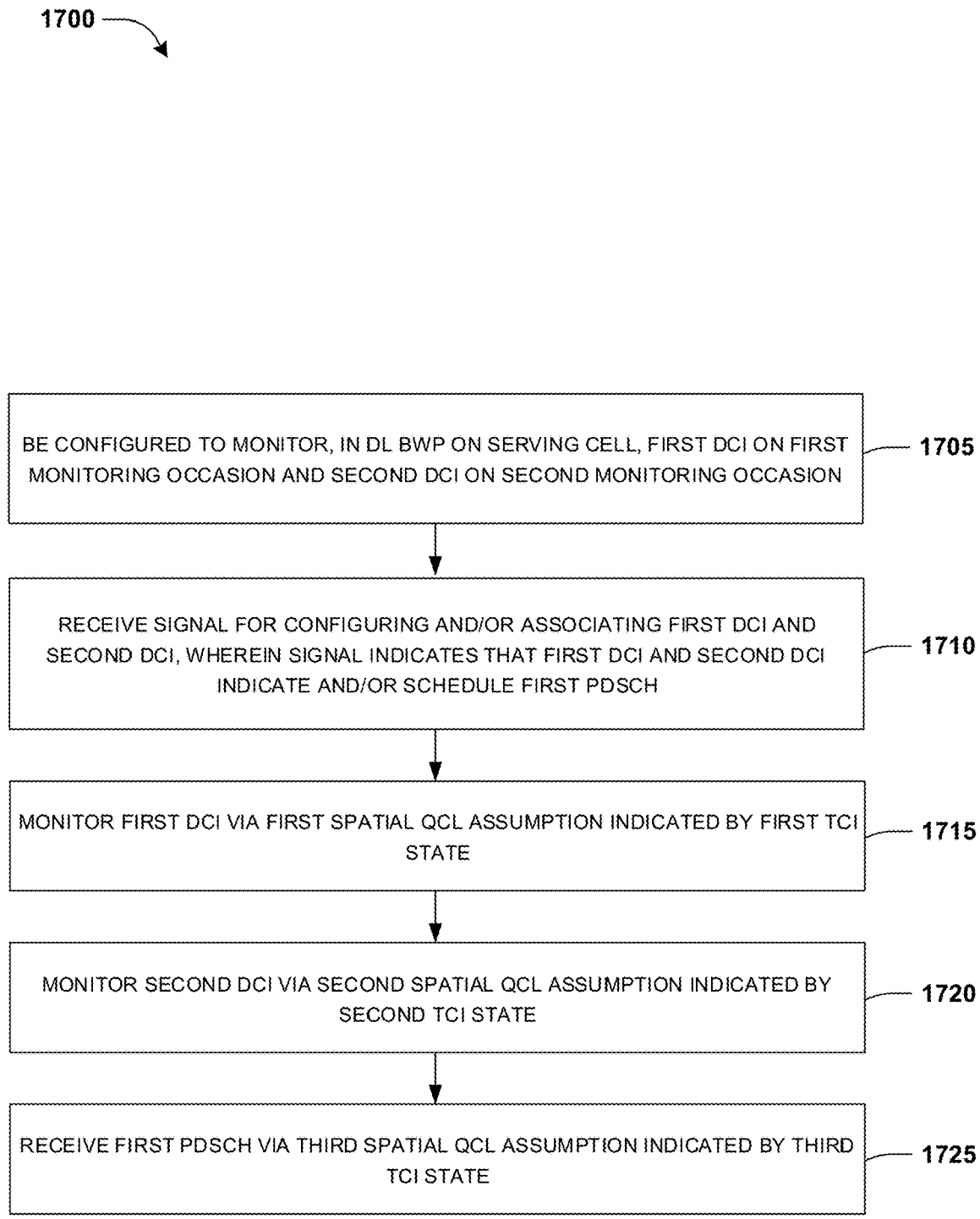
FIG. 17 is a flow chart according to one exemplary embodiment.

FIG. 17 is a flow chart 1700 according to one exemplary embodiment from the perspective of a UE (e.g., a UE in a wireless communication system). In step 1705, the UE is configured to monitor, in a downlink BWP on a serving cell, a first DCI on a first monitoring occasion and a second DCI on a second monitoring occasion. In step 1710, the UE may receive a signal (e.g., a message) for configuring and/or associating the first DCI and the second DCI (e.g., the signal may be indicative of a configuration of the first DCI and the second DCI and/or the signal may be indicative of an association between the first DCI and the second DCI), wherein the signal indicates that the first DCI and the second DCI indicate and/or schedule a first PDSCH (e.g., one PDSCH) (e.g., the signal indicates that the first DCI and the second DCI indicate and/or schedule the first PDSCH with same time-frequency resource allocation). In step 1715, the UE monitors the first DCI via a first spatial QCL assumption indicated by a first TCI state. In step 1720, the UE monitors the second DCI via a second spatial QCL assumption indicated by a second TCI state. In step 1725, the UE receives the first PDSCH (e.g., the one PDSCH) via a third spatial QCL assumption indicated by a third TCI state (e.g., a specific TCI state).

In one embodiment, the third TCI state is used for a plurality of DCIs and/or a plurality of monitoring occasions scheduling for the first PDSCH (e.g., the third TCI state is used for a plurality of DCIs and/or a plurality of monitoring occasions that are used to schedule the first PDSCH).

In one embodiment, the first CORESET is associated with one or more active TCI states. The one or more active TCI states may comprise the first TCI state.

In one embodiment, the first CORESET is associated with two active TCI states (e.g., the first TCI state and the second TCI state).

In one embodiment, upon (and/or in response to and/or after) the UE receiving the signal, the UE may determine (e.g., derive) the second TCI state and/or the UE may activate the second TCI state for receiving the first CORESET.

In one embodiment, the first monitoring occasion and the second monitoring occasion occupy non-overlapped OFDM symbols in time domain. For example, one or more OFDM symbols occupied by the first monitoring occasion may not overlap with one or more OFDM symbols occupied by the second monitoring occasion.

In one embodiment, the first monitoring occasion is in a different slot than the second monitoring occasion.

In one embodiment, the first monitoring occasion is in the same slot as the second monitoring occasion.

In one embodiment, the first CORESET is not configured and/or enabled with tci-PresentInDCI (e.g., tci-PresentInDCI is not enabled for the first CORESET).

In one embodiment, upon (and/or in response to and/or after) the UE receiving the signal, the UE considers, applies and/or determines (based on the signal, for example) an association, a bundle and/or a pairing between the first DCI and the second DCI.

In one embodiment, upon (and/or in response to and/or after) the UE receiving the signal, the UE considers, applies and/or determines (based on the signal, for example) an association, a bundle and/or a pairing between the first monitoring occasion and the second monitoring occasion.

In one embodiment, the UE receives the first PDSCH based on the third TCI state regardless of whether or not the first DCI and/or the second DCI are successfully detected.

In one embodiment, the UE receives the first PDSCH based on the third TCI state regardless of whether or not a DCI (e.g., one DCI) of the first DCI and the second DCI is successfully detected.

In one embodiment, the UE receives the first PDSCH based on the third TCI state regardless of whether or not both of the first DCI and the second DCI are successfully detected.

In one embodiment, if the UE only receives the second DCI or the first DCI, or if the UE receives both the first DCI and the second DCI, the UE receives the PDSCH based on the third TCI state (rather than receiving the PDSCH based on the first TCI state and/or the second TCI state).

In one embodiment, upon (and/or in response to and/or after) the UE receiving a DCI on a monitoring occasion on the first CORESET, where the DCI and/or the monitoring occasion are without an association, without a bundle and/or without pairing, the UE receives a PDSCH scheduled by the DCI based on the first TCI state.

In one embodiment, before the UE receives the signal (and/or if the UE does not receive the signal and/or if the UE does not receive the signal before receiving a PDSCH scheduled by the first DCI), the UE receives the PDSCH (e.g., the first PDSCH), scheduled by the first DCI, based on the first TCI state (e.g., an active TCI state of the first CORESET).

In one embodiment, a first interval (e.g., a time domain interval, such as a distance and/or a duration) between the first monitoring occasion and the first PDSCH is larger than or equal to a threshold. In some examples, the first interval is in units of OFDM symbols (e.g., the interval is indicative of a number of OFDM symbols between the first monitoring occasion and the first PDSCH). In some examples, the first interval corresponds to an interval between a last OFDM symbol of the first monitoring occasion and the first PDSCH (e.g., the first interval may be indicative of a number of OFDM symbols between the last OFDM symbol of the first monitoring occasion and the first PDSCH).

In one embodiment, a second interval (e.g., a time domain interval, such as a distance and/or a duration) between the second monitoring occasion and the first PDSCH is larger than or equal to the threshold. In some examples, the second interval is in units of OFDM symbols (e.g., the second interval is indicative of a number of OFDM symbols between the second monitoring occasion and the first PDSCH). In some examples, the second interval corresponds to an interval between a last OFDM symbol of the second monitoring occasion and the first PDSCH (e.g., the second interval may be indicative of a number of OFDM symbols between the last OFDM symbol of the second monitoring occasion and the first PDSCH).

In one embodiment, the first interval between the first monitoring occasion and the first PDSCH is smaller than the threshold.

In one embodiment, the second interval between the second monitoring occasion and the first PDSCH is smaller than the threshold.

In one embodiment, the threshold is used for determining whether or not to use a default beam of a default TCI state for receiving a scheduled PDSCH.

In one embodiment, the UE is not expected (and/or does not expect) that an interval of the first interval and the second interval is larger than the threshold and another interval of the first interval and the second interval is smaller than the threshold.

In one embodiment, the UE is not expected (and/or does not expect) that the first interval and the second interval are configured and/or indicated (with a configuration and/or an indication, for example) such that an interval of the first interval and the second interval is larger than the threshold and another interval of the first interval and the second interval is smaller than the threshold.

In one embodiment, the signal indicates the third TCI state.

In one embodiment, the third TCI state is the first TCI state or the second TCI state.

In one embodiment, the third TCI state is a TCI state other than the first TCI state and the second TCI state.

In one embodiment, the third TCI state is a primary TCI state of the first CORESET.

In one embodiment, the third TCI state is determined based on (e.g., derived from) a primary TCI state of the first CORESET.

In one embodiment, the first DCI and the second DCI are associated with a first CORESET.

In one embodiment, the UE is configured with a first set of CORESETs (in the serving cell, for example). Alternatively and/or additionally, the first set of CORESETs may be associated with a first TRP. Alternatively and/or additionally, the first set of CORESETs may comprise the first CORESET (and/or may comprise one or more other CORESETs in addition to the first CORESET).

In one embodiment, the UE is configured with a second set of CORESETs (in the serving cell, for example). Alternatively and/or additionally, the second set of CORESETs may be associated with a second TRP. Alternatively and/or additionally, the second set of CORESETs may comprise the second CORESET (and/or may comprise one or more other CORESETs in addition to the second CORESET).

In one embodiment, the first DCI is associated with a first CORESET.

In one embodiment, the second DCI is associated with a second CORESET.

In one embodiment, the first CORESET is associated with one or more active TCI states. The one or more active TCI states associated with the first CORESET may comprise the first TCI state.

In one embodiment, the second CORESET is associated with one or more active TCI states. The one or more active TCI states associated with the second CORESET may comprise the second TCI state.

In one embodiment, the first CORESET is associated with two active TCI states. The two active TCI states associated with the first CORESET may comprise the first TCI state and a fourth TCI state.

In one embodiment, the second CORESET is associated with two active TCI states. The two active TCI states associated with the second CORESET may comprise the first TCI state and a fifth TCI state.

In one embodiment, the fourth TCI state is the same as the fifth TCI state.

In one embodiment, the fourth TCI state and the fifth TCI state are used for indicating the third TCI state for a pairing, bundling and/or association between the first DCI and the second DCI.

In one embodiment, the fourth TCI state and the fifth TCI state are used for indicating the third TCI state for a pairing, bundling and/or association between the first monitoring occasion and the second monitoring occasion.

In embodiment, the fourth TCI state and the fifth TCI state are used for indicating the third TCI state for a pairing, bundling and/or association between the first CORESET and the second CORESET.

In one embodiment, the first CORESET and the second CORESET are associated with different CORESET pool identities (e.g., CORESETPoolIndex). For example, the first CORESET may be associated with a first CORESET pool identity (e.g., a first CORESETPoolIndex) and the second CORESET may be associated with a second CORESET pool identity (e.g., a second CORESETPoolIndex) different than the first CORESET pool identity.

In one embodiment, upon (and/or in response to and/or after) the UE receiving the signal, the UE may determine (e.g., derive) the fourth TCI state or the fifth TCI state for the third TCI state. For example, the UE may determine that the third TCI state is the fourth TCI state or the fifth TCI state based on the signal, and/or the UE may use the third TCI state (e.g., the fourth TCI state or the fifth TCI state) to receive the first PDSCH.

In one embodiment, upon (and/or in response to and/or after) the UE receiving the signal, the UE may activate the fourth TCI state or the fifth TCI state for the third TCI state. For example, the UE may activate the fourth TCI state or the fifth TCI state based on the signal, and/or the UE may use the fourth TCI state or the fifth TCI state to receive the first PDSCH (e.g., the third TCI state used to receive the first PDSCH may be the fourth TCI state or the fifth TCI state).

In one embodiment, the first monitoring occasion and the second monitoring occasion occupy non-overlapped OFDM symbols in time domain. For example, one or more OFDM symbols occupied by the first monitoring occasion may not overlap with one or more OFDM symbols occupied by the second monitoring occasion.

In one embodiment, the first monitoring occasion and the second monitoring occasion are associated with a search space configuration (e.g., one search space configuration).

In one embodiment, the first monitoring occasion is associated with a first search space configuration and/or a first search space and/or the second monitoring occasion is associated with a second search space configuration and/or a second search space.

In one embodiment, the first CORESET is not configured and/or enabled with tci-PresentInDCI (e.g., tci-PresentInDCI is not enabled for the first CORESET).

In one embodiment, the second CORESET is not configured and/or enabled with tci-PresentInDCI (e.g., tci-PresentInDCI is not enabled for the second CORESET).

In one embodiment, upon (and/or in response to and/or after) the UE receiving the signal, the UE considers, applies and/or determines (based on the signal, for example) an association, a bundle and/or a pairing between the first DCI and the second DCI.

In one embodiment, upon (and/or in response to and/or after) the UE receiving the signal, the UE considers, applies and/or determines (based on the signal, for example) an association, a bundle and/or a pairing between the first monitoring occasion and the second monitoring occasion.

In one embodiment, upon (and/or in response to and/or after) the UE receiving the signal, the UE considers, applies and/or determines (based on the signal, for example) an association, a bundle and/or a pairing between the first CORESET and the second CORESET. In some examples, the signal provides information related to (and/or indicative of) a bundle and/or pair of two PDCCHs, a bundle and/or pair of two CORESETs, a bundle and/or pair of two monitoring occasions of respective CORESET, and/or a bundle and/or pair of two search spaces.

In one embodiment, before the UE receives the signal (and/or if the UE does not receive the signal and/or if the UE does not receive the signal before receiving a PDSCH scheduled by the first DCI), the UE receives the PDSCH (e.g., the first PDSCH), scheduled by the first DCI, based on the first TCI state (e.g., an active TCI state of the first CORESET).

In one embodiment, before the UE receives the signal (and/or if the UE does not receive the signal and/or if the UE does not receive the signal before receiving a PDSCH scheduled by the second DCI), the UE receives the PDSCH (e.g., the first PDSCH), scheduled by the second DCI, based on the second TCI state (e.g., an active TCI state of the second CORESET).

In one embodiment, if a pairing, a bundling and/or an association are not canceled (e.g., if the pairing, the bundling and/or the association are not canceled upon, in response to and/or after receiving the signal), the UE receives the first PDSCH, scheduled by the second DCI and/or the first DCI, based on the third TCI state (e.g., the third TCI state may be the secondary active TCI state of the first CORESET or the secondary active TCI state of the second CORESET). In some examples, the pairing, the bundling and/or the association (that are not canceled) may correspond to a pairing, a bundling and/or an association between the first DCI and the second DCI. Alternatively and/or additionally, the pairing, the bundling and/or the association (that are not canceled) may correspond to a pairing, a bundling and/or an association between the first monitoring occasion and the second monitoring occasion. Alternatively and/or additionally, the pairing, the bundling and/or the association (that are not canceled) may correspond to a pairing, a bundling and/or an association between the first CORESET and the second CORESET. Alternatively and/or additionally, the pairing, the bundling and/or the association (that are not canceled) may correspond to a pairing, a bundling and/or an association between a first search space and a second search space.

In one embodiment, the signal indicates the third TCI state.

In one embodiment, the signal indicates a CORESET among the paired, the bundled and/or the associated CORESETs (indicated by the signal, for example) for determining (e.g., deriving) the third TCI state. For example, the paired, the bundled and/or the associated CORESETs may comprise the first CORESET and the second CORESET. The CORESET indicated by the signal may be used to determine (e.g., derive) the third TCI state.

In one embodiment, the signal indicates a DCI among the paired, the bundled and/or the associated DCIs (indicated by the signal, for example) for determining (e.g., deriving) the third TCI state. For example, the paired, the bundled and/or the associated DCIs may comprise the first DCI and the second DCI. The DCI indicated by the signal may be used to determine (e.g., derive) the third TCI state.

In one embodiment, the signal indicates one or more criteria for determining the third TCI state.

In one embodiment, the third TCI state is the first TCI state or the second TCI state.

In one embodiment, the third TCI state is a TCI state other than the first TCI state and the second TCI state.

In one embodiment, the third TCI state is the fourth TCI state or the fifth TCI state.

In one embodiment, the third TCI state is the secondary active TCI state of the first CORESET or the secondary active TCI state of the second CORESET.

In one embodiment, the third TCI state is determined based on (e.g., derived from) the secondary active TCI state of the first CORESET or the secondary active TCI state of the second CORESET.

In one embodiment, the third TCI state is determined based on (e.g., derived from) an earlier (e.g., earliest) monitoring occasion of a pair, an association and/or a bundle of monitoring occasions comprising a first monitoring occasion (e.g., one first monitoring occasion) and a second monitoring occasion (e.g., one second monitoring occasion). Alternatively and/or additionally, if the first monitoring occasion is earlier than the second monitoring occasion (that is paired, associated and/or bundled with the first monitoring occasion, for example), the third TCI state may be determined based on (e.g., derived from) the first CORESET (e.g., the third TCI state may be based on the first TCI state and/or the third TCI state may be the first TCI state). Alternatively and/or additionally, if the UE receives and/or detects (e.g., if the UE only receives and/or detects) the second DCI on a latter (e.g., last) monitoring occasion of the pair, the association and/or the bundle of monitoring occasions (e.g., if the UE only receives and/or detects the second DCI on the second monitoring occasion), the UE determines (e.g., derives) and/or considers the third TCI state based on the earlier (e.g., earliest) associated monitoring occasion (e.g., the first monitoring occasion), such as based on the first TCI state (e.g., the third TCI state may be the first TCI state). The latter (e.g., last) monitoring occasion, of the pair, the association and/or the bundle of monitoring occasions, is after the earlier (e.g., earliest) monitoring occasion of the pair, the association and/or the bundle of monitoring occasions.

In one embodiment, the third TCI state is determined based on (e.g., derived from) a latter (e.g., last) monitoring occasion of a pair, an association and/or a bundle of monitoring occasions comprising a first monitoring occasion (e.g., one first monitoring occasion) and a second monitoring occasion (e.g., one second monitoring occasion). Alternatively and/or additionally, if the second monitoring occasion is after the first monitoring occasion (that is paired, associated and/or bundled with the second monitoring occasion, for example), the third TCI state may be determined based on (e.g., derived from) the second CORESET (e.g., the third TCI state may be based on the second TCI state and/or the third TCI state may be the second TCI state). Alternatively and/or additionally, if the UE receives and/or detects (e.g., if the UE only receives and/or detects) the first DCI on an earlier (e.g., earliest) monitoring occasion of the pair, the association and/or the bundle of monitoring occasions (e.g., if the UE only receives and/or detects the second DCI on the first monitoring occasion), the UE determines (e.g., derives) and/or considers the third TCI state based on the latter (e.g., last) associated monitoring occasion (e.g., the second monitoring occasion), such as based on the second TCI state (e.g., the third TCI state may be the second TCI state). The earlier (e.g., earliest) monitoring occasion, of the pair, the association and/or the bundle of monitoring occasions, is before the latter (e.g., last) monitoring occasion of the pair, the association and/or the bundle of monitoring occasions.

In one embodiment, the third TCI state is determined based on (e.g., derived from) a CORESET with a lowest CORESET identity among the pair, the bundle and/or the association of CORESETs comprising the first CORESET and the second CORESET (e.g., the third TCI state is determined based on (e.g., derived from) a CORESET with a lowest CORESET identity among the first CORESET and the second CORESET).

In one embodiment, the third TCI state is determined based on (e.g., derived from) a CORESET with a highest CORESET identity among the pair, the bundle and/or the association of CORESETs comprising the first CORESET and the second CORESET (e.g., the third TCI state is determined based on (e.g., derived from) a CORESET with a highest CORESET identity among the first CORESET and the second CORESET).

In one embodiment, the third TCI state is determined based on (e.g., derived from) a best quality (e.g., a best channel quality) among: (i) a latest (e.g., most recent) Reference Signal Received Power (RSRP) report (e.g., Layer 1/Layer 3 (L1/L3) RSRP report), a latest (e.g., most recent) Channel State Information (CSI) report (e.g., L1/L3-CSI report), a latest (e.g., most recent) beam report (e.g., L1/L3-beam report) and/or a latest (e.g., most recent) Reference Signal (RS) report (e.g., L1/L3-RS report) for the first CORESET and/or the first TCI state, and (ii) a latest (e.g., most recent) RSRP report (e.g., L1/L3-RSRP report), a latest (e.g., most recent) CSI report (e.g., L1/L3-CSI report), a latest (e.g., most recent) beam report (e.g., L1/L3-beam report) and/or a latest (e.g., most recent) RS report (e.g., L1/L3-RS report) for the second CORESET and/or the second TCI state.

In one embodiment, the third TCI state is determined based on (e.g., derived from), such as always determined based on (e.g., always derived from), a third CORESET (e.g., a specific CORESET). The third CORESET may be a CORESET on a latest (e.g., most recent) slot in which the UE monitors the first set of CORESETs for scheduling a PDSCH within the active downlink BWP on the serving cell, wherein the third CORESET has a lowest CORESET identity (ID) among CORESETs on the latest (e.g., most recent) slot. Alternatively and/or additionally, the third CORESET may be a CORESET on a latest (e.g., most recent) slot where the UE monitors the first set of CORESETs for scheduling a PDSCH within the active downlink BWP on the serving cell. Alternatively and/or additionally, the third CORESET may be a CORESET with the lowest CORESET identity among CORESETs on the latest slot.

In one embodiment, the first set of CORESETs is associated with a lowest CORESET pool identity (among CORESET pool identities with which the UE is configured, for example.

In one embodiment, the first set of CORESETs is associated with a highest CORESET pool identity (among CORESET pool identities with which the UE is configured, for example.

In one embodiment, if the UE detects and/or receives the second DCI (and/or if the UE only detects and/or receives the second DCI, such as without detecting and/or receiving the first DCI), the UE determines (e.g., derives) and/or considers the third TCI state based on a best quality (e.g., a best channel quality) among: (i) a latest (e.g., most recent) RSRP report (e.g., L1/L3-RSRP report), a latest (e.g., most recent) CSI report (e.g., L1/L3-CSI report), a latest (e.g., most recent) beam report (e.g., L1/L3-beam report) and/or a latest (e.g., most recent) RS report (e.g., L1/L3-RS report) for the first CORESET and/or the first TCI state, and/or (ii) a latest (e.g., most recent) RSRP report (e.g., L1/L3-RSRP report), a latest (e.g., most recent) CSI report (e.g., L1/L3-CSI report), a latest (e.g., most recent) beam report (e.g., L1/L3-beam report) and/or a latest (e.g., most recent) RS report (e.g., L1/L3-RS report) for the second CORESET and/or the second TCI state. The second DCI may be included in the second set of CORESETs.

In one embodiment, if the UE detects and/or receives the second DCI (and/or if the UE only detects and/or receives the second DCI, such as without detecting and/or receiving the first DCI) and if the bundle, the associated and/or the pair of DCIs comprising the first DCI and the second DCI is associated with the first set of CORESETs, the UE determines (e.g., derives) and/or considers the third TCI state based on a best quality (e.g., a best channel quality) among: (i) a latest (e.g., most recent) RSRP report (e.g., L1/L3-RSRP report), a latest (e.g., most recent) CSI report (e.g., L1/L3-CSI report), a latest (e.g., most recent) beam report (e.g., L1/L3-beam report) and/or a latest (e.g., most recent) RS report (e.g., L1/L3-RS report) for the first CORESET and/or the first TCI state, and/or (ii) a latest (e.g., most recent) RSRP report (e.g., L1/L3-RSRP report), a latest (e.g., most recent) CSI report (e.g., L1/L3-CSI report), a latest (e.g., most recent) beam report (e.g., L1/L3-beam report) and/or a latest (e.g., most recent) RS report (e.g., L1/L3-RS report) for the second CORESET and/or the second TCI state. The second DCI may be included in the second set of CORESETs.

In one embodiment, spatial QCL assumption corresponds to (and/or means and/or implies) a beam that is used by the UE to receive (e.g., receive at least one of a signal, a channel, information, an indication, etc.).

Referring back to FIGS. 3 and 4, in one exemplary embodiment of a UE (e.g., a UE in a wireless communication system), the device 300 includes a program code 312 stored in the memory 310. The CPU 308 may execute program code 312 to enable the UE (i) to be configured to monitor, in a downlink BWP on a serving cell, a first DCI on a first monitoring occasion and a second DCI on a second monitoring occasion, (ii) to receive a signal (e.g., a message) for configuring and/or associating the first DCI and the second DCI (e.g., the signal may be indicative of a configuration of the first DCI and the second DCI and/or the signal may be indicative of an association between the first DCI and the second DCI), wherein the signal indicates that the first DCI and the second DCI indicate and/or schedule a first PDSCH (e.g., one PDSCH) (e.g., the signal indicates that the first DCI and the second DCI indicate and/or schedule the first PDSCH with same time-frequency resource allocation), (iii) to monitor the first DCI via a first spatial QCL assumption indicated by a first TCI state, (iv) to monitor the second DCI via a second spatial QCL assumption indicated by a second TCI state, and (v) to receive the first PDSCH (e.g., the one PDSCH) via a third spatial QCL assumption indicated by a third TCI state (e.g., a specific TCI state). Furthermore, the CPU 308 can execute the program code 312 to perform one, some and/or all of the above-described actions and steps and/or others described herein.

Figure 18:
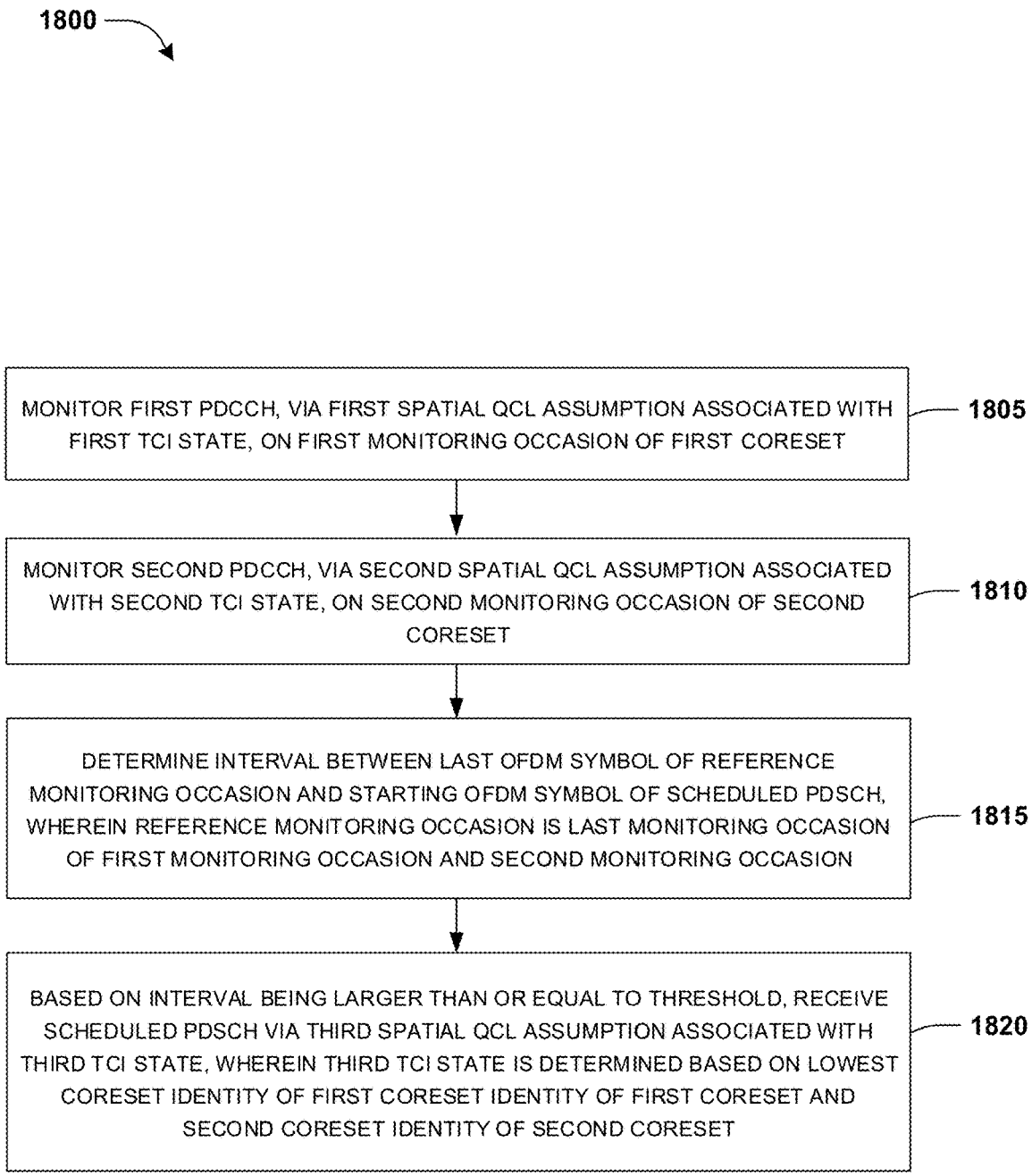
FIG. 18 is a flow chart according to one exemplary embodiment.

FIG. 18 is a flow chart 1800 according to one exemplary embodiment from the perspective of a UE (e.g., a UE in a wireless communication system). In step 1805, the UE monitors a first PDCCH, via a first spatial QCL assumption associated with a first TCI state, on a first monitoring occasion of a first CORESET. In step 1810, the UE monitors a second PDCCH, via a second spatial QCL assumption associated with a second TCI state, on a second monitoring occasion of a second CORESET. In step 1815, the UE determines an interval (e.g., a time domain interval, such as a distance and/or a duration, in units of at least one of slots, symbols, time, etc.) between a last OFDM symbol of a reference monitoring occasion and a starting (e.g., initial) OFDM symbol of a scheduled PDSCH, wherein the reference monitoring occasion is a last (and/or latter) monitoring occasion (in time domain) of the first monitoring occasion (of the first CORESET) and the second monitoring occasion (of the second CORESET). For example, the reference monitoring occasion may be the first monitoring occasion if the first monitoring occasion is after the second monitoring occasion. Alternatively and/or additionally, the reference monitoring occasion may be the second monitoring occasion if the second monitoring occasion is after the first monitoring occasion. In step 1820, based on the interval being larger than or equal to a threshold, the UE receives the scheduled PDSCH via a third spatial QCL assumption associated with a third TCI state (e.g., a specific TCI state), wherein the third TCI state is determined based on a lowest CORESET identity (ID) of a first CORESET identity of the first CORESET and a second CORESET identity of the second CORESET. For example, the third spatial QCL assumption associated with the third TCI state (that is determined based on the lowest CORESET identity of the first CORESET identity and the second CORESET identity) may be used to receive the scheduled PDSCH if the interval is larger than or equal to the threshold.

In one embodiment, the third TCI state is determined based on a CORESET associated with the lowest CORESET identity. For example, the third TCI state may be determined based on the first CORESET if the first CORESET identity is lower than the second CORESET identity. Alternatively and/or additionally, the third TCI state may be determined based on the second CORESET if the second CORESET identity is lower than the first CORESET identity.

In one embodiment, the scheduled PDSCH is scheduled by the first PDCCH and the second PDCCH.

In one embodiment, the threshold is associated with (e.g., used for) determining whether or not to use a default beam of a default TCI state for reception of a PDSCH.

In one embodiment, the threshold is timeDurationForQCL.

In one embodiment, the first TCI state is activated for receiving the first CORESET and the first PDCCH does not comprise a TCI field, the first CORESET is not configured (and/or enabled) with tci-PresentInDCI, tci-PresentInDCI is not enabled for the first CORESET, the second TCI state is activated for receiving the second CORESET and the second PDCCH does not comprise a TCI field, the second CORESET is not configured (and/or enabled) with tci-PresentInDCI, and/or tci-PresentInDCI is not enabled for the second CORESET.

In one embodiment, the third TCI state is the first TCI state or the second TCI state.

In one embodiment, the third TCI state is the first TCI state if the first CORESET identity of the first CORESET is lower than the second CORESET identity of the second CORESET.

In one embodiment, the third TCI state is the second TCI state if the second CORESET identity is lower than the first CORESET identity of the first CORESET.

In one embodiment, the UE receives a signal (e.g., a message) indicative of a first search space, comprising the first PDCCH, and indicative of a second search space comprising the second PDCCH. In some examples, the signal may be for configuring and/or associating the first search space and the second search space.

In one embodiment, based on an association of the first search space and the second search space (e.g., the signal may be indicative of the association of the first search space and the second search space), the first PDCCH and the second PDCCH are associated with scheduling the scheduled PDSCH (and/or the first PDCCH and the second PDCCH are associated with scheduling same information, such as same time-frequency resource allocation information, for the scheduled PDSCH). In some examples, the association of the first search space and the second search space may correspond to an association between the first search space and the second search space. Alternatively and/or additionally, the association of the first search space and the second search space may correspond to an association between the first search space and the scheduled PDSCH and/or an association between the second search space and the scheduled PDSCH.

In one embodiment, the first monitoring occasion (of the first CORESET) and the second monitoring occasion (of the second CORESET) are in a first slot (e.g., slot n).

In one embodiment, the UE monitors one or more PDCCHs, associated with one or more CORESETs, in a second slot (e.g., slot m), wherein the second slot is different than the first slot and the second slot is a most recent (e.g., latest) slot in which the UE monitors PDCCH before receiving the scheduled PDSCH.

In one embodiment, the one or more CORESETs comprise a third CORESET with a lowest CORESET identity among one or more CORESET identities of the one or more CORESETs.

In one embodiment, the one or more CORESETs comprise one or more second CORESETs other than the first CORESET and the second CORESET.

In one embodiment, the first monitoring occasion of the first CORESET is in a downlink BWP on a serving cell, and the second monitoring occasion of the second CORESET is in the downlink BWP on the serving cell.

In one embodiment, the UE is configured with a first search space and a second search space in the downlink BWP.

In one embodiment, the first monitoring occasion of the first CORESET is associated with the first search space.

In one embodiment, the second monitoring occasion of the second CORESET is associated with the second search space.

Referring back to FIGS. 3 and 4, in one exemplary embodiment of a UE (e.g., a UE in a wireless communication system), the device 300 includes a program code 312 stored in the memory 310. The CPU 308 may execute program code 312 to enable the UE (i) to monitor a first PDCCH, via a first spatial QCL assumption associated with a first TCI state, on a first monitoring occasion of a first CORESET, (ii) to monitor a second PDCCH, via a second spatial QCL assumption associated with a second TCI state, on a second monitoring occasion of a second CORESET, (iii) to determine an interval between a last OFDM symbol of a reference monitoring occasion and a starting OFDM symbol of a scheduled PDSCH, wherein the reference monitoring occasion is a last monitoring occasion of the first monitoring occasion and the second monitoring occasion, and (iv) based on the interval being larger than or equal to a threshold, to receive the scheduled PDSCH via a third spatial QCL assumption associated with a third TCI state, wherein the third TCI state is determined based on a lowest CORESET identity of a first CORESET identity of the first CORESET and a second CORESET identity of the second CORESET. Furthermore, the CPU 308 can execute the program code 312 to perform one, some and/or all of the above-described actions and steps and/or others described herein.

Figure 19:
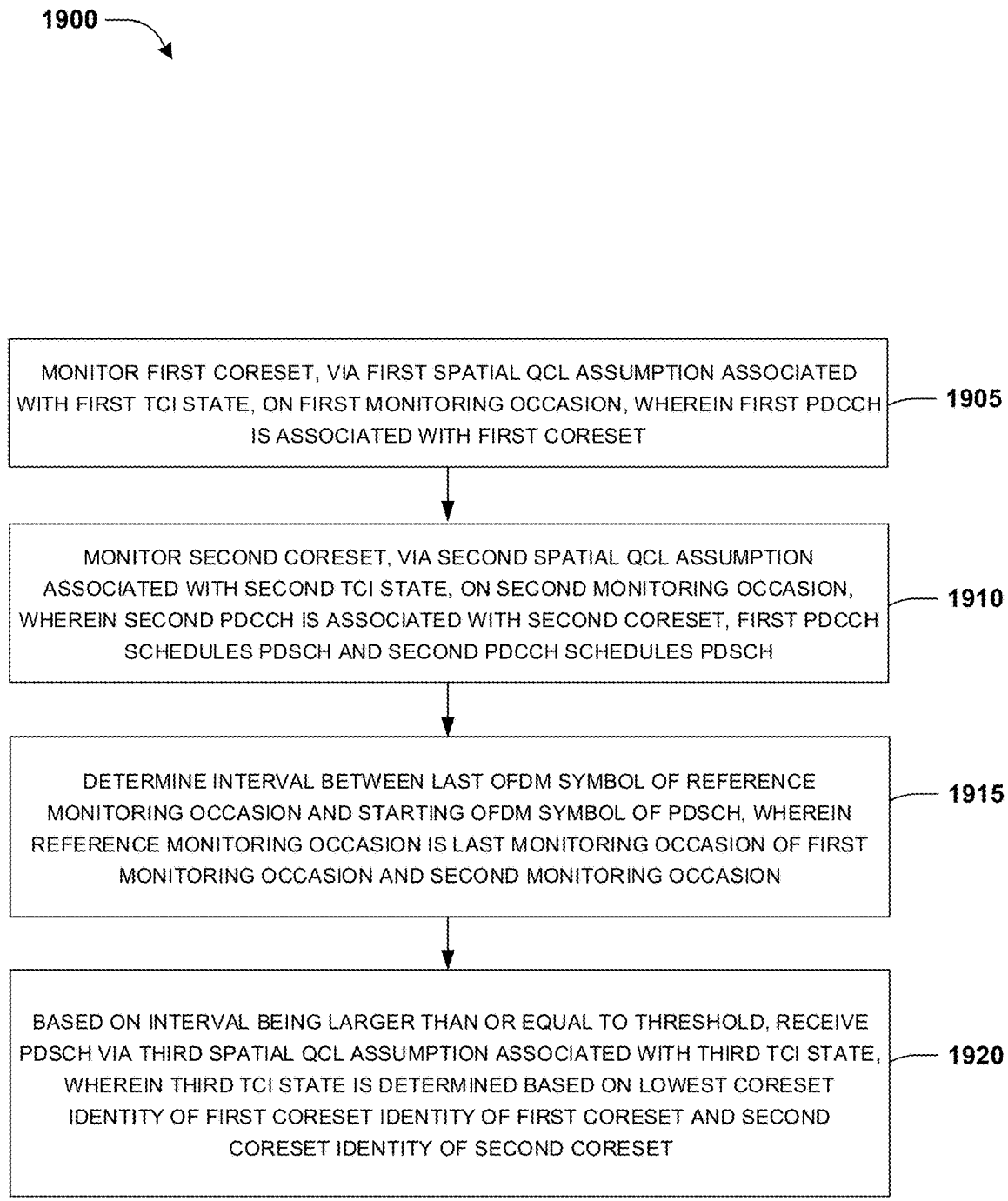
FIG. 19 is a flow chart according to one exemplary embodiment.

FIG. 19 is a flow chart 1900 according to one exemplary embodiment from the perspective of a UE (e.g., a UE in a wireless communication system). In step 1905, the UE monitors a first CORESET, via a first spatial QCL assumption associated with a first TCI state, on a first monitoring occasion, wherein a first PDCCH is associated with the first CORESET. In step 1910, the UE monitors a second CORESET, via a second spatial QCL assumption associated with a second TCI state, on a second monitoring occasion, wherein a second PDCCH is associated with the second CORESET. The first PDCCH schedules a PDSCH and the second PDCCH schedules the PDSCH (e.g., both the first PDCCH and the second PDCCH schedule the PDSCH). In some examples, the first PDCCH schedules one or more transmissions (other than the PDSCH) in addition to scheduling the PDSCH. In some examples, the second PDCCH schedules one or more transmissions (other than the PDSCH) in addition to scheduling the PDSCH. In step 1915, the UE determines an interval (e.g., a time domain interval, such as a distance and/or a duration, in units of at least one of slots, symbols, time, etc.) between a last OFDM symbol of a reference monitoring occasion and a starting (e.g., initial) OFDM symbol of the PDSCH, wherein the reference monitoring occasion is a last (and/or latter) monitoring occasion (in time domain) of the first monitoring occasion and the second monitoring occasion. For example, the reference monitoring occasion may be the first monitoring occasion if the first monitoring occasion is after the second monitoring occasion. Alternatively and/or additionally, the reference monitoring occasion may be the second monitoring occasion if the second monitoring occasion is after the first monitoring occasion. In step 1920, based on the interval being larger than or equal to a threshold, the UE receives the PDSCH via a third spatial QCL assumption associated with a third TCI state (e.g., a specific TCI state), wherein the third TCI state is determined based on a lowest CORESET identity (ID) of a first CORESET identity of the first CORESET and a second CORESET identity of the second CORESET. For example, the third spatial QCL assumption associated with the third TCI state (that is determined based on the lowest CORESET identity of the first CORESET identity and the second CORESET identity) may be used to receive the PDSCH if the interval is larger than or equal to the threshold.

In one embodiment, the third TCI state is determined based on a CORESET associated with the lowest CORESET identity. For example, the third TCI state may be determined based on the first CORESET if the first CORESET identity is lower than the second CORESET identity. Alternatively and/or additionally, the third TCI state may be determined based on the second CORESET if the second CORESET identity is lower than the first CORESET identity.

In one embodiment, the first TCI state is activated for receiving the first CORESET and the first PDCCH does not comprise a TCI field, the first CORESET is not configured (and/or enabled) with tci-PresentInDCI, tci-PresentInDCI is not enabled for the first CORESET, the second TCI state is activated for receiving the second CORESET and the second PDCCH does not comprise a TCI field, the second CORESET is not configured (and/or enabled) with tci-PresentInDCI, and/or tci-PresentInDCI is not enabled for the second CORESET.

In one embodiment, the third TCI state is the first TCI state or the second TCI state.

In one embodiment, the third TCI state is the first TCI state if the first CORESET identity of the first CORESET is lower than the second CORESET identity of the second CORESET.

In one embodiment, the third TCI state is the second TCI state if the second CORESET identity is lower than the first CORESET identity of the first CORESET.

In one embodiment, the first monitoring occasion and the second monitoring occasion are in a first slot (e.g., slot n).

In one embodiment, the UE monitors one or more PDCCHs, associated with one or more CORESETs, in a second slot (e.g., slot m), wherein the second slot is different than the first slot and the second slot is a most recent (e.g., latest) slot in which the UE monitors PDCCH before receiving the PDSCH.

In one embodiment, the one or more CORESETs comprise a third CORESET with a lowest CORESET identity among one or more CORESET identities of the one or more CORESETs.

In one embodiment, the one or more CORESETs comprise one or more second CORESETs other than the first CORESET and the second CORESET.

In one embodiment, the first monitoring occasion is in a downlink BWP on a serving cell, and the second monitoring occasion is in the downlink BWP on the serving cell.

In one embodiment, the UE is configured with a first search space and a second search space in the downlink BWP.

In one embodiment, the first monitoring occasion is associated with the first search space.

In one embodiment, the second monitoring occasion is associated with the second search space.

Referring back to FIGS. 3 and 4, in one exemplary embodiment of a UE (e.g., a UE in a wireless communication system), the device 300 includes a program code 312 stored in the memory 310. The CPU 308 may execute program code 312 to enable the UE (i) to monitor a first CORESET, via a first spatial QCL assumption associated with a first TCI state, on a first monitoring occasion, wherein a first PDCCH is associated with the first CORESET, (ii) to monitor a second CORESET, via a second spatial QCL assumption associated with a second TCI state, on a second monitoring occasion, wherein a second PDCCH is associated with the second CORESET, the first PDCCH schedules a PDSCH (e.g., one PDSCH) and the second PDCCH schedules the PDSCH (e.g., both the first PDCCH and the second PDCCH schedule the one PDSCH), (iii) to determine an interval between a last OFDM symbol of a reference monitoring occasion and a starting OFDM symbol of the PDSCH, wherein the reference monitoring occasion is a last monitoring occasion of the first monitoring occasion and the second monitoring occasion, and (iv) based on the interval being larger than or equal to a threshold, to receive the PDSCH via a third spatial QCL assumption associated with a third TCI state, wherein the third TCI state is determined based on a lowest CORESET identity of a first CORESET identity of the first CORESET and a second CORESET identity of the second CORESET. Furthermore, the CPU 308 can execute the program code 312 to perform one, some and/or all of the above-described actions and steps and/or others described herein.

Figure 20:
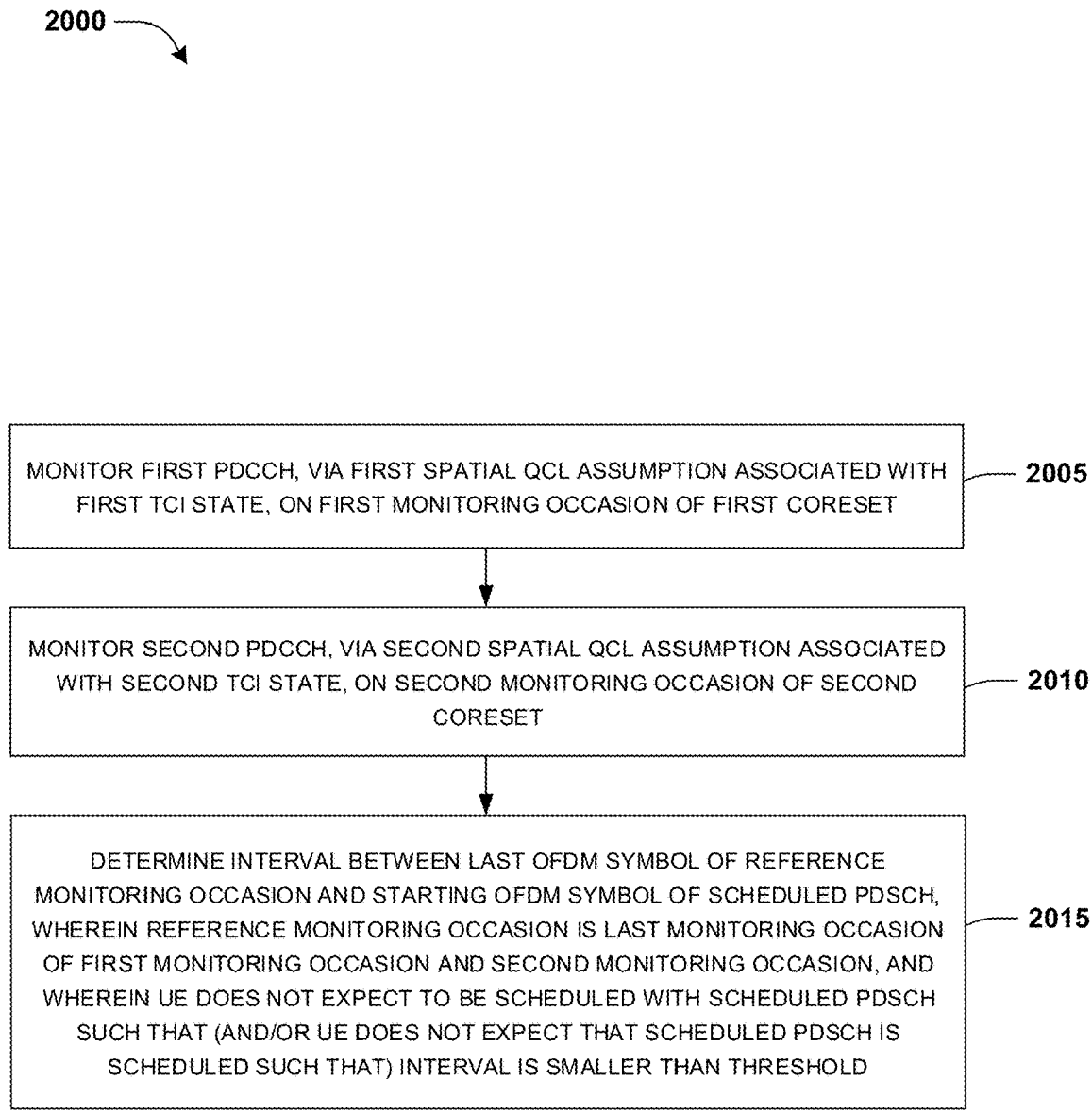
FIG. 20 is a flow chart according to one exemplary embodiment.

FIG. 20 is a flow chart 2000 according to one exemplary embodiment from the perspective of a UE (e.g., a UE in a wireless communication system). In step 2005, the UE monitors a first PDCCH, via a first spatial QCL assumption associated with a first TCI state, on a first monitoring occasion of a first CORESET. In step 2010, the UE monitors a second PDCCH, via a second spatial QCL assumption associated with a second TCI state, on a second monitoring occasion of a second CORESET. In step 2015, the UE determines an interval (e.g., a time domain interval, such as a distance and/or a duration, in units of at least one of slots, symbols, time, etc.) between a last OFDM symbol of a reference monitoring occasion and a starting (e.g., initial) OFDM symbol of a scheduled PDSCH, wherein the reference monitoring occasion is a last (and/or latter) monitoring occasion (in time domain) of the first monitoring occasion (of the first CORESET) and the second monitoring occasion (of the second CORESET), and wherein the UE does not expect to be scheduled with the scheduled PDSCH such that (and/or the UE does not expect that the scheduled PDSCH is scheduled such that) the interval is smaller than a threshold. For example, the UE may not expect the scheduled PDSCH to be scheduled at a time at which the interval would be smaller than the threshold (and/or the scheduled PDSCH may not be scheduled at a time at which the interval would be smaller than the threshold). For example, the reference monitoring occasion may be the first monitoring occasion if the first monitoring occasion is after the second monitoring occasion. Alternatively and/or additionally, the reference monitoring occasion may be the second monitoring occasion if the second monitoring occasion is after the first monitoring occasion.

In one embodiment, the scheduled PDSCH is scheduled by the first PDCCH and the second PDCCH. For example, the UE may not expect that the first PDCCH and the second PDCCH schedule the scheduled PDSCH such that the interval is smaller than the threshold. For example, the UE may not expect the first PDCCH and the second PDCCH to schedule the scheduled PDSCH at a time at which the interval would be smaller than the threshold (and/or the first PDCCH and the second PDCCH may not schedule the scheduled PDSCH at a time at which the interval would be smaller than the threshold).

In one embodiment, the threshold is associated with (e.g., used for) determining whether or not to use a default beam of a default TCI state for reception of a PDSCH.

In one embodiment, the threshold is timeDurationForQCL.

In one embodiment, the first TCI state is activated for receiving the first CORESET and the first PDCCH does not comprise a TCI field, the first CORESET is not configured (and/or enabled) with tci-PresentInDCI, tci-PresentInDCI is not enabled for the first CORESET, the second TCI state is activated for receiving the second CORESET and the second PDCCH does not comprise a TCI field, the second CORESET is not configured (and/or enabled) with tci-PresentInDCI, and/or tci-PresentInDCI is not enabled for the second CORESET.

In one embodiment, the UE receives a signal (e.g., a message) indicative of a first search space, comprising the first PDCCH, and indicative of a second search space comprising the second PDCCH. In some examples, the signal may be for configuring and/or associating the first search space and the second search space.

In one embodiment, based on an association of the first search space and the second search space (e.g., the signal may be indicative of the association of the first search space and the second search space), the first PDCCH and the second PDCCH are associated with scheduling the scheduled PDSCH (and/or the first PDCCH and the second PDCCH are associated with scheduling same information, such as same time-frequency resource allocation information, for the scheduled PDSCH). In some examples, the association of the first search space and the second search space may correspond to an association between the first search space and the second search space. Alternatively and/or additionally, the association of the first search space and the second search space may correspond to an association between the first search space and the scheduled PDSCH and/or an association between the second search space and the scheduled PDSCH.

In one embodiment, the first monitoring occasion of the first CORESET is in a downlink BWP on a serving cell, and the second monitoring occasion of the second CORESET is in the downlink BWP on the serving cell.

In one embodiment, the UE is configured with a first search space and a second search space in the downlink BWP.

In one embodiment, the first monitoring occasion of the first CORESET is associated with the first search space.

In one embodiment, the second monitoring occasion of the second CORESET is associated with the second search space.

Referring back to FIGS. 3 and 4, in one exemplary embodiment of a UE (e.g., a UE in a wireless communication system), the device 300 includes a program code 312 stored in the memory 310. The CPU 308 may execute program code 312 to enable the UE (i) to monitor a first PDCCH, via a first spatial QCL assumption associated with a first TCI state, on a first monitoring occasion of a first CORESET, (ii) to monitor a second PDCCH, via a second spatial QCL assumption associated with a second TCI state, on a second monitoring occasion of a second CORESET, and (iii) to determine an interval between a last OFDM symbol of a reference monitoring occasion and a starting OFDM symbol of a scheduled PDSCH, wherein the reference monitoring occasion is a last monitoring occasion of the first monitoring occasion and the second monitoring occasion, and wherein the UE does not expect to be scheduled with the scheduled PDSCH such that (and/or the UE does not expect that the scheduled PDSCH is scheduled such that) the interval is smaller than a threshold. Furthermore, the CPU 308 can execute the program code 312 to perform one, some and/or all of the above-described actions and steps and/or others described herein.

FIG. 21 is a flow chart 2100 according to one exemplary embodiment from the perspective of a base station (e.g., a base station in a wireless communication system). In step 2105, the base station transmits a first PDCCH, via a first spatial QCL assumption associated with a first TCI state, on a first monitoring occasion of a first CORESET. In step 2110, the base station transmits a second PDCCH, via a second spatial QCL assumption associated with a second TCI state, on a second monitoring occasion of a second CORESET. The base station is not configured to schedule (and/or is not allowed to schedule, prevents scheduling and/or is prevented from scheduling) a PDSCH, via the first PDCCH and the second PDCCH, at a time at which an interval would be smaller than a threshold. The interval corresponds to an interval (e.g., a time domain interval, such as a distance and/or a duration, in units of at least one of slots, symbols, time, etc.) between a last OFDM symbol of a reference monitoring occasion and a starting (e.g., initial) OFDM symbol of the PDSCH, wherein the reference monitoring occasion is a last (and/or latter) monitoring occasion (in time domain) of the first monitoring occasion (of the first CORESET) and the second monitoring occasion (of the second CORESET). Alternatively and/or additionally, the base station may not be configured to schedule (and/or is not allowed to schedule, prevents scheduling and/or is prevented from scheduling) the PDSCH via the first PDCCH and the second PDCCH such that the interval is smaller than the threshold.

In one embodiment, the base station is configured to schedule the PDSCH at a time at which the interval is larger than the threshold (e.g., the base station may schedule the PDSCH such that the interval between the last OFDM symbol of the reference monitoring occasion and the starting OFDM symbol of the PDSCH is larger than the threshold).

In one embodiment, the threshold is associated with (e.g., used for) determining whether or not to use a default beam of a default TCI state for transmission and/or reception of a PDSCH.

In one embodiment, the threshold is timeDurationForQCL.

In one embodiment, the first TCI state is activated in association with the first CORESET (and/or the first TCI state is associated with the first CORESET) and the first PDCCH does not comprise a TCI field, the first CORESET is not configured (and/or enabled) with tci-PresentInDCI, tci-PresentInDCI is not enabled for the first CORESET, the second TCI state is activated in association with the second CORESET (and/or the second TCI state is associated with the second CORESET) and the second PDCCH does not comprise a TCI field, the second CORESET is not configured (and/or enabled) with tci-PresentInDCI, and/or tci-PresentInDCI is not enabled for the second CORESET.

In one embodiment, the base station transmits a signal (e.g., a message) indicative of a first search space, comprising the first PDCCH, and indicative of a second search space comprising the second PDCCH. In some examples, the signal may be for configuring and/or associating the first search space and the second search space.

In one embodiment, based on an association of the first search space and the second search space (e.g., the signal may be indicative of the association of the first search space and the second search space), the first PDCCH and the second PDCCH are associated with scheduling the PDSCH (and/or the first PDCCH and the second PDCCH are associated with scheduling same information, such as same time-frequency resource allocation information, for the PDSCH). In some examples, the association of the first search space and the second search space may correspond to an association between the first search space and the second search space. Alternatively and/or additionally, the association of the first search space and the second search space may correspond to an association between the first search space and the PDSCH and/or an association between the second search space and the PDSCH.

In one embodiment, the first monitoring occasion of the first CORESET is in a downlink BWP on a serving cell, and the second monitoring occasion of the second CORESET is in the downlink BWP on the serving cell.

In one embodiment, the base station configures a UE with a first search space and a second search space in the downlink BWP.

In one embodiment, the first monitoring occasion of the first CORESET is associated with the first search space.

In one embodiment, the second monitoring occasion of the second CORESET is associated with the second search space.

Referring back to FIGS. 3 and 4, in one exemplary embodiment of a base station (e.g., a base station in a wireless communication system), the device 300 includes a program code 312 stored in the memory 310. The CPU 308 may execute program code 312 to enable the base station (i) to transmit a first PDCCH, via a first spatial QCL assumption associated with a first TCI state, on a first monitoring occasion of a first CORESET, and (ii) to transmit a second PDCCH, via a second spatial QCL assumption associated with a second TCI state, on a second monitoring occasion of a second CORESET, wherein the base station is not configured to schedule (and/or is not allowed to schedule, prevents scheduling and/or is prevented from scheduling) a PDSCH, via the first PDCCH and the second PDCCH, at a time at which an interval would be smaller than a threshold, and wherein the interval corresponds to an interval between a last OFDM symbol of a reference monitoring occasion and a starting OFDM symbol of the PDSCH, wherein the reference monitoring occasion is a last monitoring occasion of the first monitoring occasion and the second monitoring occasion. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 17-21. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 17-21, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). Alternatively and/or additionally, in systems associated with multiple scheduling PDCCHs and/or DCIs from different beams, applying one or more of the techniques presented herein may result in enabling the UE to receive a PDSCH (e.g., a scheduled PDSCH) via a beam (e.g., a proper beam) regardless of whether or not an interval between a PDCCH and the PDSCH is larger than or smaller than a threshold, and/or regardless of whether or not one, some, or all of the multiple scheduling PDCCHs and/or DCIs are received (e.g., successfully received) by the UE.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
    monitoring a first Physical Downlink Control Channel (PDCCH), via a first spatial Quasi-Colocation (QCL) assumption associated with a first Transmission Configuration Indicator (TCI) state, on a first monitoring occasion of a first Control Resource Set (CORESET);
    monitoring a second PDCCH, via a second spatial QCL assumption associated with a second TCI state, on a second monitoring occasion of a second CORESET;
    determining an interval between a last orthogonal frequency-division multiplexing (OFDM) symbol of a reference monitoring occasion and a starting OFDM symbol of a scheduled Physical Downlink Shared Channel (PDSCH), wherein the reference monitoring occasion is a last monitoring occasion of the first monitoring occasion and the second monitoring occasion, and wherein the scheduled PDSCH is scheduled by the first PDCCH and the second PDCCH; and
    based on the interval being larger than or equal to a threshold, receiving the scheduled PDSCH via a third spatial QCL assumption associated with a third TCI state, wherein the third TCI state is determined based on a lowest CORESET identity of a first CORESET identity of the first CORESET and a second CORESET identity of the second CORESET.

2. The method of claim 1, wherein at least one of:
    the threshold is associated with determining whether or not to use a default beam of a default TCI state for reception of a PDSCH; or
    the threshold is timeDurationForQCL.

3. The method of claim 1, wherein at least one of:
    the first TCI state is activated for receiving the first CORESET and the first PDCCH does not comprise a TCI field;
    the first CORESET is not configured with tci-PresentIn-DCI;
    tci-PresentInDCI is not enabled for the first CORESET;
    the second TCI state is activated for receiving the second CORESET and the second PDCCH does not comprise a TCI field;
    the second CORESET is not configured with tci-PresentInDCI; or
    tci-PresentInDCI is not enabled for the second CORESET.

4. The method of claim 1, wherein at least one of:
    the third TCI state is the first TCI state or the second TCI state;
    the third TCI state is the first TCI state if the first CORESET identity of the first CORESET is lower than the second CORESET identity of the second CORESET; or
    the third TCI state is the second TCI state if the second CORESET identity is lower than the first CORESET identity of the first CORESET.

5. The method of claim 1, wherein at least one of:
    the method comprises receiving a signal indicative of a first search space, comprising the first PDCCH, and a second search space comprising the second PDCCH; or
    based on an association of the first search space and the second search space, the first PDCCH and the second PDCCH are associated with scheduling the scheduled PDSCH.

6. The method of claim 1, wherein:
    the first monitoring occasion and the second monitoring occasion are in a first slot.

7. The method of claim 6, comprising:
monitoring one or more PDCCHs, associated with one or more CORESETs, in a second slot, wherein the second slot is different than the first slot and the second slot is a most recent slot in which the UE monitors PDCCH before receiving the scheduled PDSCH.

8. The method of claim 7, wherein:
the one or more CORESETs comprise a third CORESET with a lowest CORESET identity among one or more CORESET identities of the one or more CORESETs.

9. The method of claim 8, wherein:
the one or more CORESETs comprise one or more second CORESETs other than the first CORESET and the second CORESET.

10. The method of claim 1, wherein:
the first monitoring occasion of the first CORESET is in a downlink Bandwidth Part (BWP) on a serving cell; and
the second monitoring occasion of the second CORESET is in the downlink BWP on the serving cell.

11. The method of claim 10, wherein at least one of:
the UE is configured with a first search space and a second search space in the downlink BWP;
the first monitoring occasion of the first CORESET is associated with the first search space; or
the second monitoring occasion of the second CORESET is associated with the second search space.

12. A method of a User Equipment (UE), the method comprising:
monitoring a first Control Resource Set (CORESET), via a first spatial Quasi-Colocation (QCL) assumption associated with a first Transmission Configuration Indicator (TCI) state, on a first monitoring occasion, wherein a first Physical Downlink Control Channel (PDCCH) is associated with the first CORESET;
monitoring a second CORESET, via a second spatial QCL assumption associated with a second TCI state, on a second monitoring occasion, wherein:
a second PDCCH is associated with the second CORESET;
the first PDCCH schedules a Physical Downlink Shared Channel (PDSCH); and
the second PDCCH schedules the PDSCH;
determining an interval between a last orthogonal frequency-division multiplexing (OFDM) symbol of a reference monitoring occasion and a starting OFDM symbol of the PDSCH, wherein the reference monitoring occasion is a last monitoring occasion of the first monitoring occasion and the second monitoring occasion; and
based on the interval being larger than or equal to a threshold, receiving the PDSCH via a third spatial QCL assumption associated with a third TCI state, wherein the third TCI state is determined based on a lowest CORESET identity of a first CORESET identity of the first CORESET and a second CORESET identity of the second CORESET.

13. The method of claim 12, wherein at least one of:
the first TCI state is activated for receiving the first CORESET and the first PDCCH does not comprise a TCI field;
the first CORESET is not configured with tci-PresentInDCI;
tci-PresentInDCI is not enabled for the first CORESET;
the second TCI state is activated for receiving the second CORESET and the second PDCCH does not comprise a TCI field;
the second CORESET is not configured with tci-PresentInDCI; or
tci-PresentInDCI is not enabled for the second CORESET.

14. The method of claim 12, wherein at least one of:
the third TCI state is the first TCI state or the second TCI state;
the third TCI state is the first TCI state if the first CORESET identity of the first CORESET is lower than the second CORESET identity of the second CORESET; or
the third TCI state is the second TCI state if the second CORESET identity is lower than the first CORESET identity of the first CORESET.

15. The method of claim 12, wherein:
the first monitoring occasion and the second monitoring occasion are in a first slot.

16. The method of claim 15, comprising:
monitoring one or more PDCCHs, associated with one or more CORESETs, in a second slot, wherein the second slot is different than the first slot and the second slot is a most recent slot in which the UE monitors PDCCH before receiving the PDSCH.

17. The method of claim 16, wherein:
the one or more CORESETs comprise a third CORESET with a lowest CORESET identity among one or more CORESET identities of the one or more CORESETs.

18. The method of claim 17, wherein:
the one or more CORESETs comprise one or more second CORESETs other than the first CORESET and the second CORESET.

19. The method of claim 12, wherein:
the first monitoring occasion is in a downlink Bandwidth Part (BWP) on a serving cell; and
the second monitoring occasion is in the downlink BWP on the serving cell.

20. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
monitoring a first Physical Downlink Control Channel (PDCCH), via a first spatial Quasi-Colocation (QCL) assumption associated with a first Transmission Configuration Indicator (TCI) state, on a first monitoring occasion of a first Control Resource Set (CORESET);
monitoring a second PDCCH, via a second spatial QCL assumption associated with a second TCI state, on a second monitoring occasion of a second CORESET;
determining an interval between a last orthogonal frequency-division multiplexing (OFDM) symbol of a reference monitoring occasion and a starting OFDM symbol of a scheduled Physical Downlink Shared Channel (PDSCH), wherein the reference monitoring occasion is a last monitoring occasion of the first monitoring occasion and the second monitoring occasion, and wherein the scheduled PDSCH is scheduled by the first PDCCH and the second PDCCH; and
based on the interval being larger than or equal to a threshold, receiving the scheduled PDSCH via a third spatial QCL assumption associated with a third TCI state, wherein the third TCI state is determined based on a lowest CORESET identity of a first CORESET identity of the first CORESET and a second CORESET identity of the second CORESET.

* * * * *